United States Patent
Pittet et al.

(10) Patent No.: US 12,054,619 B2
(45) Date of Patent: Aug. 6, 2024

(54) UV-VIS RADIATION CURABLE SECURITY INKS FOR PRODUCING DICHROIC SECURITY FEATURES

(71) Applicant: SICPA HOLDING SA, Prilly (CH)

(72) Inventors: Hervé Pittet, Châtel-st-Denis (CH); Marlyse Demartin Maeder, La Sarraz (CH); Patrick Veya, Aclens (CH); Nikolay Grigorenko, Möhlin (CH); Andre Oswald, Rheinfelden (DE)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 18/036,341

(22) PCT Filed: Nov. 9, 2021

(86) PCT No.: PCT/EP2021/081155
§ 371 (c)(1),
(2) Date: May 10, 2023

(87) PCT Pub. No.: WO2022/101224
PCT Pub. Date: May 19, 2022

(65) Prior Publication Data
US 2023/0407116 A1    Dec. 21, 2023

(30) Foreign Application Priority Data

Nov. 10, 2020 (EP) .................... 20206740

(51) Int. Cl.
| | | |
|---|---|---|
| *C09D 11/037* | (2014.01) | |
| *B41M 1/04* | (2006.01) | |
| *B41M 1/10* | (2006.01) | |
| *B41M 1/12* | (2006.01) | |
| *B41M 3/14* | (2006.01) | |
| *B41M 7/00* | (2006.01) | |
| *B42D 25/378* | (2014.01) | |
| *C09D 11/101* | (2014.01) | |
| *C09D 11/102* | (2014.01) | |

(52) U.S. Cl.
CPC ............ *C09D 11/037* (2013.01); *B41M 1/04* (2013.01); *B41M 1/10* (2013.01); *B41M 1/12* (2013.01); *B41M 3/144* (2013.01); *B41M 7/009* (2013.01); *B42D 25/378* (2014.10); *C09D 11/101* (2013.01); *C09D 11/102* (2013.01)

(58) Field of Classification Search
CPC . B41M 1/04; B41M 1/10; B41M 1/12; B41M 3/144; B41M 7/009; C09D 11/037; C09D 11/101; C09D 11/102; B42D 25/378
See application file for complete search history.

(56) References Cited

U.S. PATENT DOCUMENTS

2021/0171786 A1* 6/2021 Grigorenko .......... C09D 11/103
2021/0206987 A1* 7/2021 Mason .................. C08K 3/042

FOREIGN PATENT DOCUMENTS

| WO | 2006074969 | 7/2006 |
|---|---|---|
| WO | 2011064162 | 6/2011 |
| WO | 2013127715 | 9/2013 |
| WO | 2013186167 | 12/2013 |
| WO | 2014067715 | 5/2014 |
| WO | 2020083794 | 4/2020 |
| WO | 2020234211 | 11/2020 |
| WO | 2022101207 | 5/2022 |

OTHER PUBLICATIONS

The Printing Ink Manual, R.H. Leach and R.J. Pierce, Springer Edition, 5th Edition, 2008, pp. 58-62.
Printing Technology, J. M. Adams and P.A. Dolin, Delmar Thomson Learning, 5th Edition, 2002, pp. 293-328.
(Continued)

*Primary Examiner* — David H Banh
(74) *Attorney, Agent, or Firm* — Muncy, Geissler, Olds & Lowe, P.C.

(57) ABSTRACT

The present invention provides a UV-Vis radiation curable security ink for producing a security feature for securing value documents, wherein said security feature exhibits a blue color upon viewing in transmitted light and a metallic yellow color upon viewing in incident light. The UV-Vis radiation curable security ink comprises a cationically curable or a hybrid curable ink vehicle, and silver nanoplatelets bearing a surface stabilizing agent of general formula (I)

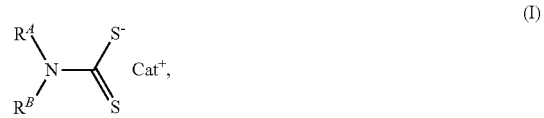

wherein
the residue $R^A$ is a $C_2$-$C_4$alkyl group substituted with a hydroxy group; the residue $R^B$ is selected from a $C_1$-$C_4$ alkyl group, and a $C_2$-$C_4$alkyl group substituted with a hydroxy group; and $Cat^+$ is a cation selected from the group consisting of $Na^+$, $K^+$, $Cs^+$ and $Rb^+$.

16 Claims, No Drawings

(56) References Cited

OTHER PUBLICATIONS

Handbook of Print Media, H. Kipphan, Springer, 2001, pp. 409-422 and pp. 498-499.
Handbook of Print Media, Helmut Kipphan, Springer, 2001, p. 48.
Printing Technology, J. M. Adams and P.A. Dolin, Delmar Thomson Learning, 5th Edition, 2002, pp. 359-360.
"Chemistry & Technology of UV & EB Formulation for Coatings, Inks & Paints", vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.
Industrial Photoinitiators, W. A. Green, CRC Press, 2010, Table 8.1 p. 170.
International Search Report and Written Opinion issued with respect to application No. PCT/EP2021/081155.

\* cited by examiner

UV-VIS RADIATION CURABLE SECURITY INKS FOR PRODUCING DICHROIC SECURITY FEATURES

FIELD OF THE INVENTION

The present invention relates to the technical field of security inks for producing dichroic security features for securing value documents, wherein said dichroic security features exhibit a first color upon viewing in transmitted light and a second color different from the first color upon viewing in incident light.

BACKGROUND OF THE INVENTION

With the constantly improving quality of color photocopies and printings and in an attempt to protect security documents such as banknotes, value documents or cards, transportation tickets or cards, tax banderols, and product labels that have no reproducible effects against counterfeiting, falsifying or illegal reproduction, it has been the conventional practice to incorporate various security means features in these documents.

Security features, e.g. for security documents, can generally be classified into "covert" security features and "overt" security features. The protection provided by covert security features relies on the concept that such features are difficult to detect, typically requiring specialized equipment and knowledge for detection, whereas "overt" security features rely on the concept of being easily detectable with the unaided human senses, e.g. such features may be visible and/or detectable via the tactile senses while still being difficult to produce and/or to copy. However, the effectiveness of overt security features depends to a great extent on their easy recognition as a security feature, because most users, and particularly those having no prior knowledge of the security features of a document or item secured therewith, will only then actually perform a security check based on said security feature if they have actual knowledge of their existence and nature.

A special role in securing value documents is played by dichroic security features exhibiting a first color upon viewing in transmitted light and a second color different from the first color upon viewing in incident light. To provide a striking effect and draw the layperson's attention, the first color and the second color must have an attractive visual appearance, such as blue, metallic yellow, magenta, and green, and a significant color contrast (for e.g.: blue/metallic yellow, green/metallic yellow, violet/metallic yellow).

Dichroic security features showing a blue color upon viewing in transmitted light and a metallic yellow color upon viewing in incident light may be obtained from silver platelets containing inks.

International patent application publication number WO2011064162A2 describes solvent-based inks and UV radically curable inks comprising silver platelets for producing dichroic security, or decorative elements showing a gold/copper color in reflection and a blue color in transmission. Said inks contain high concentrations of silver platelets being characterized by a weight ratio between the silver platelets and the binder of 3:1.1. The high concentration of silver platelets in the inks used for obtaining the security, or decorative element described by WO2011064162A2 is detrimental to the mechanical resistance of the produced security, or decorative element, and additionally, renders the production process of said element expensive. Further, the mechanical resistance of the security, or decorative element, described by WO2011064162A2 is impaired by the use of UV radically curable inks or solvent-based inks, which as well known to the skilled person, provide cured coatings with limited mechanical resistance. As the mechanical resistance is an essential property for security elements and the manufacturing process described by WO2011064162A2 is lengthy and rather expensive, the inks and the manufacturing process described therein are not suitable for the industrial production on value documents of dichroic security features with acceptable mechanical resistance.

International patent application publication number WO2013186167A2 describes the use of a UV curable ink containing silver platelets, a radically curable binder and an important amount of organic solvent for coating a surface of a holographic structure. The coated holographic structure shows on the embossed surface a blue color with strong chroma in transmission and a yellow color with a low chroma value in reflection. Although the UV curable ink described by WO2013186167A2 contains a lower concentration of silver platelets when compared to the UV radiation radically curable ink described by WO2011064162A2, said ink is still not suitable for the industrial production of dichroic features on value documents because on one side the increased amount of organic solvent is not environmentally friendly and requires an additional air drying step prior to the UV-curing step, and on the other side the coatings obtained with said ink have limited mechanical resistance, as well as low chroma in reflection.

Typically, industrial printing of value documents requires high printing speeds of about 8'000 sheets/hour, wherein from each sheet an important number of value documents is produced. For illustrative purpose, in the field of banknotes printing, up to 55 value documents, each containing one or more security features, may be produced from one sheet. To be suitable for implementation on a production line, it is essential that the production process of each printable security feature present on a value document complies with the high-speed requirements of industrial printing of value documents.

Therefore, a need remains for stable security inks for producing on value documents at high speed (i.e. industrial speed) dichroic security features having improved mechanical resistance and exhibiting a blue color upon viewing in transmitted light and a metallic yellow color upon viewing in incident light.

SUMMARY OF THE INVENTION

Accordingly, it is the object of the present invention to provide UV-Vis radiation cationically curable security inks and UV-Vis radiation hybrid curable security inks for producing on value documents at high speed (i.e. industrial speed) dichroic security features having improved mechanical resistance and exhibiting a blue color upon viewing in transmitted light and a metallic yellow color upon viewing in incident light. This is achieved by the UV-VIS radiation curable security ink claimed herein, wherein said ink comprises:

a) from about 7.5 wt-% to about 20 wt-% of silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy, and wherein the silver nanoplatelets bear a surface stabilizing agent of general formula (I)

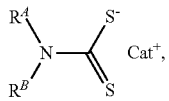  (I)

wherein
the residue $R^A$ is a $C_2$-$C_4$alkyl group substituted with a hydroxy group;
the residue $R^B$ is selected from a $C_1$-$C_4$ alkyl group, and a $C_2$-$C_4$alkyl group substituted with a hydroxy group; and $Cat^+$ is a cation selected from the group consisting of $Na^+$, $K^+$, $Cs^+$ and $Rb^+$;
  b) a perfluoropolyether surfactant functionalized with at least a hydroxy group;
  c) from about 3 wt-% to about 12 wt-% of a polyvinyl chloride copolymer containing at least 69 wt-% of vinyl chloride;
  d) d1) from about 25 wt-% to about 55 wt-% of a cycloaliphatic epoxide, and from about 1 wt-% to about 10 wt-% of a cationic photoinitiator; or
    d2) from about 30 wt-% to about 65 wt-% of a mixture of a cycloaliphatic epoxide and a radically curable compound, from about 1 wt-% to about 6 wt-% of a cationic photoinitiator, and from about 1 wt-% to about 6 wt-% of a free radical photoinitiator; and optionally
  e) a cationically curable compound selected from the group consisting of:
    e1) a vinyl ether having two vinyloxy residues in an amount lower than 50% of the weight percent (wt-%) of the cycloaliphatic epoxide of d);
    e2) a vinyl ether having one vinyloxy residue in an amount lower than about 5 wt-%;
    e3) an epoxide other than a cycloaliphatic epoxide in an amount lower than about 10 wt-%;
    e4) an oxetane having two oxetanyl residues in an amount lower than about 20 wt-%;
    e5) an oxetane having one oxetanyl residue in an amount lower than about 3.5 wt-%;
    and e6) a mixture of e1) and/or e2) and/or e3) and/or e4) and/or e5); the weight percents being based on the total weight of the UV-Vis radiation curable security ink.

A further aspect according to the present invention is directed to a process for producing a security feature for securing a value document, wherein said security feature exhibits a blue color upon viewing in transmitted light and a metallic yellow color upon viewing in incident light, said process comprising the following steps:
A) printing, preferably by screen printing, rotogravure, or flexography, the UV-Vis radiation curable security ink claimed and described herein on a transparent or partially transparent region of a substrate of a value document to provide an ink layer; and
B) UV-Vis curing the ink layer obtained at step A) to form the security feature.

DETAILED DESCRIPTION

Definitions

The following definitions are to be used to interpret the meaning of the terms discussed in the description and recited in the claims.

As used herein, the article "a/an" indicates one as well as more than one and does not necessarily limit its referent noun to the singular.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Preferably, the range denoted by the term "about" denotes a range within ±3% of the value, more preferably ±1%. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

The term "comprising" as used herein is intended to be non-exclusive and open-ended. Thus, for instance a solution comprising a compound A may include other compounds besides A. However, the term "comprising" also covers, as a particular embodiment thereof, the more restrictive meanings of "consisting essentially of" and "consisting of", so that for instance "a solution comprising A, B, and optionally C" may also (essentially) consist of A, and B, or (essentially) consist of A, B, and C.

Where the present description refers to "preferred" embodiments/features, combinations of these "preferred" embodiments/features are also deemed to be disclosed as long as the specific combination of "preferred" embodiments/features is technically meaningful.

As used herein, the term "one or more" means one, two, three, four, etc.

The term "UV-Vis curable" and "UV-Vis curing" refers to radiation-curing by photo-polymerization, under the influence of an irradiation having wavelength components in the UV or in the UV and visible part of the electromagnetic spectrum (typically 100 nm to 800 nm, preferably between 150 and 600 nm and more preferably between 200 and 400 nm).

Surprisingly, it has been found that a UV-Vis radiation curable security ink comprising:
  a) from about 7.5 wt-% to about 20 wt-% of silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy, and
wherein the silver nanoplatelets bear a surface stabilizing agent of general formula (I)

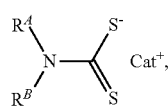  (I)

wherein the residue $R^A$ is a $C_2$-$C_4$alkyl group substituted with a hydroxy group;

the residue $R^B$ is selected from a $C_1$-$C_4$ alkyl group, and a $C_2$-$C_4$alkyl group substituted with a hydroxy group; and Cat$^+$ is a cation selected from the group consisting of Na$^+$, K$^+$, Cs$^+$ and Rb$^+$;

b) a perfluoropolyether surfactant functionalized with at least a hydroxy group;

c) from about 3 wt-% to about 12 wt-% of a polyvinyl chloride copolymer containing at least 69 wt-% of vinyl chloride;

d) d1) from about 25 wt-% to about 55 wt-% of a cycloaliphatic epoxide, and from about 1 wt-% to about 10 wt-% of a cationic photoinitiator; or d2) from about 30 wt-% to about 65 wt-% of a mixture of a cycloaliphatic epoxide and a radically curable compound, from about 1 wt-% to about 6 wt-% of a cationic photoinitiator, and from about 1 wt-% to about 6 wt-% of a free radical photoinitiator; and optionally e) a cationically curable compound selected from the group consisting of:

e1) a vinyl ether having two vinyloxy residues in an amount lower than 50% of the weight percent (wt-%) of the cycloaliphatic epoxide of d);

e2) a vinyl ether having one vinyloxy residue in an amount lower than about 5 wt-%;

e3) an epoxide other than a cycloaliphatic epoxide in an amount lower than about 10 wt-%;

e4) an oxetane having two oxetanyl residues in an amount lower than about 20 wt-%;

e5) an oxetane having one oxetanyl residue in an amount lower than about 3.5 wt-%;

and e6) a mixture of e1) and/or e2) and/or e3) and/or e4) and/or e5); the weight percents being based on the total weight of the UV-Vis radiation curable security ink, enables the expedient and cost-efficient manufacturing of security features having improved mechanical resistance and exhibiting a blue color in transmitted light and a metallic yellow color in incident light. The combination of the specific silver nanoplatelets bearing a surface stabilizing agent of general formula (I) described herein and the specific ink vehicle described herein allows expedient migration of the silver nanoplatelets contained in an ink layer obtained by printing the security ink according to the present invention from the mass of the ink layer at the interface between the ink layer and air and at the interface between the ink layer and the substrate and alignment at said interfaces to form thin reflective layers, thereby producing independently of the thickness of the printed ink layer the metallic yellow color in reflection and the blue color in transmission. The expedient development of the metallic yellow color in reflection and of the blue color in transmission cannot be achieved with the inks described in the prior art. The cationically curable binder or hybrid curable binder contained by the UV-Vis radiation curable security ink claimed herein provides the dichroic security feature obtained from said ink with a high mechanical resistance. The attractive visual appearance and the contrast between the blue color exhibited in transmitted light and the metallic yellow color exhibited in incident light renders the security feature made with the ink according to the present invention conspicuous, thereby drawing the layperson's attention to the security feature and aiding in finding and recognizing said security feature on the value document, and in authenticating the value document containing the security feature. The UV-Vis radiation curable ink according to the present invention has outstanding shelf stability. Hence, the UV-Vis radiation curable security ink according to the present invention complies with the high-speed requirements of industrial printing of value documents and provides dichroic security features with attractive visual appearance, high value recognition and high mechanical resistance.

The security feature made with the UV-Vis radiation curable security ink claimed herein exhibits a blue color upon viewing in transmitted light i.e. in transmission. For the purposes of the present invention, viewing in transmitted light means that the security feature is illuminated from one side, for example by holding said security feature against the daylight or in front of a light source, and viewed from the opposite side. Independently of the side from which the security feature is viewed in transmitted light, a blue color is observed. For the purposes of this invention, a security feature exhibiting a blue color refers to a security feature exhibiting a blue color characterized by a chroma value $C^*$ (corresponding to a measure of the color intensity or color saturation) higher than 20. An intense to very intense blue color is characterized by a chroma value $C^*$ higher than 30. The chroma value $C^*$ is calculated from $a^*$ and $b^*$ values according to the CIELAB (1976) color space, wherein $$C^* = \sqrt{(a^*)^2 + (b^*)^2}.$$

Said $a^*$ and $b^*$ values in transmitted light are measured using a Datacolor 650 spectrophotometer (parameters: integration sphere, diffuse illumination (pulse xenon D65) and 8° viewing, analyzer SP2000 with dual 256 diode array for wavelength range of 360-700 nm, transmission sampling aperture size of 22 mm).

The security feature made with the UV-Vis radiation curable security ink claimed herein exhibits a metallic yellow color or gold color upon viewing in incident light i.e. in reflection. In the present patent application, the terms "metallic yellow color" and "gold color" are used interchangeably. For the purpose of the present invention, "viewing in incident light" means that the security feature is illuminated from the side printed with the security ink claimed herein and viewed from the same side. For the purpose of the present invention, a security feature exhibiting a metallic yellow color or gold color refers to a security feature exhibiting a yellow color characterized by a chroma value $C^*$ (corresponding to a measure of the color intensity or color saturation) higher than 20 as calculated from $a^*$ and $b^*$ values according to the CIELAB (1976) color space, wherein $$C^* = \sqrt{(a^*)^2 + (b^*)^2}$$

and wherein said $a^*$ and $b^*$ values of the security feature were measured at 0° to the normal with an illumination angle of 22.5° using a goniometer (Goniospektrometer Codec WI-10 5&5 by Phyma GmbH Austria).

The UV-Vis radiation curable security ink claimed and described herein is preferably selected from a screen-printing security ink, a rotogravure security ink, and a flexography security ink. Preferably, the UV-Vis radiation curable security ink claimed herein is characterized by a viscosity of between about 50 mPas and about 2000 mPas at 25° C.

measured using a Brookfield viscometer (model "DV-I Prime) equipped with a spindle S27 at 100 rpm, or with a spindle S21 at 50 rpm for measuring viscosities between 500 and 2000 mPas, and a spindle S21 at 100 rpm for measuring viscosities equal to or lower than 500 mPas. The UV-Vis radiation curable screen-printing security ink claimed herein is characterized by a viscosity of between about 50 mPas and about 1000 mPas at 25° C., preferably of between about 100 mPas and about 1000 mPas at 25° C.

As known by those skilled in the art, the term rotogravure refers to a printing process which is described for example in *Handbook of Print Media*, Helmut Kipphan, Springer Edition, page 48. Rotogravure is a printing process wherein image elements are engraved into the surface of the cylinder. The non-image areas are at a constant original level. Prior to printing, the entire printing plate (non-printing and printing elements) is inked and flooded with ink. Ink is removed from the non-image by a wiper or a blade before printing, so that ink remains only in the cells. The image is transferred from the cells to the substrate by a pressure typically in the range of 2 to 4 bars and by the adhesive forces between the substrate and the ink. The term rotogravure does not encompass intaglio printing processes (also referred in the art as engraved steel die or copper plate printing processes) which rely for example on a different type of ink.

Flexography printing processes preferably use a unit with a chambered doctor blade, an anilox roller and plate cylinder. The anilox roller advantageously has small cells whose volume and/or density determines the ink or varnish application rate. The chambered doctor blade lies against the anilox roller, filling the cells and scraping off surplus ink or varnish at the same time. The anilox roller transfers the ink to the plate cylinder which finally transfers the ink to the substrate. Plate cylinders can be made from polymeric or elastomeric materials. Polymers are mainly used as photopolymer in plates and sometimes as a seamless coating on a sleeve. Photopolymer plates are made from light-sensitive polymers that are hardened by ultraviolet (UV) light. Photopolymer plates are cut to the required size and placed in an UV light exposure unit. One side of the plate is completely exposed to UV light to harden or cure the base of the plate. The plate is then turned over, a negative of the job is mounted over the uncured side and the plate is further exposed to UV light. This hardens the plate in the image areas. The plate is then processed to remove the unhardened photopolymer from the non-image areas, which lowers the plate surface in these non-image areas. After processing, the plate is dried and given a post-exposure dose of UV light to cure the whole plate. Preparation of plate cylinders for flexography is described in *Printing Technology*, J. M. Adams and P. A. Dolin, Delmar Thomson Learning, $5^{th}$ Edition, pages 359-360.

As well known to those skilled in the art, screen printing (also referred in the art as silkscreen printing) is a printing technique that typically uses a screen made of woven mesh to support an ink-blocking stencil. The attached stencil forms open areas of mesh that transfer ink as a sharp-edged image onto a substrate. A squeegee is moved across the screen with ink-blocking stencil, forcing ink past the threads of the woven mesh in the open areas. A significant characteristic of screen printing is that a greater thickness of the ink can be applied to the substrate than with other printing techniques. Screen-printing is therefore also preferred when ink deposits with the thickness having a value between about 10 to 50 μm or greater are required which cannot (easily) be achieved with other printing techniques. Generally, a screen is made of a piece of porous, finely woven fabric called mesh stretched over a frame of e.g. aluminum or wood. Currently most meshes are made of man-made materials such as synthetic or steel threads. Preferred synthetic materials are nylon or polyester threads.

In addition to screens made on the basis of a woven mesh based on synthetic or metal threads, screens have been developed out of a solid metal sheet with a grid of holes. Such screens are prepared by a process comprising of electrolytically forming a metal screen by forming in a first electrolytic bath a screen skeleton upon a matrix provided with a separating agent, stripping the formed screen skeleton from the matrix and subjecting the screen skeleton to an electrolysis in a second electrolytic bath in order to deposit metal onto said skeleton.

There are three types of screen-printing presses, namely flat-bed, cylinder and rotary screen-printing presses. Flat-bed and cylinder screen printing presses are similar in that both use a flat screen and a three-step reciprocating process to perform the printing operation. The screen is first moved into position over the substrate, the squeegee is then pressed against the mesh and drawn over the image area, and then the screen is lifted away from the substrate to complete the process. With a flat-bed press the substrate to be printed is typically positioned on a horizontal print bed that is parallel to the screen. With a cylinder press the substrate is mounted on a cylinder. Flat-bed and cylinder screen printing processes are discontinuous processes, and consequently limited in speed which is generally at maximum 45 m/min in web or 3'000 sheets/hour in a sheet-fed process.

Conversely, rotary screen presses are designed for continuous, high speed printing. The screens used on rotary screen presses are for instance thin metal cylinders that are usually obtained using the electroforming method described hereabove or made of woven steel threads. The open-ended cylinders are capped at both ends and fitted into blocks at the side of the press. During printing, ink is pumped into one end of the cylinder so that a fresh supply is constantly maintained. The squeegee is fixed inside the rotating screen and squeegee pressure is maintained and adjusted to allow a good and constant print quality. The advantage of rotary screen presses is the speed which can reach easily 150 m/min in web or 10'000 sheets/hour in a sheet-fed process.

Screen printing is further described for example in *The Printing Ink Manual*, R. H. Leach and R. J. Pierce, Springer Edition, $5^{th}$ Edition, pages 58-62, in *Printing Technology*, J. M. Adams and P. A. Dolin, Delmar Thomson Learning, $5^{th}$ Edition, pages 293-328 and in *Handbook of Print Media*, H. Kipphan, Springer, pages 409-422 and pages 498-499.

More preferably the UV-VIS radiation curable security ink claimed and described herein is a screen-printing security ink. Such UV-Vis radiation curable screen-printing security ink is particularly useful for the industrial manufacturing of dichroic security features on value documents because it enables printing at very high-speed of dichroic security features having large thicknesses of at least about 4 μm.

The UV-VIS radiation curable ink claimed and described herein contains a) from about 7.5 wt-% to about 20 wt-%, preferably from about 7.5 wt-% to about 15 wt-%, more preferably from about 10 wt-% to about 12.5 wt-%, of silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy, and wherein the silver nanoplatelets bear a surface stabilizing agent of general formula (I)

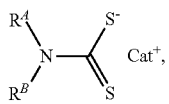
(I)

wherein the residue $R^A$ is a $C_2$-$C_4$alkyl group substituted with a hydroxy group, the residue $R^B$ is selected from a $C_1$-$C_4$ alkyl group, and a $C_2$-$C_4$alkyl group substituted with a hydroxy group; and $Cat^+$ is a cation selected from the group consisting of $Na^+$, $K^+$, $Cs^+$ and $Rb^+$.

The silver nanoplatelets described herein bearing the surface stabilizing agent of general formula (I) are readily dispersible in the vehicle of the UV-Vis radiation curable security ink claimed herein. Upon printing, the silver nanoplatelets described herein migrate from the mass of the ink layer obtained with the UV-Vis radiation curable security ink claimed herein at the interface between the ink layer and air and at the interface between the ink layer and the substrate and align themselves to form a thin layer of silver nanoplatelets at said interfaces, thereby leading to the expedient development of the metallic yellow color observed in incident light. This property of the UV-Vis radiation curable security ink claimed herein is particularly advantageous because on one side, the time required for the development of the metallic yellow color is compatible with the high-speed requirements of industrial printing of value documents, and on the other side, it enables production of dichroic security features with inks containing amounts of silver nanoplatelets as low as 7.5 wt-%, which drastically reduce the production costs, especially for dichroic security features having a large thickness of at least about 4 μm. Depending on the thickness of the dichroic security feature to be produced and the composition of the ink vehicle, the amount of the silver nanoplatelets in the UV-Vis radiation curable security ink can be adjusted so that the metallic yellow color in reflected light is rapidly developed without impacting the hue and chroma of the blue color in transmitted light.

The silver nanoplatelets contained by the UV-Vis may be in the form of disks, regular hexagons, triangles, especially equilateral triangles, and truncated triangles, especially truncated equilateral triangles, or mixtures thereof. They are preferably in the form of disks, truncated triangles, hexagons, or mixtures thereof.

The mean diameter of the silver nanoplatelets is in the range of 50 to 150 nm, preferably 60 to 140 nm, more preferably 70 to 120 nm, with a standard deviation of less than 60%, preferably less than 50%. The diameter of a silver nanoplatelet is the longest dimension of said silver nanoplatelet and corresponds to the maximum dimension of said silver nanoplatelet when oriented parallel to the plane of a transmission electron microscopy (TEM) image. As used herein, the term "mean diameter of the silver nanoplatelets" refers to the mean diameter determined by transmission electron microscopy (TEM) using Fiji image analysis software based on the measurement of at least 300 randomly selected silver nanoplatelets oriented parallel to the plane of a transmission electron microscopy image (TEM), wherein the diameter of a silver nanoplatelet is the maximum dimension of said silver nanoplatelet oriented parallel to the plane of a transmission electron microscopy image (TEM). TEM analysis was conducted using an EM 910 instrument from ZEISS in bright field mode at an e-beam acceleration voltage of 100 kV. A dispersion of silver nanoplatelets in isopropanol at a suitable concentration, preferably lower than 24.1 wt-%, was used for conducting the TEM analysis.

The mean thickness of the silver nanoplatelets is in the range of 5 to 30 nm, preferably 7 to 25 nm, more preferably 8 to 25 nm, with a standard deviation of less than 50%, preferably less than 30%. The thickness of a silver nanoplatelet is the shortest dimension of said nanoplatelet and corresponds to the maximum thickness of said silver nanoplatelet. As used herein, the term "mean thickness of the silver nanoplatelets" refers to the mean thickness determined by transmission electron microscopy (TEM) based on the manual measurement of at least 50 randomly selected silver nanoplatelets oriented perpendicular to the plane of the TEM image, wherein the thickness of the silver nanoplatelet is the maximum thickness of said silver nanoplatelet. TEM analysis was conducted using an EM 910 instrument from ZEISS in bright field mode at an e-beam acceleration voltage of 100 kV. A dispersion of silver nanoplatelets in isopropanol at a suitable concentration, preferably lower than 24.1 wt-%, was used for conducting the TEM analysis.

The mean aspect ratio of the silver nanoplatelets (defined as the ratio between the mean diameter and the mean thickness) is larger than 2.0, preferably larger than 2.2 and more preferably larger than 2.5.

Preferably, the mean diameter of the silver nanoplatelets is in the range of 70 to 120 nm with the standard deviation being less than 50%, the mean thickness of said silver nanoplatelets is in the range of 8 to 25 nm with the standard deviation being less than 30% and the mean aspect ratio of said silver nanoplatelets is higher than 2.5.

The silver nanoplatelets used in the UV-Vis radiation curable ink described herein are characterized by a highest wavelength absorption maximum of between 560 and 800 nm, preferably 580 and 800 nm, most preferably 600 to 800 nm. The highest wavelength absorption maximum was measured in water at ca. $5*10^{-5}$ M (mol/l) concentration of silver using a Varian Cary 50 UV-Visible spectrophotometer. The absorption maximum has a full width at half maximum (FWHM) value in the range of 50 to 500 nm, preferably 70 to 450 nm, more preferably 80 to 450 nm. The molar extinction coefficient of the silver nanoplatelets, measured at the highest wavelength absorption maximum, is higher than 4000 L/(cm*$mol_{Ag}$), especially higher than 5000 L/(cm*$mol_{Ag}$), very especially higher than 6000 L/(cm*$mol_{Ag}$).

The silver nanoplatelets contained by the UV-Vis radiation curable ink claimed herein bear a surface stabilizing agent of general formula (I)

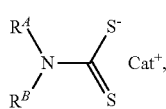
(I)

wherein the residue $R^A$ is a $C_2$-$C_4$alkyl group substituted with a hydroxy group; the residue $R^B$ is selected from a $C_1$-$C_4$ alkyl group, and a $C_2$-$C_4$alkyl group substituted with a hydroxy group; and $Cat^+$ is a cation selected from the group consisting of $Na^+$, $K^+$, $Cs^+$ and $Rb^+$. Without being bound by the theory, it is believed that the surface stabilizing agent of general formula (I) besides preventing the agglomeration and sedimentation of the silver nanoplatelets in the security ink claimed herein, aids in promoting migration of the silver nanoplatelets from the mass of the ink layer obtained with the security ink claimed herein at the interface between the ink layer and air and at the interface between the ink layer and the substrate.

The cation Cat$^+$ in general formula (I) is preferably selected from the group consisting of Na$^+$, K$^+$ and Cs$^+$.

The surface stabilizing agent of general formula (I) may be present in an amount from about 0.4% to about 5%, preferably from about 0.5% to about 3%, more preferably from about 0.5% to about 1.5%, and especially preferably from about 0.5% to about 1%, of the weight percent (wt-%) of the silver nanoplatelets.

The term "$C_1$-$C_4$alkyl group" as used herein refers to a saturated linear or branched-chain monovalent hydrocarbon radical of one to four carbon atoms ($C_1$-$C_4$). Examples of $C_1$-$C_4$alkyl groups include methyl (Me, —CH$_3$), ethyl (Et, —CH$_2$CH$_3$), 1-propyl (n-Pr, n-propyl, —CH$_2$CH$_2$CH$_3$), 2-propyl (i-Pr, iso-propyl, —CH(CH$_3$)$_2$), 1-butyl (n-Bu, n-butyl, —CH$_2$CH$_2$CH$_2$CH$_3$), 2-methyl-1-propyl (i-Bu, i-butyl, —CH$_2$CH(CH$_3$)$_2$), 2-butyl (s-Bu, s-butyl, —CH(CH$_3$)CH$_2$CH$_3$) and 2-methyl-2-propyl (t-Bu, t-butyl, —C(CH$_3$)$_3$).

The term "$C_2$-$C_4$alkyl group substituted with a hydroxy group" refers to a linear or branched alkyl group having two to four carbon atoms, which is substituted by a hydroxy group (—OH). The $C_2$-$C_4$alkyl group may be substituted by one or two hydroxy groups.

In general formula (I), the residue $R^A$ may be a $C_2$-$C_4$alkyl group substituted with two hydroxy groups and the residue $R^B$ may be a $C_1$-$C_4$ alkyl group.

In a preferred embodiment according to the present invention, the residues $R^A$ and $R^B$ are independently of each other a $C_2$-$C_4$alkyl group substituted with a hydroxy group, preferably one hydroxy group. Thus, in an embodiment according to the present invention the residues $R^A$ and $R^B$ are independently of each other selected from the group consisting of: —CH$_2$CH$_2$OH, —CH$_2$CH(OH)CH$_3$, —CH$_2$CH$_2$CH$_2$OH, —CH(CH$_3$)(CH$_2$OH), —CH$_2$CH(OH)CH$_2$CH$_3$, —CH$_2$CH$_2$CH(OH)CH$_3$—CH$_2$CH$_2$CH$_2$CH$_2$OH, —CH(CH$_3$)CH(OH)CH$_3$, —CH(CH$_2$OH)CH$_2$CH$_3$, —CH(CH$_3$)CH$_2$CH$_2$OH, —CH$_2$CH(CH$_2$OH)CH$_3$, —CH$_2$C(CH$_3$)(OH)CH$_3$, —CH$_2$CH(CH$_3$)CH$_2$(OH), —CH$_2$C(OH)(CH$_3$)$_2$, —CH$_2$C(CH$_3$)(CH$_2$OH), more preferably selected from the group consisting of: —CH$_2$CH$_2$OH, —CH$_2$CH(OH)CH$_3$, and —CH$_2$CH$_2$CH$_2$OH. The residues $R^A$ and $R^B$ may be the identical, or may be different.

Examples of dithiocarbamate salts of general formula (I) include, but are not limited to, sodium bis(2-hydroxyethyl)dithiocarbamate, potassium bis(2-hydroxyethyl)dithiocarbamate, cesium bis(2-hydroxyethyl)dithiocarbamate, sodium bis(3-hydroxypropyl)dithiocarbamate, potassium bis(3-hydroxypropyl)dithiocarbamate, cesium bis(3-hydroxypropyl)dithiocarbamate, sodium bis(4-hydroxybutyl)dithiocarbamate, potassium bis(4-hydroxybutyl)dithiocarbamate, and cesium bis(4-hydroxybutyl)dithiocarbamate.

To prevent agglomeration and sedimentation of the silver nanoplatelets upon storage, the silver nanoplatelets may bear on their surface further surface stabilizing agents.

In a preferred embodiment, the silver nanoplatelets bear on their surface a further surface stabilizing agent of general formula (II)

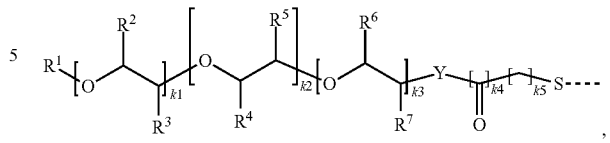

(II)

wherein
$R^1$ is H, $C_1$-$C_{18}$alkyl, phenyl, $C_1$-$C_8$alkylphenyl, or CH$_2$COOH;
$R^2$, $R^3$, $R^4$, $R^5$, $R^6$ and $R^7$ are independently of each other H, $C_1$-$C_8$alkyl, or phenyl;
Y is O, or NR$^8$;
$R^8$ is H, or $C_1$-$C_8$alkyl;
k1 is an integer in the range of from 1 to 500;
k2 and k3 are independently of each other 0, or integers in the range of from 1 to 250;
k4 is 0, or 1; and
k5 is an integer in the range of from 1 to 5. Preferably, in general formula (II) Y represents O. Also preferably, in general formula (II) k4 is 0.

The surface stabilizing agent of general formula (II) has preferably an average molecular weight (Mn) of from 1000 to 20000 [g/mol], and more preferably from 1000 to 10000 [g/mol], most preferably from 1000 to 6000 [g/mol].

If the surface stabilizing agent of formula (I) comprises, for example, ethylene oxide units (EO) and propylene oxide units (PO), the order of (EO) and (PO) may be fixed (block copolymers), or may not be fixed (random copolymers).

Preferably, in general formula (II), $R^1$ is H, or $C_1$-$C_{18}$alkyl, $R^2$, $R^3$, $R^4$, $R^5$, $R^6$ and $R^7$ are independently of each other H, CH$_3$, or $C_2$H$_5$, k1 is an integer in the range of from 22 to 450, k2 and k3 are independently of each other 0, or integers in the range of from 1 to 250, k4 is 0, or 1, and k5 is an integer in the range of from 1 to 5. More preferably, in general formula (II) $R^1$ is H, or $C_1$-$C_4$alkyl, $R^2$, $R^3$, $R^4$, $R^5$, $R^6$ and $R^7$ are independently of each other H, or CH$_3$, k1 is an integer in the range of from 22 to 450, k2 and k3 are independently of each other 0, or integers in the range of from 1 to 100, k4 is 0, k5 is an integer in the range of from 1 to 4.

The most preferred surface stabilizing agent of general formula (II) has the general formula (IIa)

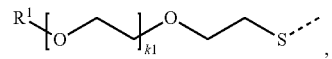

(IIa)

wherein
$R^1$ is H, or a $C_1$-$C_8$alkyl group, especially H, or CH$_3$, and k1 is an integer in the range of from 22 to 450, especially 22 to 150.

The preferred surface stabilizing agents of general formula (II) are derived from MPEG thiols (poly(ethylene glycol) methyl ether thiols) having an average molecular weight (Mn) of 2000 to 6000, such as, for example, MPEG 2000 thiol, MPEG 3000 thiol, MPEG 4000 thiol, MPEG 5000 thiol, MPEG 6000 thiol, PEG thiols (0-(2-mercaptoethyl)-poly(ethylene glycol)) having an average Mn of 2000 to 6000, such as, for example, PEG 2000 thiol, PEG 3000 thiol, PEG 4000 thiol, PEG 5000 thiol, PEG 6000 thiol.

The silver nanoplatelets contained by the security ink may further bear a surface stabilizing agent which is a polymer, or copolymer described in WO200674969A1, which can be obtained by a process comprising the steps:

i-1) polymerizing in a first step one or more ethylenically unsaturated monomers in the presence of at least one nitroxylether having the structural element

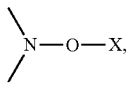

wherein X represents a group having at least one carbon atom and is such that the free radical X• derived from X is capable of initiating polymerization; or i-2) polymerizing in a first step one or more ethylenically unsaturated monomers in the presence of at least one stable free nitroxyl radical

and a free radical initiator;
wherein at least one monomer used in the steps i-1) or i-2) is a $C_1$-$C_6$ alkyl or hydroxy $C_1$-$C_6$ alkyl ester of acrylic or methacrylic acid; and optionally ii) a second step, comprising the modification of the polymer or copolymer prepared under i-1) or i-2) by a transesterification reaction, an amidation, hydrolysis or anhydride modification or a combination thereof.

The monomer in step i-1) or i-2) is preferably selected from 4-vinyl-pyridine or pyridinium-ion, 2-vinyl-pyridine or pyridinium-ion, 1-vinyl-imidazole or imidazolinium-ion, or a compound of formula $CH_2=C(R_a)-(C=Z)-R_b$, wherein $R_a$ is hydrogen or methyl;
$R_b$ is $NH_2$, $O^-(Me^+)$, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, unsubstituted di($C_1$-$C_{18}$alkyl)amino, hydroxy-substituted $C_1$-$C_{18}$alkylamino or hydroxy-substituted di($C_1$-$C_{18}$alkyl)amino, $-O(CH_2)_yNR^{15}R^{16}$ or $-O(CH_2)_yN^+HR^{15}R^{16}An^-$, $-N(CH_2)_yNR^{15}R^{16}$, or $-N(CH_2)_yN^+HR^{15}R^{16}An^-$,
wherein
$An^-$ is an anion of a monovalent organic, or inorganic acid;
y is an integer from 2 to 10;
$R^{15}$ is saturated or unsaturated, linear or branched chain alkyl with 1-22 carbon atoms;
$R^{16}$ is saturated or unsaturated, linear or branched chain alkyl with 1-22 carbon atoms;
$Me^+$ is a monovalent metal atom or the ammonium ion; and
Z is oxygen or sulfur.

The second step ii) is preferably a transesterification reaction. In step ii) the alcohol is preferably an ethoxylate of formula $R_c-[O-CH_2-CH_2-]_c-OH$, wherein $R_c$ is saturated or unsaturated, linear or branched chain alkyl with 1-22 carbon atoms, or alkylaryl or dialkylaryl with up to 24 carbon atoms and c is 1 to 150.

Preferably, step i-1) or i-2) is carried out twice and a block copolymer is obtained wherein in the first or second radical polymerization step the monomer or monomer mixture contains 50 to 100% by weight, based on total monomers, of a $C_1$-$C_6$ alkyl ester of acrylic or methacrylic acid and in the second or first radical polymerization step respectively, the ethylenically unsaturated monomer or monomer mixture contains at least a monomer without primary or secondary ester bond.

In the first polymerization step, the monomer or monomer mixture contains from 50 to 100% by weight based on total monomers of a $C_1$-$C_6$ alkyl ester of acrylic or methacrylic acid (first monomer) and in the second polymerization step the ethylenically unsaturated monomer or monomer mixture comprises 4-vinyl-pyridine or pyridinium-ion, 2-vinyl-pyridine or pyridinium-ion, vinyl-imidazole or imidazolinium-ion, 3-dimethylaminoethylacrylamide, 3-dimethylaminoethylmethacrylamide, or corresponding ammonium ion, 3-dimethylaminopropylacrylamide, or corresponding ammonium ion, or 3-dimethylaminopropylmethacrylamide, or corresponding ammonium ion (second monomer).

Preferably, the nitroxylether has the following structure

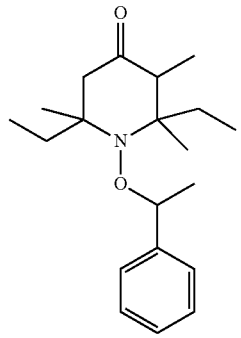

The surface stabilization agent is preferably a copolymer which can be obtained by a process comprising the steps:

i-2) polymerizing in a first step a first monomer, which is a $C_1$-$C_6$ alkyl or hydroxy $C_1$-$C_6$ alkyl ester of acrylic or methacrylic acid, and a second monomer which is selected from selected from 4-vinyl-pyridine or pyridinium-ion, 2-vinyl-pyridine or pyridinium-ion, 1-vinyl-imidazole or imidazolinium-ion, 3-dimethylaminoethylacrylamide, 3-dimethylaminoethylmethacrylamide, 3-dimethylamino-propylacrylamide, and 3-dimethylaminopropylmethacrylamide; in the presence of at least one nitroxylether having the structural element

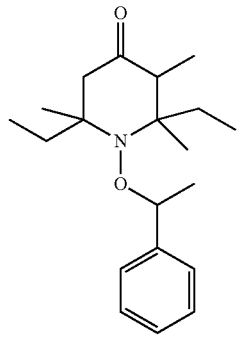

and ii) a second step, comprising the modification of the polymer or copolymer prepared under i-1) by a transesterification reaction, wherein the alcohol in step ii) is an ethoxylate of formula $R_c-[O-CH_2-CH_2-]_c-$ OH, wherein $R_c$ is saturated or unsaturated, linear or branched chain alkyl with 1-22 carbon atoms, or alkylaryl or dialkylaryl with up to 24 carbon atoms and c is 1 to 150.

Preferably the surface stabilizing agent obtained via the process described herein is a copolymer of the following formula (III)

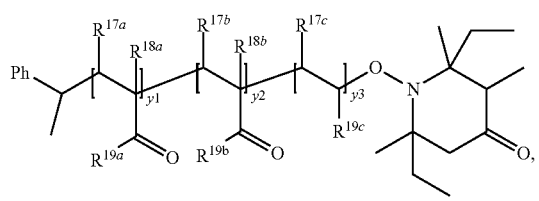
(III)

wherein $R^{17a}$, $R^{17b}$ and $R^{17c}$ are independently of each other H, or methyl;

$R^{18a}$ and $R^{18b}$ are H, or methyl;

$R^{19a}$ is saturated or unsaturated, linear or branched chain alkyl with 1-22 carbon atoms;

$R^{19b}$ is $R_c$—[O—CH$_2$—CH$_2$—]$_c$—O—;

$R^{19c}$ is

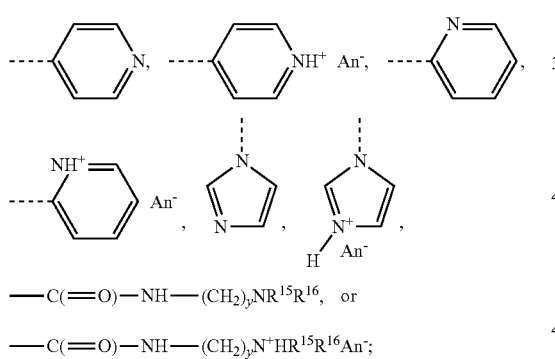

wherein

An$^-$ is an anion of a monovalent organic, or inorganic acid;

y is an integer from 2 to 10;

$R^{15}$ is saturated or unsaturated, linear or branched chain alkyl with 1-22 carbon atoms, $R^{16}$ is saturated or unsaturated, linear or branched chain alkyl with 1-22 carbon atoms, $R_c$ is saturated or unsaturated, linear or branched chain alkyl with 1-22 carbon atoms, or alkylaryl or dialkylaryl with up to 24 carbon atoms and c is 1 to 150, and y1, y2 and y3 are independently of each other integers from 1 to 200.

More preferably, the surface stabilizing agent is a copolymer represented by formula (III-a)

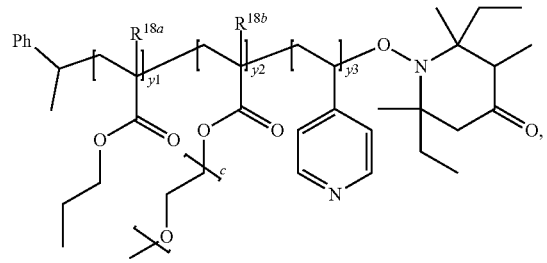
(III-a)

wherein $R^{18a}$ and $R^{18b}$ are H, or methyl;

y1, y2 and y3 are independently of each other integers from 1 to 200; and c is an integer from 1 to 150. The order of monomers with indices y1 and y2 may be fixed (block copolymers) or not fixed (random copolymers).

Examples of preferred copolymers to be used as surface stabilizing agents are the copolymers described in Example A3 and Example A6 of WO200674969A1.

To improve the stability of optical properties of the silver nanoplatelets upon storage or heat exposure, said silver nanoplatelets may bear a further surface stabilizing agent of general formula (IV)

(IV)

wherein $R^9$ is a hydrogen atom, or a group of formula —CHR$^{11}$—N(R$^{12}$)(R$^{13}$);

$R^{10}$ is a hydrogen atom, a halogen atom, a $C_1$-$C_8$alkoxy group, or a $C_1$-$C_8$alkyl group;

$R^{11}$ is H, or $C_1$-$C_8$alkyl; and $R^{12}$ and $R^{13}$ are independently of each other a $C_1$-$C_8$alkyl, a hydroxy$C_1$-$C_8$alkyl group, or a group of formula —[(CH$_2$CH$_2$)—O]$_{n1}$—CH$_2$CH$_2$—OH, wherein n1 is 1 to 5.

Examples of compounds of formula (IV) include, but are not limited to:

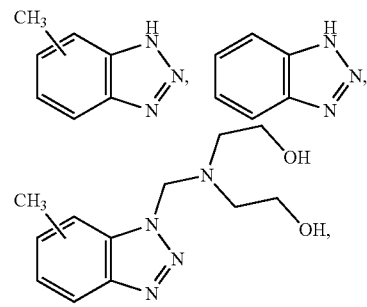

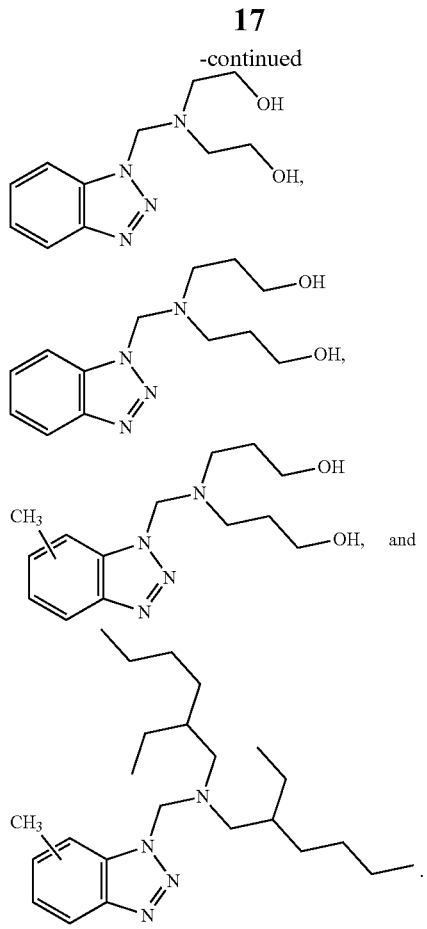

A dispersion of silver nanoplatelets to be used for preparing the UV-Vis radiation curable security ink claimed herein may be obtained by using the method comprising the following steps:

1) preparing a solution comprising a silver precursor, a compound of formula (II)

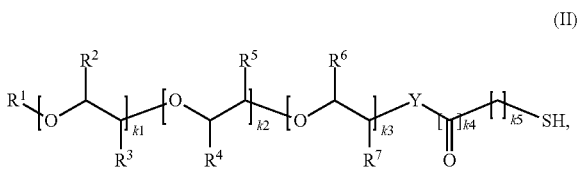

wherein
$R^1$ is H, $C_1$-$C_{18}$alkyl, phenyl, $C_1$-$C_8$alkylphenyl, or $CH_2COOH$;
$R^2$, $R^3$, $R^4$, $R^5$, $R^6$ and $R^7$ are independently of each other H, $C_1$-$C_8$alkyl, or phenyl;
Y is O, or $NR^8$;
$R^8$ is H, or $C_1$-$C_8$alkyl;
k1 is an integer in the range of from 1 to 500;
k2 and k3 are independently of each other 0, or integers in the range of from 1 to 250;
k4 is 0, or 1; and
k5 is an integer in the range of from 1 to 5;
 a polymer, or copolymer, which can be obtained by a process comprising the steps:
  i-1) polymerizing in a first step one or more ethylenically unsaturated monomers in the presence of at least one nitroxylether having the structural element $$\diagdown\hspace{-0.5em}\text{N}\!-\!\text{O}\!-\!\text{X,}\diagup$$

wherein X represents a group having at least one carbon atom and is such that the free radical X• derived from X is capable of initiating polymerization; or
  i-2) polymerizing in a first step one or more ethylenically unsaturated monomers in the presence of at least one stable free nitroxyl radical $$\diagdown\hspace{-0.5em}\text{N}\!-\!\text{O}\!\cdot\diagup$$

and a free radical initiator; wherein at least one monomer used in the steps i-1) or i-2) is a $C_1$-$C_6$ alkyl or hydroxy $C_1$-$C_6$ alkyl ester of acrylic or methacrylic acid; and optionally
  ii) a second step, comprising the modification of the polymer or copolymer prepared under i-1) or i-2) by a transesterification reaction, an amidation, hydrolysis or anhydride modification or a combination thereof,
 water, and optionally a defoamer;
2) preparing a solution, comprising a reducing agent, which comprises at least one boron atom in the molecule, and water;
3) adding the solution obtained at step 1) to the solution obtained at step 2), and adding one or more complexing agents;
4) adding a hydrogen peroxide solution in water; and
5) adding one or more surface stabilizing agents to the mixture obtained at step 4).

The silver precursor is a silver(I) compound selected from the group consisting of: $AgNO_3$; $AgClO_4$; $Ag_2SO_4$; AgCl; AgF; AgOH; $Ag_2O$; $AgBF_4$; $AgIO_3$; $AgPF_6$; $R^{200}CO_2Ag$, $R^{200}SO_3Ag$, wherein $R^{200}$ is unsubstituted or substituted $C_1$-$C_{18}$alkyl, unsubstituted or substituted $C_5$-$C_8$cycloalkyl, unsubstituted or substituted $C_7$-$C_{18}$aralkyl, unsubstituted or substituted $C_6$-$C_{18}$aryl or unsubstituted or substituted $C_2$-$C_{18}$heteroaryl; Ag salts of dicarboxylic, tricarboxylic, polycarboxylic acids, polysulfonic acids, P-containing acids and mixtures thereof, preferably from the group consisting of: silver nitrate, silver acetate, silver perchlorate, silver methanesulfonate, silver benzenesulfonate, silver toluenesulfonate silver trifluoromethanesulfonate, silver sulfate, silver fluoride and mixtures thereof, and more preferably is silver nitrate.

The reducing agent is selected from the group consisting of alkali, or alkaline earth metal borohydrides, such as sodium borohydride, alkali, or alkaline earth metal acyloxyborohydrides, such as sodium triacetoxyborohydride, alkali, or alkaline earth metal alkoxy- or aryloxyborohydrides, such as sodium trimethoxyborohydride, aryloxyboranes, such as catecholborane, and amine-borane complexes, such as diethylaniline borane, tert-butylamine borane, morpholine borane, dimethylamine borane, triethylamine borane, pyridine borane, ammonia borane and mixtures thereof. Sodium borohydride is most preferred.

The one or more complexing agents are selected from the group of chlor-containing compounds, which are capable to liberate chloride ions under reaction conditions, such as metal chlorides, alkyl or aryl ammonium chlorides, phosphonium chlorides; primary or secondary amines and corresponding ammonium salts, such as methyl amine or dimethylamine; ammonia and corresponding ammonium salts; and aminocarboxylic acids and their salts, such as ethylenediaminetetraacetic acid.

Non limiting examples of complexing agents include ammonia, methylamine, dimethylamine, ethylamine, ethylenediamine, diethylenetriamine, ethylene-diamine-tetraacetic acid (EDTA); ethylenediamine N,N'-disuccinic acid (EDDS); methyl glycine diacetic acid (MGDA); diethylene triamine pentaacetic acid (DTPA); propylene diamine tetracetic acid (PDTA); glutamic acid N,N-diacetic acid (N,N-dicarboxymethyl glutamic acid tetrasodium salt (GLDA); nitrilotriacetic acid (NTA), and any salts thereof; N-hydroxyethylethylenediaminetri-acetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof, such as, for example, trisodium salt of methylglycinediacetic acid ($Na_3MGDA$) and tetrasodium salt of EDTA.

The defoamer is a compound or composition, capable to suppress foam formation in the reaction mixture, such as, for example, commercially available TEGO® Foamex 1488, 1495, 3062, 7447, 800, 8030, 805, 8050, 810, 815N, 822, 825, 830, 835, 840, 842, 843, 845, 855, 860, 883, K 3, K 7, K 8, N, Antifoam SE-15 from Sigma, Struktol SB-2080 and the like. The amount of the defoamer is in the range of from 0.00001% to 5% by weight based on total weight of reaction mixture prior to hydrogen peroxide addition, preferably from 0.0001% to 3% and more preferably from 0.001% to 2% by weight.

The defoamer can be added to the solution prepared at step 1) and/or to the solution prepared at step 2).

The reaction of silver nanoplatelets formation is carried out by gradually adding the silver precursor solution to the reducing agent solution, whereas the temperature of both solutions is in the range of −3° C. to 40° C. and the gradual addition is completed within 15 minutes to 24 h time.

The silver nanoplatelets obtained at step 4) and/or 5) can be submitted to further purification and/or isolation methods, such as decantation, (ultra)filtration, (ultra)centrifugation, reversible or irreversible agglomeration, phase transfer with organic solvent, and combinations thereof. The dispersion of silver nanoplatelets may contain up to about 99 wt-% silver nanoplatelets, preferably from 5 wt-% to 99 wt-% silver nanoplatelets, more preferably from 5 wt-% to 90 wt-% silver nanoplatelets, the wt-% being based on the total weight of the dispersion.

Starting from the silver nanoplatelets obtained by purification and/or isolation, the silver nanoplatelets bearing the surface stabilizing agent of general formula (I) can be prepared by:
i) reacting $CS_2$ with an amine of formula $R^AR^BNH$ in the presence of the silver nanoplatelets and subsequent treatment with a base, ii) reacting $CS_2$ with an amine of formula $R^AR^BNH$ in the presence of the silver nanoplatelets and a base,
or iii) by reacting $CS_2$ with an amine of formula $R^AR^BNH$ and subsequent treatment with a base to obtain the dithiocarbamate of general formula (I), which is then reacted with the silver nanoplatelets.

The base is selected from alkali metal hydroxides, alkali metal alkoxides, and mixtures thereof, wherein the alkali metal is selected from sodium, potassium and cesium. Preferred examples of bases to be used in the preparation process include, but are not limited to, NaOH, KOH, CsOH, RbOH, $NaOCH_2CH_3$, $KOCH_2CH_3$, $CsOCH_2CH_3$, and mixtures thereof.

The silver nanoplatelets described herein are disclosed by the European patent application number 20206698.1 entitled "Compositions, comprising silver nanoplatelets" filed by BASF SE on Nov. 10, 2020.

The UV-Vis radiation curable security ink claimed herein contains b) a perfluoropolyether surfactant functionalized with at least a hydroxy group. Surprisingly, it has been found that the use of a perfluoropolyether functionalized with at least a hydroxy group, as surfactant in the UV-Vis radiation curable ink described herein is essential for producing security features exhibiting a metallic yellow color upon viewing in incident light. As attested for example by Table 4c and Table 5c, only UV-Vis radiation curable inks containing a perfluoropolyether surfactant functionalized with at least a hydroxy group, provide security features exhibiting a metallic yellow color upon viewing in incident light. The security features produced with a UV-Vis radiation curable ink lacking a surfactant (for e.g.: ink C16), or comprising either a perfluoropolyether surfactant lacking a hydroxy functional group (for e.g. inks C7-C9), or a surfactant lacking the perfluoropolyether backbone in addition to the hydroxy functional group (for e.g. inks C10-C15) show a brown to dark brown color in reflection, which is not eye-catching for the layperson, and therefore not suitable for a dichroic security feature for securing a value document.

The perfluoropolyether surfactant functionalized with at least a hydroxy group comprises a perfluoropolyether backbone and one or more, preferably two or more, terminal hydroxy functional groups and is characterized by an average molecular weight (Mn) below about 2000 [g/mol]. As used herein, a perfluoropolyether backbone denotes a residue of a perfluoropolyether polymer comprising randomly distributed recurring units selected from perfluoromethyleneoxy ($—CF_2O—$) and perfluoroethyleneoxy ($—CF_2—CF_2O—$). The perfluoropolyether residue is connected to the terminal functional group directly or via a spacer selected from methylene(oxyethylene), 1,1-difluoroethylene-(oxyethylene), methylene-di(oxyethylene), 1,1-difluoroethylene-di(oxyethylene), methylene-tri(oxyethylene), 1,1-difluoroethylene-tri(oxyethylene), methylene-tetra(oxyethylene), 1,1-difluoroethylene-tetra(oxyethylene), methylene-penta(oxyethylene), and 1,1-difluoroethylene-penta(oxyethylene).

Preferably, the perfluoropolyether surfactant functionalized with at least a hydroxy group is a compound of general formula (V) having an average molecular weight from about 800 [g/mol] to about 2000 [g/mol]

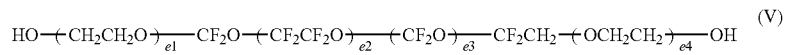
(V)

wherein
e1 and e4 are independently of each other an integer comprised between 0 and 6, preferably comprised between 0 and 4; and e2 and e3 are chosen so that the average molecular weight is comprised between about 800 [g/mol] to about 2000 [g/mol]. In a preferred embodiment, the sum of the integers e1 and e4 is comprised between 3 and 9.

Preferably, the perfluoropolyether surfactant described herein is present in the UV-Vis radiation curable in an amount from about 0.025 wt-% to about 5 wt-%, preferably from about 0.05 wt-% to about 2.5 wt-%, more preferably from about 0.05 wt-% to about 1.0 wt-%, wherein the weight percents are based on the total weight of the UV-Vis radiation curable ink.

The UV-Vis radiation curable security ink claimed herein contains c) from about 3 wt-% to about 12 wt-% of a polyvinyl chloride copolymer containing at least 69 wt-% of vinyl chloride, preferably at least 75 wt-% of vinyl chloride. UV-Vis radiation curable security inks containing no polyvinyl chloride copolymer provide security features with non-attractive colors, such as brown or dark brown, and low chroma value C* upon viewing in incident light and consequently, are not suitable to be used for the production of security feature showing a metallic yellow color in incident light.

It is preferred that the polyvinyl chloride copolymer contains at the most 90 wt-% of vinyl chloride.

Preferably, the polyvinyl chloride copolymer containing at least 69 wt-% of vinyl chloride is present in the security ink claimed herein in an amount from about 4.9 wt-% to about 11.6 wt-%, and most preferably from about 6 wt-% to about 8.6 wt-%, wherein the weight percents are based on the total weight of the UV-Vis radiation curable ink.

Preferably, the polyvinyl chloride copolymer is selected from the group consisting of vinyl chloride-vinyl acetate copolymer, and vinyl chloride-hydroxyacrylate copolymer, such as vinyl chloride-hydroxyalkylacrylate-Z-alkylenedioic acid, dialkyl ester copolymer, including vinyl chloride-2-hydroxypropyl acrylate-2-butenedioic acid (Z)—, dibutyl ester copolymer. The polyvinyl chloride copolymer has preferably an average molecular weight of between $3*10^4$ g/mol and about $8*10^4$ g/mol as determined by size exclusion chromatography using polystyrene as standard and tetrahydrofuran as solvent. Particularly suitable examples of polyvinyl chloride copolymer for the present invention are commercially available under the name Vinnol® H14/36, and Vinnol® E22/48A from Wacker.

In an embodiment according to the present invention, the UV-Vis radiation curable security ink claimed herein is a cationically curable ink (i.e. an ink containing exclusively cationically curable monomers and no radically curable monomers) and comprises d1) from about 25 wt-% to about 55 wt-% of a cycloaliphatic epoxide, and from about 1 wt-% to about 10 wt-% of a cationic photoinitiator; and optionally e) a cationically curable compound selected from the group consisting of:
  e1) a vinyl ether having two vinyloxy residues in an amount lower than 50% of the weight percent (wt-%) of the cycloaliphatic epoxide of d);
  e2) a vinyl ether having one vinyloxy residue in an amount lower than about 5 wt-%, preferably lower than or equal to about 4.1 wt-%;
  e3) an epoxide other than a cycloaliphatic epoxide in an amount lower than about 10 wt-%;
  e4) an oxetane having two oxetanyl residues in an amount lower than about 20 wt-%;
  e5) an oxetane having one oxetanyl residue in an amount lower than about 3.5 wt-%, preferably lower than or equal to about 3.3 wt-%; and
  e6) a mixture of e1) and/or e2) and/or e3) and/or e4) and/or e5); the weight percents being based on the total weight of the UV-Vis radiation curable security ink. Thus, an embodiment according to the present invention relates to a UV-Vis radiation cationically curable security ink for producing a security feature exhibiting a blue color upon viewing in transmitted light and a metallic yellow color upon viewing in incident light, wherein said ink comprises:
a) from about 7.5 wt-% to about 20 wt-% of silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy, and
wherein the silver nanoplatelets bear a surface stabilizing agent of general formula (I)

wherein
the residue $R^A$ is a $C_2$-$C_4$alkyl group substituted with a hydroxy group;
the residue $R^B$ is selected from a $C_1$-$C_4$ alkyl group, and a $C_2$-$C_4$alkyl group substituted with a hydroxy group; and $Cat^+$ is a cation selected from the group consisting of $Na^+$, $K^+$, $Cs^+$ and $Rb^+$;
  b) a perfluoropolyether surfactant functionalized with at least a hydroxy group;
  c) from about 3 wt-% to about 12 wt-% of a polyvinyl chloride copolymer containing at least 69 wt-% of vinyl chloride;
  d1) from about 25 wt-% to about 55 wt-% of a cycloaliphatic epoxide, and from about 1 wt-% to about 10 wt-% of a cationic photoinitiator; and optionally
  e) a cationically curable compound selected from the group consisting of:
    e1) a vinyl ether having two vinyloxy residues in an amount lower than 50% of the weight percent (wt-%) of the cycloaliphatic epoxide of d);
    e2) a vinyl ether having one vinyloxy residue in an amount lower than about 5 wt-%, preferably lower than or equal to about 4.1 wt-%;
    e3) an epoxide other than a cycloaliphatic epoxide in an amount lower than about 10 wt-%;
    e4) an oxetane having two oxetanyl residues in an amount lower than about 20 wt-%;
    e5) an oxetane having one oxetanyl residue in an amount lower than about 3.5 wt-%, preferably lower than or equal to about 3.3 wt-%; and
    e6) a mixture of e1) and/or e2) and/or e3) and/or e4) and/or e5); the weight percents being based on the total weight of the UV-Vis radiation curable security ink.

In an alternative embodiment according to the present invention, the UV-Vis radiation curable security ink claimed herein is a hybrid curable ink (i.e. an ink comprising both cationically curable monomers and radically curable monomers) and comprises d2) from about 30 wt-% to about 65 wt-% of a mixture of a cycloaliphatic epoxide and a radically curable compound, from about 1 wt-% to about 6 wt-% of a cationic photoinitiator, and from about 1 wt-% to about 6 wt-% of a free radical photoinitiator; and optionally e) a cationically curable compound selected from the group consisting of:
   e1) a vinyl ether having two vinyloxy residues in an amount lower than 50% of the weight percent (wt-%) of the cycloaliphatic epoxide of d);
   e2) a vinyl ether having one vinyloxy residue in an amount lower than about 5 wt-%, preferably lower than or equal to about 4.1 wt-%;
   e3) an epoxide other than a cycloaliphatic epoxide in an amount lower than about 10 wt-%;
   e4) an oxetane having two oxetanyl residues in an amount lower than about 20 wt-%;
   e5) an oxetane having one oxetanyl residue in an amount lower than about 3.5 wt-%, preferably lower than or equal to about 3.3 wt-%; and
   e6) a mixture of e1) and/or e2) and/or e3) and/or e4) and/or e5); the weight percents being based on the total weight of the UV-Vis radiation curable security ink. Hence, an embodiment according to the present invention is directed to a UV-Vis radiation hybrid curable security ink for producing a security feature exhibiting a blue color upon viewing in transmitted light and a metallic yellow color upon viewing in incident light, wherein said ink comprises:
a) from about 7.5 wt-% to about 20 wt-% of silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy, and
wherein the silver nanoplatelets bear a surface stabilizing agent of general formula (I)

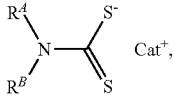
(I)

wherein
the residue $R^A$ is a $C_2$-$C_4$ alkyl group substituted with a hydroxy group;
the residue $R^B$ is selected from a $C_1$-$C_4$ alkyl group, and a $C_2$-$C_4$ alkyl group substituted with a hydroxy group; and
$Cat^+$ is a cation selected from the group consisting of $Na^+$, $K^+$, $Cs^+$ and $Rb^+$;
   b) a perfluoropolyether surfactant functionalized with at least a hydroxy group;
   c) from about 3 wt-% to about 12 wt-% of a polyvinyl chloride copolymer containing at least 69 wt-% of vinyl chloride;
   d2) from about 30 wt-% to about 65 wt-% of a mixture of a cycloaliphatic epoxide and a radically curable compound, from about 1 wt-% to about 6 wt-% of a cationic photoinitiator, and from about 1 wt-% to about 6 wt-% of a free radical photoinitiator; and optionally
   e) a cationically curable compound selected from the group consisting of:
      e1) a vinyl ether having two vinyloxy residues in an amount lower than 50% of the weight percent (wt-%) of the cycloaliphatic epoxide of d);
      e2) a vinyl ether having one vinyloxy residue in an amount lower than about 5 wt-%, preferably lower than or equal to about 4.1 wt-%;
      e3) an epoxide other than a cycloaliphatic epoxide in an amount lower than about 10 wt-%;
      e4) an oxetane having two oxetanyl residues in an amount lower than about 20 wt-%;
      e5) an oxetane having one oxetanyl residue in an amount lower than about 3.5 wt-%, preferably lower than or equal to about 3.3 wt-%; and
      e6) a mixture of e1) and/or e2) and/or e3) and/or e4) and/or e5); the weight percents being based on the total weight of the UV-Vis radiation curable security ink. If the hybrid ink claimed herein contains only the cycloaliphatic epoxide described herein as a cationically curable monomer, the ratio between the weight percent (wt-%) of the radically curable compound and the weight percent (wt-%) of the cycloaliphatic epoxide is preferably lower than 1.6:1, more preferably lower than 1:1, and even more preferably lower than 0.5:1. If the hybrid ink claimed herein contains the cycloaliphatic epoxide described herein and the cationically curable compound described herein as cationically curable monomers, the ratio between the weight percent (wt-%) of the radically curable compound and the sum of the weight percent (wt-%) of the cycloaliphatic epoxide and of the weight percent (wt-%) of the cationically curable compound is preferably lower than 1.6:1, more preferably lower than 1:1, and even more preferably lower than 0.5:1.

Advantageously, the UV-Vis radiation cationically curable security ink claimed herein and the UV-Vis radiation hybrid curable security ink claimed herein provide security features with improved mechanical resistance properties compared to the security features known in the art, which are obtained from UV radically curable inks or solvent-based inks, and particularly from UV radically curable inks or solvent-based inks containing high concentrations of silver nanoplatelets.

The security inks claimed herein contain either d1) from about 25 wt-% to about 55 wt-% of a cycloaliphatic epoxide, and from about 1 wt-% to about 10 wt-% of a cationic photoinitiator; or d2) from about 30 wt-% to about 65 wt-% of a mixture of a cycloaliphatic epoxide and a radically curable compound, from about 1 wt-% to about 6 wt-% of a cationic photoinitiator, and from about 1 wt-% to about 6 wt-% of a free radical photoinitiator, the weight percents being based on the total weight of the UV-Vis radiation curable security ink.

As known to the skilled person, the cationically curable monomers are cured by cationic mechanisms consisting of the activation by UV-Vis light of one or more photoinitiators, which liberate cationic species, such as acids, which in turn initiate the polymerization of the monomer so as to form a cured binder.

As well known to the skilled person, a cycloaliphatic epoxide is a cationically curable monomer containing at least a substituted or unsubstituted epoxycyclohexyl residue:

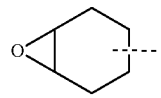

Preferably, the cycloaliphatic epoxide described herein comprises at least one cyclohexane ring, and at least two epoxide groups. More preferably, the cycloaliphatic epoxide is a compound of general formula (VI):

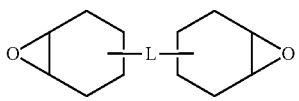

(VI)

wherein -L- represents a single bond or a divalent group comprising one or more atoms. The cycloaliphatic epoxide of general formula (VI) is optionally substituted by one or more linear or branched alkyl radicals containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl).

In the general formula (VI), the divalent group -L- may be a straight- or branched-chain alkylene group comprising from one to eighteen carbon atoms. Examples of said straight- or branched-chain alkylene group include without limitation methylene group, methylmethylene group, dimethylmethylene group, ethylene group, propylene group, and trimethylene group.

In the general formula (VI), the divalent group -L- may be a divalent alicyclic hydrocarbon group or cycloalkydene group such as 1,2-cyclopentylene group, 1,3-cyclopentylene group, cyclopentylidene group, 1,2-cyclohexylene group, 1,3-cyclohexylene group, 1,4-cyclohexylene group, and cyclohexylidene group.

In the general formula (VI), -L- may be a divalent group comprising one or more oxygen-containing linkage groups, wherein said oxygen-containing linkage groups are selected from the group consisting of —C(=O)—, —OC(=O)O—, —C(=O)O—, and —O—. Preferably, the cycloaliphatic epoxide is a cycloaliphatic epoxide of general formula (VI), wherein -L- is a divalent group comprising one or more oxygen-containing linkage groups, wherein said oxygen-containing linkage groups are selected from the group consisting of —C(=O)—, —OC(=O)O—, —C(=O)O—, and —O—, and more preferably a cycloaliphatic epoxide of general formula (VI-a), (VI-b), or (VI-c), as defined below:

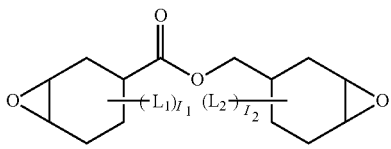

(VI-a)

wherein
$L^1$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);
$L^2$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl); and
$I1$ and $I2$ are independently of each other integers comprised between 0 and 9, preferably comprised between 0 and 3;

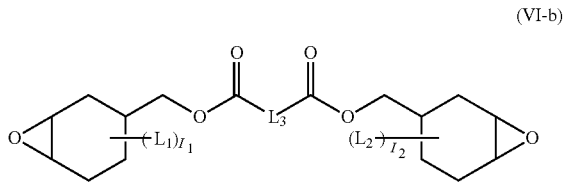

(VI-b)

wherein
$L^1$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl);
$L^2$ can be the same, or different in each occurrence and is a linear or branched alkyl radical containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl); and
$I1$ and $I2$ are independently of each other integers comprised between 0 and 9, preferably comprised between 0 and 3;
$-L^3-$ is a single bond or a linear or branched divalent hydrocarbon group containing from one to ten carbon atoms, and preferably containing from three to eight carbon atoms, such as alkylene groups including trimethylene, tetramethylene, hexamethylene, and 2-ethylhexylene, and cycloalkylene groups such as 1,2-cyclohexylene group, 1,3-cyclohexylene group, and 1,4-cyclohexylene group, and cyclohexylidene group;

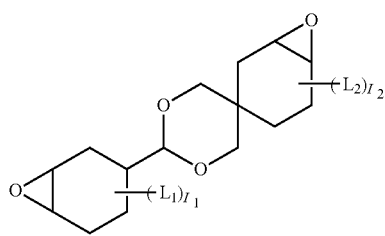

(VI-c)

wherein
$L^1$ can be the same, or different in each occurrence and is a linear or branched alkyl radical containing from one to three carbon atoms, such as methyl, ethyl, n-propyl, and i-propyl;
$L^2$ can be the same, or different in each occurrence and is a linear or branched alkyl radical containing from one to three carbon atoms, such as methyl, ethyl, n-propyl, and i-propyl; and
$I1$ and $I2$ are independently of each other integers comprised between 0 and 9, preferably comprised between 0 and 3.

Preferred cycloaliphatic epoxides of general formula (VI-a) include, but are not limited to: 3,4-epoxycyclohexylmethyl-3,4-epoxycyclohexanecarboxylate, 3,4-epoxy-6-methyl-cyclohexylmethyl-3,4-epoxy-6-methylcyclohexanecarboxylate, 3,4-epoxy-2-methyl-cyclohexylmethyl-3,4-epoxy-2-methylcyclohexanecarboxylate, and 3,4-epoxy-4-methyl-cyclohexylmethyl-3,4-epoxy-4-methylcyclohexanecarboxylate.

Preferred cycloaliphatic epoxides of general formula (VI-b) include, but are not limited to: bis(3,4-epoxycyclohexyl-methyl)adipate, bis(3,4-epoxy-6-methylcyclohexylmethyl) adipate, bis(3,4-epoxycyclohexylmethyl)oxalate, bis(3,4-epoxycyclohexylmethyl)pimelate, and bis(3,4-epoxycyclohexylmethyl)sebacate.

A preferred cycloaliphatic epoxide of general formula (VI-c) is 2-(3,4-epoxycyclohexyl-5,5-spiro-3,4-epoxy)cy-clohexane-meta-dioxane.

Further cycloaliphatic epoxides include a cycloaliphatic epoxide of general formula (VII-a) and a cycloaliphatic epoxide of general formula (VII-b), which are optionally substituted by one or more linear or branched alkyl groups containing from one to ten carbon atoms (such as methyl, ethyl, n-propyl, i-propyl, n-butyl, i-butyl, s-butyl, t-butyl, hexyl, octyl, and decyl), and preferably containing from one to three carbon atoms (such as methyl, ethyl, n-propyl, and i-propyl).

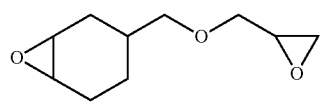

(VII-a)

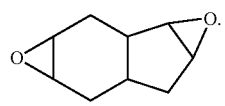

(VII-b)

The cycloaliphatic epoxides described herein may be hydroxy modified or (meth)acrylate modified. Examples are commercially available under the name Cyclomer A400 (CAS: 64630-63-3) and Cyclomer M100 (CAS number: 82428-30-6) by Daicel Corp., or TTA 15 and TTA1646 by TetraChem/Jiangsu.

The cationic photoinitiator (also referred in the art as photo-acid generator) used in the UV-Vis radiation curable ink claimed herein is an onium salt preferably selected from the group consisting of azonium salts, oxonium salts, iodonium salts, sulfonium salts and mixtures thereof, more preferably selected from the group consisting of oxonium salts, iodonium salts, sulfonium salts, and mixtures thereof, and even more preferably selected from the group consisting of sulfonium salts, iodonium salts, and mixtures thereof.

The iodonium salts described herein have a cationic moiety and an anionic moiety, wherein the anionic moiety is preferably $BF_4^-$, $B(C_6F_5)_4^-$, $PF_6^-$, $AsF_6^-$, $SbF_6^-$ or $CF_3SO_3^-$, more preferably $SbF_6^-$ and wherein the cationic moiety is preferably an aromatic iodonium ion, more preferably a iodonium ion comprising two aryl groups, wherein the two aryl groups may be independently substituted by one or more alkyl groups (such as for example methyl, ethyl, isobutyl, tertbutyl, etc.), one or more alkoxy groups, one or more nitro groups, one or more halogen containing groups, one or more hydroxy groups or a combination thereof, preferably by one or more alkyl groups. Particularly suitable iodonium salts for the present invention are commercially available known under the name DEUTERON UV 1240, DEUTERON UV 1242, DEUTERON UV 2257, DEUTERON UV 1250, and DEUTERON UV 3100, all available from DEUTERON, OMNICAT 250, OMNICAT 440, and OMNICAT 445, all available from IGM Resins, SpeedCure 937, SpeedCure 938 and SpeedCure 939, all available from Lambson.

The sulfonium salts described herein have a cationic moiety and an anionic moiety, wherein the anionic moiety is preferably $BF_4^-$, $B(C_6F_5)_4^-$, $PF_6^-$, $(PF_{6-h}(C_jF_{2j-1})_h)^-$ (where h is an integer from 1 to 5, and j is an integer from 1 to 4), $AsF_6^-$, $SbF_6^-$, $CF_3SO_3^-$, perfluoroalkyl sulfonate or pentafluoro-hydroxyantimonate, more preferably $SbF_6^-$ and wherein the cationic moiety is preferably an aromatic sulfonium ion, more preferably a sulfonium ion comprising two or more aryl groups, wherein the two or more aryl groups may be independently substituted by one or more alkyl groups (such as for example methyl, ethyl, isobutyl, tert-butyl, etc.) one or more alkoxy groups, one or more aryloxyl groups, one or more halogen containing groups, one or more hydroxy groups or a combination thereof. Suitable examples of sulfonium ions comprising two or more aryl groups include without limitation triarylsulfonium ions, diphenyl [4-(phenylthio)phenyl] sulfonium ion, bis[4-(diphenylsulfonio)phenyl]sulfonium ion, triphenylsulfonium ions, and tris [4-(4-acetylphenyl)sulfanylphenyl] sulfonium ion. Particularly suitable examples of sulfonium salts for the present invention are commercially available under the name SpeedCure 976, SpeedCure 976D, and SpeedCure 992, all available from Lambson, ESACURE 1187, OMNICAT 270, OMNICAT 320, OMNICAT 432 and OMNICAT 550, all available from from IGM Resins.

The oxonium salts described herein have a cationic moiety and an anionic moiety, wherein the anionic moiety is preferably $BF_4^-$, $B(C_6F_5)_4^-$, $PF_6^-$, $AsF_6^-$, $SbF_6^-$ or $CF_3SO_3^-$, more preferably $BF_4^-$ and wherein the cationic moiety is preferably an aromatic oxonium ion, more preferably a pyrilium ion preferably substituted by one or more aryl groups, wherein the one or more aryl groups may be independently of each other substituted by one or more alkyl groups (such as for example methyl, ethyl, isobutyl, tert-butyl, etc.), one or more alkoxy groups, one or more nitro groups, one or more halogen groups, one or more hydroxy groups or a combination thereof. A particularly suitable oxonium salt for the present invention is 2,4,6-triphenylpy-rilium tetrafluoroborate.

Other examples of useful cationic photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

The radically curable compound described herein is selected from a radically curable monomer, a radically curable oligomer, and mixtures thereof.

The radically curable monomer described herein is selected from the group consisting of mono(meth)acrylates, di(meth)acrylates, tri(meth)acrylates, tetra(meth)acrylates and mixtures thereof, preferably from the group consisting of tri(meth)acrylates, tetra(meth)acrylates, and mixtures thereof. The term "(meth)acrylate" in the context of the present invention refers to the acrylate as well as the corresponding methacrylate.

Preferred examples of mono(meth)acrylates include 2(2-ethoxyethoxy)ethyl (meth)acrylate, 2-phenoxyethyl (meth) acrylate, C12/C14 alkyl (meth)acrylate, C16/C18 alkyl (meth)acrylate, caprolactone (meth)acrylate, cyclic trimethylolpropane formal (meth)acrylate, nonylphenol (meth) acrylate, isobornyl (meth)acrylate, isodecyl (meth)acrylate, lauryl (meth)acrylate, stearyl (meth)acrylate, octyldecyl (meth)acrylate, tridecyl (meth)acrylate, methoxy poly(ethylene glycol) (meth)acrylate, polypropylene glycol (meth)acrylate, tetrahydrofurfuryl (meth)acrylate, 1,3-butylene glycol di(meth)acrylate, 1,4-butanediol di(meth)acrylate, 1,6-hexanediol di(meth)acrylate, 3-methyl-1,5-pentanedioldi(meth)acrylate, alkoxylated di(meth)acrylate, esterdiol di(meth)acrylate as well as mixtures thereof.

Preferred examples of di(meth)acrylates include bisphenol A di(meth)acrylates, alkoxylated (such as for example ethoxylated and propoxylated) bisphenol A di(meth)acrylate, bisphenol A diglycidyl ether di(meth)acrylate, ethylene glycol di(meth)acrylate, diethylene glycol di(meth)acrylate, triethylene glycol di(meth)acrylate, tetraethylene glycol di(meth)acrylate, dipropyleneglycol di(meth)acrylate, tripropylene glycol di(meth)acrylate, polyethylene glycol di(meth)acrylate, neopentyl glycol di(meth)acrylate, tricyclodecane dimethanol di(meth)acrylate, as well as mixtures thereof.

Preferred examples of tri(meth)acrylates include trimethylolpropane tri(meth)acrylates, alkoxylated (such as for example ethoxylated and propoxylated) trimethylolpropane tri(meth)acrylates, alkoxylated (such as for example ethoxylated and propoxylated) glycerol tri(meth)acrylates, pentaerythritol tri(meth)acrylates, alkoxylated pentaerythritol tri(meth)acrylates, alkoxylated (such as for example ethoxylated and propoxylated) pentaerythritol tri(meth)acrylates, as well as mixtures thereof.

Preferred examples of tetra(meth)acrylates include ditrimethylolpropane tetra(meth)acrylates, pentaerythritol tetra(meth)acrylates, alkoxylated (such as for example ethoxylated and propoxylated) pentaerythritol tetra(meth)acrylates and mixtures thereof, preferably selected from the group consisting of ditrimethylolpropane tetra(meth)acrylates, alkoxylated pentaerythritol tetra(meth)acrylates, as well as mixtures thereof.

As used herein, the term "radically curable oligomer" refers to a radically curable (meth)acrylate oligomer that may be branched or essentially linear, and may have terminal and/or pendant (meth)acrylate functional group(s). Preferably, the radically curable oligomer is selected from the group consisting of (meth)acrylic oligomers, urethane (meth)acrylate oligomers, polyester (meth)acrylate oligomers, polyether based (meth)acrylate oligomers, epoxy (meth)acrylate oligomers, and mixtures thereof, more preferably selected from the group consisting of polyester (meth)acrylate oligomers, epoxy (meth)acrylate oligomers, and mixtures thereof.

Suitable examples of epoxy (meth)acrylate oligomer include without limitation aliphatic epoxy (meth)acrylate oligomers, in particular mono(meth)acrylates, di(meth)acrylates and tri(meth)acrylates, and aromatic epoxy (meth)acrylate oligomers. Suitable examples of aromatic epoxy (meth)acrylate oligomers include bisphenol-A (meth)acrylate oligomers such as bisphenol-A mono(meth)acrylates, bisphenol-A di(meth)acrylates and bisphenol-A tri(meth)acrylates as well as alkoxylated (such as for example ethoxylated and propoxylated) bisphenol-A (meth)acrylate oligomers such as for example alkoxylated bisphenol-A mono(meth)acrylates, alkoxylated bisphenol-A di(meth)acrylates and alkoxylated bisphenol-A tri(meth)acrylates, preferably alkoxylated bisphenol-A di(meth)acrylates.

The free radical photoinitiator as used herein is preferably selected form the group consisting of hydroxyketones (e.g. alpha-hydroxyketones), alkoxyketones (e.g. alpha-alkoxyketones), acetophenones, benzophenones, ketosulfones, benzyl ketals, benzoin ethers, phosphine oxides, phenylglyoxylates, thioxanthones, and mixtures thereof, more preferably selected form the group consisting of phosphine oxides, hydroxyketones, thioxanthones and mixtures thereof.

Suitable alpha-hydroxyketones include without limitation (1-[4-(2-hydroxyethoxy)-phenyl]-2-hydroxy-2-methyl-1-propan-1-one), 1-hydroxycyclohexyl phenyl ketone, 2-hydroxy-2-methyl-1-phenylpropan-1-one, 2-hydroxy-2-methyl-1-(4-tert-butyl)phenylpropan-1-one, 2-hydroxy-1-[4-[[4-(2-hydroxy-2-methylpropanoyl)phenyl]methyl]phenyl]-2-methylpropan-1-one, 2-hydroxy-1-[4-[4-(2-hydroxy-2-methylpropanoyl)phenoxy]phenyl]-2-methylpropan-1-one, and oligo[2-hydroxy-2-methyl-1-[4-(1-methylvinyl)phenyl]propanone].

Suitable acetophenones include without limitation 2,2-diethoxyacetophenone, and 2-methoxy-2-phenylacetophenone.

Suitable benzophenones include without limitation benzophenone, polymeric benzophenone derivatives, 2-methylbenzophenone, 3-methylbenzophenone, 4-methylbenzophenone, 2,4,6-trimethylbenzophenone, 3,3'-dimethyl-4-methoxybenzophenone, 4-phenylbenzophenone, 4-chlorobenzophenone, methyl-2-benzoylbenzoate, 4-(4-methylphenylthio)benzophenone, 4-hydroxybenzophenone laurate, and a mixture of 50% benzophenone and 50% 1-hydroxycyclohexyl phenyl ketone.

Suitable ketosulfones include without limitation 1-[4-(4-benzoylphenylsulfanyl)phenyl]-2-methyl-2-(4-methylphenylsulfonyl)propan-1-one.

Suitable benzyl ketals include without limitation 2,2-dimethoxy-2-phenylacetophenone.

Suitable benzoin ethers include without limitation 2-ethoxy-1,2-diphenylethanone, 2-isopropoxy-1,2-diphenylethanone, 2-isobutoxy-1,2-diphenylethanone, 2-butoxy-1,2-diphenylethanone, 2,2-dimethoxy-1,2-diphenylethanone, and 2,2-diethoxyacetophenone.

Suitable phosphine oxides include without limitation 2,4,6-trimethylbenzoyldiphenylphosphine oxide, ethyl phenyl (2,4,6-trimethylbenzoyl)phenylphosphinate, phenylbis(2,4,6-trimethylbenzoyl)phosphine oxide, bis(2,6-dimethoxybenzoyl)-2,4,4-trimethylpentylphosphine oxide, substituted acyl-phosphine oxides, a mixture of diphenyl(2,4,6-trimethylbenzoyl)phosphine oxide and 2-hydroxy-2-methylpropiophenone, a mixture of phenylbis(2,4,6-trimethylbenzoyl)phosphine oxide and 2-hydroxy-2-methylpropiophenone, a mixture of ethyl(2,4,6-trimethylbenzoyl)phenylphosphinate and 2-hydroxy-2-methylpropiophenone, and a mixture of phenylbis(2,4,6-trimethylbenzoyl)phosphine oxide and ethyl phenyl(2,4,6-trimethylbenzoyl)phenylphosphinate.

Suitable thioxanthones include without limitation 2-methyl thioxanthone, 2,4-diethylthioxanthone, 2-isopropylthioxanthone, 1-chloro-4-propoxythioxanthone, and polymeric thioxanthone derivatives.

Suitable phenylglyoxylates include without limitation methyl benzoylformate, 2-[2-oxo-2-phenyl-acetoxy-ethoxy]ethyl 2-oxo-2-phenylacetate, and a mixture of 2-[2-oxo-2-phenyl-acetoxy-ethoxy]ethyl 2-oxo-2-phenylacetate and oxy-phenyl-acetic acid 2-[2-hydroxy-ethoxy]-ethyl ester.

Preferably, the free radical photoinitiator is a mixture of phosphine oxides described herein, and more preferably a mixture of phenylbis(2,4,6-trimethylbenzoyl)phosphine oxide and ethyl phenyl(2,4,6-trimethylbenzoyl)phenylphosphinate.

The UV-Vis radiation curable security ink claimed herein may contain e) a cationically curable compound selected from the group consisting of:

e1) a vinyl ether having two vinyloxy residues in an amount lower than 50% of the weight percent (wt-%) of the cycloaliphatic epoxide of d);
e2) a vinyl ether having one vinyloxy residue in an amount lower than about 5 wt-%, preferably lower than or equal to about 4.1 wt-%;
e3) an epoxide other than a cycloaliphatic epoxide in an amount lower than about 10 wt-%;
e4) an oxetane having two oxetanyl residues in an amount lower than about 20 wt-%;
e5) an oxetane having one oxetanyl residue in an amount lower than about 3.5 wt-%, preferably lower than or equal to about 3.3 wt-%; and
e6) a mixture of e1) and/or e2) and/or e3) and/or e4) and/or e5); the weight percents being based on the total weight of the UV-Vis radiation curable security ink. Preferably, the cationically curable compound consists of:
e1) a vinyl ether having two vinyloxy residues in an amount lower than 50% of the weight percent (wt-%) of the cycloaliphatic epoxide of d);
e3) an epoxide other than a cycloaliphatic epoxide in an amount lower than about 10 wt-%;
e4) an oxetane having two oxetanyl residues in an amount lower than about 20 wt-%;
or e6) a mixture of e1) and/or e3) and/or e4); the weight percents being based on the total weight of the UV-Vis radiation curable security ink.

In a specific embodiment according to the present invention, the cationically curable compound consists of: e1) a vinyl ether having two vinyloxy residues in an amount lower than 50% of the weight percent (wt-%) of the cycloaliphatic epoxide of d); or e6) a mixture of e1) and e2); a mixture of e1) and e3); a mixture of e1) and e4); a mixture of e1) and e5); a mixture of e1), e2) and e3); a mixture of e1), e2) and e4); a mixture of e1), e2) and e5); a mixture of e1), e3) and e4); a mixture of e1), e3) and e5); or a mixture of e1), e4) and e5); the weight percents being based on the total weight of the UV-Vis radiation curable security ink. In a more specific embodiment according to the present invention, the cationically curable compound is selected from the group consisting of: e1) a vinyl ether having two vinyloxy residues in an amount lower than 50% of the weight percent (wt-%) of the cycloaliphatic epoxide of d); and e6) a mixture of e1) and e3); a mixture of e1) and e4); and a mixture of e1), e3) and e4); the weight percents being based on the total weight of the UV-Vis radiation curable security ink. As attested for example by Table 2c, security inks according to the present invention containing a mixture of cycloaliphatic epoxide and vinyl ether having two vinyloxy residues as cationically curable monomers and having a ratio between the wt-% of the vinyl ether and the wt-% of the cycloaliphatic epoxide lower than about 0.5 provide dichroic security features showing a metallic yellow color upon viewing in incident light and a blue color upon viewing in transmitted light. The metallic yellow color upon viewing in incident light cannot be achieved with inks containing a mixture of cycloaliphatic epoxide and vinyl ether having two vinyloxy as cationically curable monomers and having a ratio between the wt-% of the vinyl ether and the wt-% of the cycloaliphatic epoxide higher than or equal to 0.5 as shown for example by Table 2c. Such inks provide features with dark brown to brown color and low chroma in reflection, which are not not eye-catching for the layperson and therefore, not suitable for a dichroic security feature for securing a value document. Preferably, the vinyl ether having two vinyloxy residues is present in an amount lower than or equal to 49%, 48%, 47%, 46%, 45% of the weight percent (wt-%) of the cycloaliphatic epoxide; the weight percents being based on the total weight of the UV-Vis radiation curable security ink.

Thus, a preferred embodiment according to the present invention relates to a security ink comprising:
a) from about 7.5 wt-% to about 20 wt-% of silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy, and wherein the silver nanoplatelets bear a surface stabilizing agent of general formula (I)

wherein
the residue $R^A$ is a $C_2$-$C_4$alkyl group substituted with a hydroxy group;
the residue $R^B$ is selected from a $C_1$-$C_4$ alkyl group, and a $C_2$-$C_4$alkyl group substituted with a hydroxy group; and
$Cat^+$ is a cation selected from the group consisting of $Na^+$, $K^+$, $Cs^+$ and $Rb^+$;
b) a perfluoropolyether surfactant functionalized with at least a hydroxy group;
c) from about 3 wt-% to about 12 wt-% of a polyvinyl chloride copolymer containing at least 69 wt-% of vinyl chloride;
d) d1) from about 30 wt-% to about 55 wt-% of a cycloaliphatic epoxide, and from about 1 wt-% to about 10 wt-% of a cationic photoinitiator; or
d2) from about 35 wt-% to about 65 wt-% of a mixture of a cycloaliphatic epoxide and a radically curable compound, from about 1 wt-% to about 6 wt-% of a cationic photoinitiator, and from about 1 wt-% to about 6 wt-% of a free radical photoinitiator; and optionally
e) a cationically curable compound selected from the group consisting of:
e1) a vinyl ether having two vinyloxy residues in an amount lower than 50% of the weight percent (wt-%) of the cycloaliphatic epoxide of d); and
e6) a mixture of e1) a vinyl ether having two vinyloxy residues in an amount lower than 50% of the weight percent (wt-%) of the cycloaliphatic epoxide of d) and e3) an epoxide other than a cycloaliphatic epoxide in an amount lower than about 10 wt-%;
a mixture of e1) a vinyl ether having two vinyloxy residues in an amount lower than 50% of the weight percent (wt-%) of the cycloaliphatic epoxide of d) and e4) an oxetane having two oxetanyl residues in an amount lower than about 20 wt-%; or
a mixture of e1) a vinyl ether having two vinyloxy residues in an amount lower than 50% of the weight percent (wt-%) of the cycloaliphatic epoxide of d), e3) an epoxide other than a cycloaliphatic epoxide in an amount lower than about 10 wt-%, and e4) an oxetane having two oxetanyl residues in an amount lower than about 20 wt-%; the weight percents being based on the total weight of the UV-Vis radiation curable security ink.

In an alternative embodiment, the cationically curable compound consists of e3) an epoxide other than a cycloaliphatic epoxide in an amount lower than about 10 wt-%; or e6) a mixture of e3) and e1); a mixture of e3) and e2); a mixture of e3) and e4); a mixture of e3) and e5); a mixture of e3), e1) and e2); a mixture of e3), e1) and e4); a mixture of e3), e1) and e5); a mixture of e3), e2) and e4); a mixture of e3), e2) and e5); or a mixture of e3), e4) and e5); the weight percents being based on the total weight of the UV-Vis radiation curable security ink. In a more specific embodiment according to the present invention, the cationically curable compound consists of e3) an epoxide other than a cycloaliphatic epoxide in an amount lower than about 10 wt-%; or e6) a mixture of e1) and e3); a mixture of e3) and e4), or a mixture of e1), e3) and e4); the weight percents being based on the total weight of the UV-Vis radiation curable security ink.

In an alternative embodiment, the cationically curable compound consists of e4) an oxetane having two oxetanyl residues in an amount lower than about 20 wt-%; or e6) a mixture of e4) and e1); a mixture of e4) and e2); a mixture of e4) and e3); a mixture of e4) and e5); a mixture of e4), e1) and e2); a mixture of e4), e1) and e3); a mixture of e4), e1) and e5); a mixture of e4), e2) and e3); a mixture of e4), e2) and e5); or a mixture of e3), e4) and e5); the weight percents being based on the total weight of the UV-Vis radiation curable security ink. In a more specific embodiment according to the present invention, the cationically curable compound consists of e4) an oxetane having two oxetanyl residues in an amount lower than about 20 wt-%; or e6) a mixture of e4) and e1); a mixture of e4) and e3); or a mixture of e1), e3) and e4); the weight percents being based on the total weight of the UV-Vis radiation curable security ink.

As well known to the skilled person, a vinyl ether is a cationically curable monomer containing at least a vinyloxy ($CH_2$=CH—O—) residue. Vinyl ethers are known in the art to accelerate curing and reduce tackiness, thus limiting the risk of blocking and set-off when the printed sheets are put in stacks just after printing and curing. They also improve the physical and chemical resistance of the printed security element and enhance the flexibility of the printed and cured ink layer and its adhesion to the substrate, which is particularly advantageous for printing on plastic and polymer substrates. Vinyl ethers also help in reducing the viscosity of the ink while strongly co-polymerizing with the ink vehicle.

As used herein, "a vinyl ether having one vinyloxy residue" refers to a cationically curable monomer having one vinyloxy residue. Examples of vinyl ethers having one vinyloxy residue include methyl vinyl ether, ethyl vinyl ether, n-propyl vinyl ether, n-butyl vinyl ether, iso-butyl vinyl ether, ethylhexyl vinyl ether, octadecyl vinyl ether, dodecyl vinyl ether, isopropyl vinyl ether, tert-butyl vinyl ether, tert-amyl vinyl ether, cyclohexyl vinyl ether, cyclohexanedimethanol monovinyl ether, 4-(vinyloxy methyl) cyclohexylmethyl benzoate, phenyl vinyl ether, methylphenyl vinyl ether, methoxyphenyl vinyl ether, 2-chloroethyl vinyl ether, 2-hydroxyethyl vinyl ether, 4-hydroxybutyl vinyl ether, 1,6-hexanediol monovinyl ether, ethylene glycol monovinyl ether, 4-(vinyloxy)butyl benzoate, 4-(vinyloxy) butyl stearate, diethylene glycol monovinyl ether, ethylene glycol butylvinyl ether, triethylene glycol methyl vinyl ether, triethylene glycol monobutyl vinylether, and polyethyleneglycol-520 methyl vinyl ether. Suitable vinyl ethers having one vinyloxy residue are commercially sold by BASF under the designation EVE, IBVE, DDVE, ODVE, BDDVE, CHVE, HBVE. The vinyl ether having one vinyloxy residue may be hydroxy modified or (meth)acrylate modified (for example: VEEA, 2-(2-vinyloxyethoxy)ethyl acrylate from Nippon Shokubai (CAS: 86273-46-3)).

As used herein "a vinyl ether having two vinyloxy residues" refers to a cationically curable monomer containing two vinyloxy ($CH_2$=CH—O—) residues connected via a divalent group containing one or more atoms.

Preferably, the vinyl ether having two vinyloxy residues is a compound having two vinyloxy ($CH_2$=CH—O—) residues connected via a divalent group containing 2 to 20 carbon atoms, and optionally one or more oxygen atoms. More preferably, the vinyl ether having two vinyloxy residues used in the UV-Vis radiation curable security ink claimed herein is a compound of general formula (VIII)

(VIII)

wherein
—F— is selected from the group consisting of: —$(CH_2)_{f1}$—, —$(CH_2)_{f2}$—$(O(CH_2)_{f2})_{f3}$—,

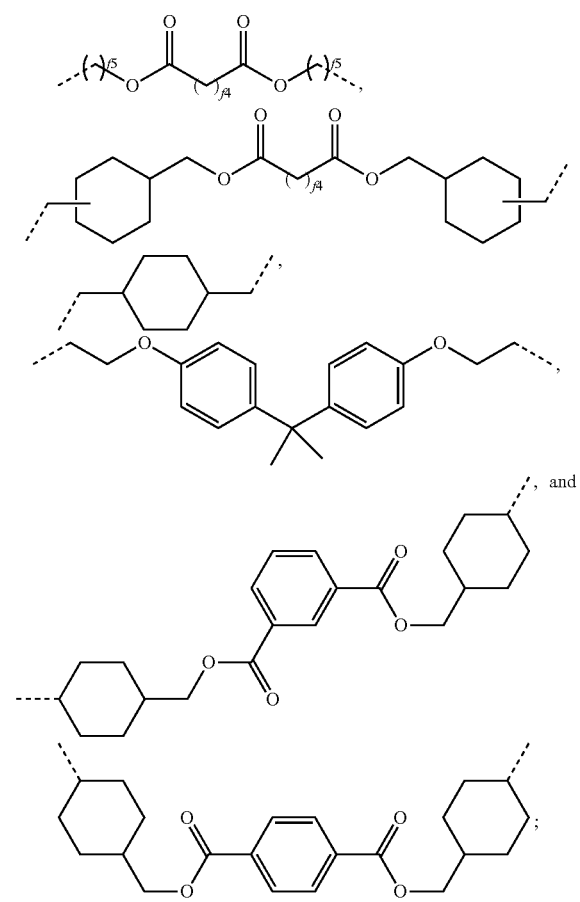

f1 is an integer of between 1 to 10;
f2 is an integer of between 2 to 4;
f3 is an integer of between 1 to 3; and
f4 and f5 are independently of each other integers of between 2 and 6.

Preferably, —F— is selected from the group consisting of: —(CH$_2$)$_{f2}$—(O(CH$_2$)$_{f2}$)$_{f3}$—, and

wherein f2 and f3 have the meanings defined herein.

More preferably, —F— is selected from the group consisting of: —(CH$_2$)$_2$—(O(CH$_2$)$_2$)$_{f3}$—, and

wherein f3 is an integer of between 1 to 3, preferably of between 1 and 2.

Preferred examples of vinyl ethers having two vinyloxy residues include but are not limited to cyclohexanedimethanol divinyl ether, 1,4-butanediol divinyl ether, 1,6-hexanediol divinyl ether, ethylene glycol divinyl ether, diethylene glycol divinyl ether, dipropylene glycol divinyl ether, triethylene glycol divinyl ether, tetraethylene glycol divinyl ether, poly(tetrahydrofuran) divinyl ether, bis[4-(vinyl oxy)butyl]adipate, bis[4-(vinyloxy)butyl]succinate, bis[4-(vinyloxymethyl)cyclohexylmethyl]glutarate, 2,2-bis(4-vinyloxyethoxyphenyl)propane, bis[4-(vinyloxy)methyl]cyclohexyl] methyl] terephthalate, and bis[4-(vinyloxy)methyl]cyclohexyl]methyl] isophthalate. Suitable vinyl ethers having two vinyloxy residues are commercially sold by BASF under the designation BDDVE, DVE-2, DVE-3, and CHDM-di.

As well known to the person skilled in the art an epoxide is a cationically curable monomer containing at least an epoxy residue

The use of epoxides in the UV-Vis radiation curable ink aids in accelerating curing and reducing tackiness, as well as in reducing the viscosity of the ink while strongly co-polymerizing with the ink vehicle. Preferred examples of an epoxide other than a cycloaliphatic epoxide as described herein include, but are not limited to, cyclohexane dimethanol diglycidylether, poly(ethyleneglycol) diglycidyl ether, poly(propyleneglycol) diglycidyl ether, butanediol diglycidyl ether, hexanediol diglycidyl ether, bisphenol-A diglycidyl ether, neopentylglycol diglycidylether, trimethylolpropane triglycidyl ether, glycerol triglycidyl ether, pentaerythritol tetraglycidyl ether, butyl glycidyl ether, p-tert-butyl phenyl glycidyl ether, hexadecyl glycidyl ether, 2-ethyl-hexyl glycidyl ether, octyl glycidyl ether, decyl glycidyl ether, dodecyl glycidyl ether, tetradecyl glycidyl ether, C$_{12}$/C$_{14}$-alkyl glycidyl ether, C$_{13}$/C$_{15}$-alkyl glycidyl ether and mixtures thereof. Suitable epoxides other than a cycloaliphatic epoxide are commercially sold by EMS Griltech under the trademark Grilonit® (e.g. Grilonit® V51-63 or RV 1806).

As well known to the person skilled in the art an oxetane is a cationically curable monomer containing at least an unsubstituted or substituted oxetanyl residue, preferably an unsubstituted or substituted 3-oxetanyl residue:

As used herein, "an oxetane having one oxetanyl residue" refers to a cationically curable monomer having one substituted or unsubstituted oxetanyl residue. Preferably, the oxetane having one oxetanyl residue is of general formula (IX)

(IX)

wherein
R$^{20}$ is selected from —H, phenyl, o-methoxy-phenyl, m-methoxy-phenyl and p-methoxy-phenyl;
R$^{21}$ is selected from —H, methyl, and ethyl; and
R$^{22}$ is selected from —H, methyl, ethyl, —CH$_2$—OR$^{23}$; and
R$^{23}$ is selected from —H, C$_1$-C$_8$-alkyl, phenyl, benzyl,

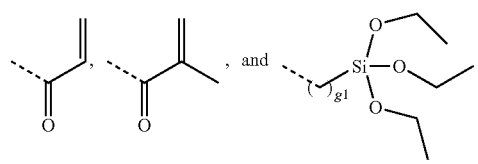

wherein g1 is an integer of between 2 and 8.

Preferred examples of oxetanes having one oxetanyl residue include trimethylene oxide, 3,3-dimethyloxetane, trimethylolpropane oxetane, 3-ethyl-3-[(2-ethylhexyloxy)methyl]oxetane, 3-ethyl-3-phenoxymethyl oxetane, 3,3-dimethyl-2(p-methoxy-phenyl)-oxetane, 3-ethyl-[(tri-ethoxysilyl propoxy)methyl]oxetane, and 3,3-dimethyl-2(o-methoxy-phenyl) oxetane.

As used herein "an oxetane having two oxetanyl residues" refers to a cationically curable monomer containing two substituted or unsubstituted oxetanyl residues connected via a divalent group containing one or more atoms. Preferably, the oxetane having two oxetanyl residues is a compound having two oxetanyl residues connected via a divalent group containing 2 to 20 carbon atoms, and optionally one or more oxygen atoms. Even more preferably, the oxetane having two oxetanyl residues is a compound of general formula (X)

(X)

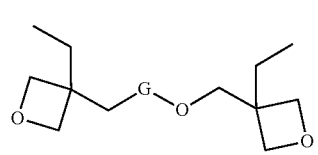

wherein
-G- represents a bond, —O—(CH$_2$)$_{g2}$—

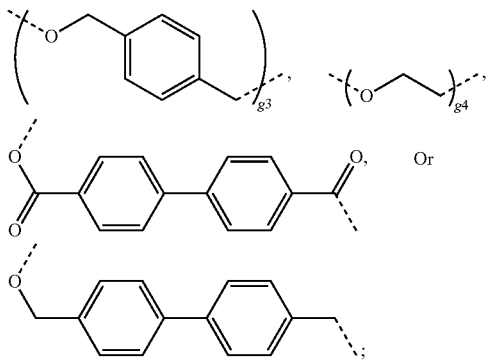

g2 is an integer of between 2 and 8;
g3 is an integer of between 1 and 3; and
g4 is an integer of between 1 and 4.

Preferred examples of oxetanes having two oxetanyl residues include 1,4-bis[(3-ethyl-3-oxetanylmethoxy)methyl]benzene, 4,4-bis(3-ethyl-3-oxetanyl)methoxymethyl]biphenyl, bis[1-ethyl(3-oxetanyl)]methyl ether, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, ethylene glycol bis(3-ethyl-3-oxetanylmethyl)ether, diethylene glycol bis(3-ethyl-3-oxetanylmethyl)ether, triethylene glycol bis(3-ethyl-3-oxetanylmethyl)ether, and tetraethylene glycol bis(3-ethyl-3-oxetanylmethyl)ether.

The UV-Vis radiation curable security inks claimed herein may contain up to about 25 wt-% of an organic solvent, the weight percent being based on the total weight of the UV-Vis radiation curable ink. The solvent has a boiling point higher than 100° C. Suitable organic solvents to be used in the UV-Vis radiation curable inks described herein include without limitation: ethyl-3-ethoxypropionate, 2-methoxy-1-methylethyl acetate, propylene glycol mono methyl ether, cyclopentanone, cyclohexanone, n-butanol, cyclohexanol, ethylene carbonate, propylene carbonate, butylene carbonate, and mixtures thereof.

In a preferred embodiment according to the present invention, the UV-Vis radiation curable security ink is solvent-free. The use of a solvent-free ink in an industrial printing process of value documents is of high interest because it prevents emission of volatile organic components, which typically have a negative impact on the environment and are harmful for human health.

The UV-Vis radiation curable security ink claimed herein may further comprise one or more photosensitizers in conjunction with the one or more photoinitiators described herein in order to achieve efficient curing. Suitable examples of photosensitizers are known to those skilled in the art (e.g. in Industrial Photoinitiators, W. A. Green, CRC Press, 2010, Table 8.1 p 0.170). Preferred photosensitizers are those that are able to achieve efficient and fast curing with UV-LED light sources, such as thioxanthone derivatives, anthracene derivatives and naphthalene derivatives (such as 9,10-diethoxyanthracene sold as Anthracure UVS-1101 and 9,10-dibutyloxyanthracene sold as Anthracure UVS-1331, both sold by Kawasaki Kasei Chemicals Ltd) and titanocene derivatives (such as Irgacure 784 sold by BASF). Particularly preferred are thioxanthone derivatives, including without limitation isopropyl-thioxanthone (ITX), 1-chloro-2-propoxy-thioxanthone (CPTX), 2-chloro-thioxanthone (CTX) and 2,4-diethyl-thioxanthone (DETX), and mixtures thereof. Alternatively, thioxanthone photosensitizers may be used in an oligomeric or polymeric form (such as Omnipol TX sold by IGM Resins, Genopol* TX-2 sold by Rahn, or Speedcure 7010 sold by Lambson). When present, the one or more photosensitizers are preferably present in an amount from about 0.1 wt-% to about 2 wt-%, more preferably from about 0.2 wt-% to about 1 wt-%, the weight percent being based on the total weight of the UV-Vis radiation curable ink.

The UV-Vis radiation curable ink claimed herein may further comprise one or more antifoaming agents in an amount of less than about 2 wt-%, preferably of less than about 1 wt-%.

Another aspect according to the present invention is directed to a process for producing a security feature for securing a value document, wherein said security feature exhibits a blue color upon viewing in transmitted light and a metallic yellow color upon viewing in incident light, said process comprising the following steps:

A) printing, preferably by screen printing, rotogravure, or flexography, the UV-Vis radiation curable security ink claimed herein on a transparent or partially transparent region of a substrate of a value document to provide an ink layer; and B) UV-Vis curing the ink layer obtained at step A) to form the security feature.

The inventive manufacturing process claimed herein enables access in a single printing step to a security feature displaying a metallic yellow color in incident light and a blue color, especially an intense to very intense blue color, in transmitted light. As used herein, the term "printing" refers to any printing process suitable for printing the UV-Vis radiation curable ink described herein on a substrate of a value document. In particularly, the term "printing" refers to a printing process selected from the group consisting of: screen printing, rotogravure, flexography, pad printing, inkjet printing, and spray printing. Preferably, the UV-Vis radiation curable security ink is printed on a transparent or partially transparent region of the substrate of the value document by screen printing, rotogravure or flexography, more preferably by screen printing.

As used herein, "a transparent or partially transparent region of a substrate of a value document" refers to a region of the substrate of the value document, wherein said region is characterized by an average transmittance in the visible range of at least 50%, preferably of at least 70%, more preferably of at least 90%. The transparent or partially transparent region of the substrate and the remaining region of the substrate may be made either of the same material, or of different materials. Elimination of one or more layers in a multilayer structure or application of a transparent or partially transparent material to an aperture in a substrate made of a material, which is different from the transparent or partially transparent material provides value documents substrates, wherein the transparent or partially transparent region of the substrate and the remaining region of the substrate are made of different materials.

Materials for value document substrates include without limitation, papers or other fibrous materials such as cellulose, paper-containing materials, plastics and polymers, composite materials, and mixtures or combinations thereof. Typical paper, paper-like or other fibrous materials are made from a variety of fibers including without limitation abaca, cotton, linen, wood pulp, and blends thereof. As well known to those skilled in the art, cotton and cotton/linen blends are preferred for banknotes, while wood pulp is commonly used in non-banknote security documents. Typical examples of plastics and polymers include polystyrene, polycarbonate, polyolefins, such as polyethylene (PE) and polypropylene (PP) including biaxially-oriented polypropylene (BOPP), polyamides (PA), polyesters such as poly(ethylene terephthalate) (PET), polyethylene terephthalate glycol-modified (PETG) including poly(ethylene glycol-co-1,4-cyclohexanedimethanol terephthalate), poly(1,4-butylene terephthalate) (PBT), and poly(ethylene 2,6-naphthoate) (PEN), and polyvinylchlorides (PVC). Typical examples of composite materials include without limitation multilayer structures or laminates of paper and at least one plastic or polymer material, such as those described hereabove. Suitable materials for the transparent or partially transparent region of the substrate include, but are not limited to polystyrene, polycarbonate, polyolefins, such as polyethylene (PE) and polypropylene (PP) including biaxially-oriented polypropylene (BOPP), polyamides (PA), polyesters such as poly(ethylene terephthalate) (PET), polyethylene terephthalate glycol-modified (PETG) including poly(ethylene glycol-co-1,4-cyclohexanedimethanol terephthalate), poly(1,4-butylene terephthalate) (PBT), and poly(ethylene 2,6-naphthoate) (PEN), and polyvinylchlorides (PVC). The transparent or partially transparent region of the substrate of the value document may carry a primer layer on the top of which the UV-Vis radiation curable ink is printed. The primer layer may be obtained by UV-Vis curing a varnish containing all the ingredients of the UV-Vis radiation curable ink described herein, with the exception of the silver nanoplatelets.

At step B) of the inventive manufacturing process claimed herein, the ink layer obtained at step A) is subjected to UV-Vis curing to form the security feature. As used herein, the term "UV-Vis curing" refers to radiation-curing of the ink layer by photo-polymerization, under the influence of an irradiation having wavelength components in the UV or in the UV and visible part of the electromagnetic spectrum (typically 100 nm to 800 nm, preferably between 150 and 600 nm and more preferably between 200 and 400 nm). Cationically curable monomers are cured by cationic mechanisms consisting of the activation by UV-Vis light of one or more photoinitiators, which liberate cationic species, such as acids, which in turn initiate the polymerization of the compound so as to form a cured binder. Radically curable monomers and oligomers are cured by free radical mechanisms consisting of the activation by UV-Vis light of one or more photoinitiators, which liberate free radicals which in turn initiate the polymerization process. Optionally, one or more photosensitizers may also be present. Photosensitizers are activated by one or more of the wavelengths emitted by a UV-Vis light source and reach an excited state. The excited photosensitizer either transfer energy to the one or more photoinitiators (in free-radical polymerization) or an electron (in cationic polymerization). Either process in turn initiates the polymerization process.

Preferably, step B) comprises exposure of the ink layer obtained at step A) to UV-Vis light emitted by a UV-Vis light source selected from the group consisting of: mercury lamps, preferably medium-pressure mercury lamps, UV-LED lamps, and sequences thereof. Typical sequences include the use of one or more UV-LED lamps in a first step to partially cure the UV-Vis radiation composition and one or more medium-pressure mercury lamps in a second step. Mercury lamps advantageously emit on a wide range of wavelengths in the UV-A, UV-B and UV-C range. Accordingly, there is a large selection of photoinitiators or combinations of photoinitiator/photosensitizer having an absorption spectrum matching at least one of the emission band of the mercury lamp. UV-LED have a more limited range of wavelengths, such that only a limited selection of photoinitiators or combination of photoinitiator/photosensitizer is efficient enough at industrial printing speed. On the other hand, UV-LEDs are less costly, require less energy (in particular, they need much less demanding heat dissipation systems), are not prone to ozone formation and have a much longer lifespan.

To provide the value document with soil resistance and/or to protect the security feature against physical and chemical attacks from the environment, the manufacturing process claimed herein preferably further comprises steps C) and D) conducted after step B):

C) applying on the substrate, preferably by a printing process, a curable protective varnish to form a varnish layer;

D) curing the varnish layer obtained at step C) so as to form a protective coating.

Examples of suitable curable protective varnishes to be used at step C) and/or of methods of applying said curable protective varnishes on the substrate and of curing the varnish layer are described in the international patent application publication number WO2020234211A1, the international patent application publication number WO2013127715A2 and the international patent application publication number WO2014067715A1.

Preferably, the value document is selected from banknotes, deeds, tickets, checks, vouchers, fiscal stamps, agreements, identity documents such as passports, identity cards, visas, driving licenses, bank cards, credit cards, transactions cards, access documents, and cards, entrance tickets, public transportation tickets, academic diploma, and academic titles. More preferably the value document is a banknote. The security ink claimed herein may be also used for producing a security feature directly on a value commercial good. The term "value commercial good" refers to packaging material, in particular for pharmaceutical, cosmetics, electronics or food industry that may be protected against counterfeiting and/or illegal reproduction in order to warrant the content of the packaging like for instance genuine drugs.

EXAMPLES

The present invention is now described in more details with reference to non-limiting examples. The examples E1-E48 and comparative examples C1-C21 below provide more details for the preparation the UV-Vis radiation curable screen printing security inks described herein and optical properties of security features obtained therefrom.

A. Analytical Methods

A-1. UV-Vis Spectroscopy

UV-Vis spectra of dispersions were recorded on Varian Cary 50 UV-Visible spectrophotometer at such concentration of dispersions as to achieve the optical density of 0.3 to 1.5 at 1 cm optical path.

A-2. TEM Analysis

TEM analysis of dispersions and coatings was performed on EM 910 instrument from ZEISS in bright field mode at an e-beam acceleration voltage of 100 kV. At least 2 representative images with scale in different magnification were recorded in order to characterize the dominant particle morphology for each sample.

The mean diameter of the silver nanoplatelets was determined by transmission electron microscopy (TEM) using Fiji image analysis software based on the measurement of at least 300 randomly selected silver nanoplatelets oriented parallel to the plane of a transmission electron microscopy image (TEM), wherein the diameter of a silver nanoplatelet is the maximum dimension of said silver nanoplatelet oriented parallel to the plane of a transmission electron microscopy image (TEM).

The mean thickness of the silver nanoplatelets was determined by transmission electron microscopy (TEM) based on the manual measurement of at least 50 randomly selected silver nanoplatelets oriented perpendicular to the plane of the TEM image, wherein the thickness of the silver nanoplatelet is the maximum thickness of said silver nanoplatelet.

B. Preparation and Characterization of Ag Nanoplatelets Dispersions D1-D10

B-1. Synthesis of Raw Material

In a 1 L double-wall glass reactor, equipped with anchor-stirrer, 365 g of de-ionized water was cooled to +2° C. 13.62 g of sodium borohydride was added, and the mixture was cooled to −1° C. with stirring at 250 rounds per minute (RPM, Solution A).

In a 0.5 L double-wall glass reactor, equipped with anchor-stirrer, 132 g of deionized water and 4.8 g of MPEG-5000-thiol were combined, and the mixture was stirred for 10 minutes at room temperature. 72 g of the product of Example A3 of WO2006074969 was added, and the resulting mixture was stirred for another 10 minutes at room temperature for homogenization. The solution of 30.6 g of silver nitrate in 30 g of de-ionized water was added in one portion and the mixture stirred for 10 minutes, resulting in an orange-brown viscous solution. To this solution 96 g of deionized water was added, followed by addition of 3 g of Struktol SB 2080 defoamer, pre-dispersed in 36 g of de-ionized water. The resulting mixture was cooled to 0° C. with stirring at 250 RPM (Solution B).

After that, Solution B was dosed with a peristaltic pump at a constant rate over 2 h into Solution A under the liquid surface via a cooled (0° C.) dosing tube, resulting in spherical silver nanoplatelets dispersion. During pumping, the Solution A was stirred at 250 RPM.

After dosing was complete, the reaction mixture was warmed up to +5° C. within 15 minutes, and a solution of 862 mg of KCl in 10 g of deionized water was added in one portion, followed by addition of 9.6 g of ethylenediaminetetraacetic acid (EDTA) in 4 equal portions with 10 minutes time intervals. After addition of the last EDTA portion, the reaction mixture was stirred for 15 minutes at +5° C., then warmed up to 35° C. over 30 minutes and stirred for 1 h at this temperature. Upon this time, hydrogen evolution is completed.

3.0 mL of 30% w/w solution of ammonia in water was added, followed by addition of 5.76 g of solid NaOH, and the mixture was stirred for 15 min at 35° C. Then 180 mL of 50% w/w hydrogen peroxide solution in water were dosed with a peristaltic pump at a constant rate over 4 h into the reaction mixture under the liquid surface with stirring at 250 RPM, while maintaining the temperature at 35° C. This has led to a deep blue colored dispersion of silver nanoplatelets, which was cooled to room temperature. 1.23 g of compound of formula

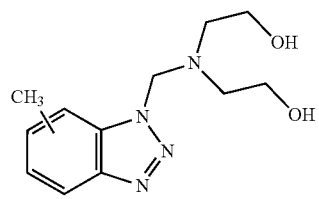

(mixture of CAS 80584-88-9 and 80584-89-0) was added, and the mixture was stirred for 1 h at room temperature.

B-2. Isolation and Purification of Ag Nanoplatelets

B-2a. First Decantation 9.6 g of sodium dodecylsulfate was added to the reaction mixture and then ca. 25 g of anhydrous sodium sulfate powder was added in portions with stirring until the transmission color of the dispersion changed from blue to pink. Then the mixture was kept without stirring at room temperature for 24 h, allowing the coagulated nanoplatelets to sediment at the bottom of the reactor.

890 g of supernatant was pumped out from the reactor with a peristaltic pump, and 890 g of deionized water was added to the reactor. The mixture in reactor was stirred for 1 h at room temperature, allowing the coagulated particles to re-disperse.

B-2b. Second Decantation

Ca. 64 g of anhydrous sodium sulfate powder was added in portions with stirring until the transmission color of the dispersion changed from blue to yellowish-pink. Then the mixture was kept without stirring at room temperature for 12 h, allowing the coagulated nanoplatelets to sediment at the bottom of the reactor. 990 g of supernatant was pumped out from the reactor with a peristaltic pump, and 90 g of deionized water was added to the reactor. The resulting mixture was stirred for 30 minutes at room temperature, allowing the coagulated particles to re-disperse.

B-2c. Ultrafiltration in Water

The resulting dispersion of Ag nanoplatelets was subjected to ultrafiltration using a Millipore Amicon 8400 stirred ultrafiltration cell. The dispersion was diluted to 400 g weight with de-ionized water and ultrafiltered to the end volume of ca. 50 mL using a polyethersulfone (PES) membrane with 300 kDa cut-off value. The procedure was repeated in total 4 times to provide 60 g of Ag nanoplatelets dispersion in water. After ultrafiltration was completed, 0.17 g of compound of formula

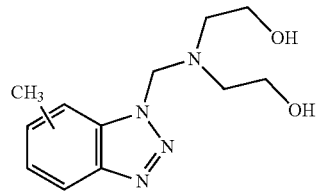

(mixture of CAS 80584-88-9 and 80584-89-0) was added to the dispersion.

Ag content 28.9% w/w; yield ca. 89% based on total silver amount; Solids content (at 250° C.) 33.5% w/w; Purity 86% w/w of silver based on solids content at 250° C.

B-2d. Ultrafiltration in Isopropanol

The dispersion was further ultrafiltered in isopropanol. 60 g of Ag nanoplatelets dispersion, obtained after ultrafiltration in water, was placed in a Millipore Amicon 8400 stirred ultrafiltration cell and diluted to 300 g weight with isopropanol. The dispersion was ultrafiltered to the volume of ca. 50 mL using a polyethersulfone (PES) membrane with 500 kDa cut-off value. The procedure was repeated in total 4 times to provide 72 g of Ag nanoplatelets dispersion in isopropanol.

Ag content 24.1% w/w; Solids content (at 250° C.) 25.7% w/w; Purity 93.5% w/w of silver based on solids content at 250° C.

The UV-Vis-NIR spectrum was recorded in water at Ag concentration of $9.8*10^{-5}$ M. $\lambda_{max}$=700 nm; extinction coefficient at maximum ε=10200 L/(cm*mol Ag), FWHM=340 nm.

Number mean particle diameter 93±40 nm, number mean particle thickness 16±2.5 nm.

B-3 Preparation of Dispersion D1 a) Synthesis of Diethanolaminedithiocarbamate Sodium Salt (sodium bis(2-hydroxyethyl)dithiocarbamate)

60 g Ethanol, 10.5 g diethanolamine and 4.0 g of sodium hydroxide granules was placed in 100 mL round-bottom flask under argon atmosphere, the mixture was stirred until dissolution of sodium hydroxide and then cooled to +2° C. 7.6 g carbon disulfide was added dropwise over 1 h with stirring, maintaining the temperature of reaction mixture at 0 to +5° C. After that, the mixture (yellowish suspension) was stirred for 30 min at 0 to +5° C., then warmed up to 23° C. and stirred for 1 h.

b) Surface Modification of Ag Nanoplatelets 50 g (12.85 g solids) of Ag nanoplatelets dispersion obtained as described at item B-2d was placed in a 250 mL round-bottom flask under argon atmosphere. 1.09 g of suspension (0.27 g of diethanolaminedithiocarbamate sodium salt), obtained in Step a), was added in one portion and the mixture was stirred for 24 h under argon at 23° C.

c) Solvent Switch

To the dispersion, obtained in Step b), 15.0 g of ethyl 3-ethoxypropionate (CAS No.: 763-69-9) was added. The resulting mixture was concentrated on rotary evaporator at 40 mbar pressure and 40° C. bath temperature, till no more solvent was distilled off. The weight of the resulting dispersion was adjusted to 32.1 g by addition of ethyl 3-ethoxypropionate (corresponds to the calculated total solids content of 40.9% w/w).

B-4 Preparation of Dispersion D2 a) Surface Modification of Ag Nanoplatelets 50 g (12.85 g solids) of Ag nanoplatelets dispersion obtained as described at item B-2d was placed in a 250 mL round-bottom flask under argon atmosphere at 23° C. 0.46 g of 5% w/w solution of carbon disulfide in absolute ethanol was added and the mixture was stirred for 5 min, followed by addition of 0.62 g of 5% w/w solution of diethanolamine in absolute ethanol. The mixture was stirred for 1 h at 23° C., then 0.49 g of 5% w/w solution of potassium ethoxide in absolute ethanol was added and stirring was continued for 30 min.

b) Solvent Switch

To the dispersion, obtained in Step a), 15.0 g of ethyl 3-ethoxypropionate (CAS No.: 763-69-9) was added. The resulting mixture was concentrated on rotary evaporator at 40 mbar pressure and 40° C. bath temperature, till no more solvent was distilled off. The weight of the resulting dispersion was adjusted to 32.1 g by addition of ethyl 3-ethoxypropionate (corresponds to the calculated total solids content of 40.2% w/w).

B-5 Preparation of Dispersion D3 a) Synthesis of Diethanolaminedithiocarbamate Potassium Salt 16 g Ethanol, 2.7 g diethanolamine and 9.0 g of 24% w/w solution of potassium ethoxide in ethanol was placed in 100 mL round-bottom flask under argon atmosphere, the mixture was stirred until dissolution of potassium ethoxide and then cooled to +2° C. 1.95 g carbon disulfide was added dropwise over 1 h with stirring, maintaining the temperature of reaction mixture at 0 to +5° C. After that, the mixture (yellowish suspension) was stirred for 30 min at 0 to +5° C., then warmed up to 23° C. and stirred for 1 h.

b) Surface Modification of Ag Nanoplatelets 50 g (12.85 g solids) of Ag nanoplatelets dispersion obtained as described at item B-2d, was placed in a 250 mL round-bottom flask under argon atmosphere. 0.675 g of suspension (0.128 g of diethanolaminedithiocarbamate potassium salt), obtained in Step a), was added in one portion and the mixture was stirred for 24 h under argon at 23° C.

c) Solvent Switch

To the dispersion, obtained in Step b), 15.0 g of ethyl 3-ethoxypropionate (CAS No.: 763-69-9) was added. The resulting mixture was concentrated on rotary evaporator at 40 mbar pressure and 40° C. bath temperature, till no more solvent was distilled off. The weight of the resulting dispersion was adjusted to 32.1 g by addition of ethyl 3-ethoxypropionate (corresponds to the calculated total solids content of 40.4% w/w).

B-6 Preparation of Dispersion D4 a) Surface Modification of Ag Nanoplatelets 50 g (12.85 g solids) of Ag nanoplatelets dispersion obtained as described at item B-2d was placed in a 250 mL round-bottom flask under argon atmosphere at 23° C. 1.37 g of 5% w/w solution of carbon disulfide in absolute ethanol was added and the mixture was stirred for 5 min, followed by addition of 1.86 g of 5% w/w solution of diethanolamine in absolute ethanol. The mixture was stirred for 1 h at 23° C., then 1.48 g of 5% w/w solution of potassium ethoxide in absolute ethanol was added and stirring was continued for 30 min.

b) Solvent Switch

To the dispersion, obtained in Step a), 15.0 g of ethyl 3-ethoxypropionate (CAS No.: 763-69-9) was added. The resulting mixture was concentrated on rotary evaporator at 40 mbar pressure and 40° C. bath temperature, till no more solvent was distilled off. The weight of the resulting dispersion was adjusted to 32.1 g by addition of ethyl 3-ethoxypropionate (corresponds to the calculated total solids content of 40.6% w/w).

B-7 Preparation of Dispersion D5 a) Surface Modification of Ag Nanoplatelets 50 g (12.85 g solids) of Ag nanoplatelets dispersion obtained as described at item B-2d was placed in a 250 mL round-bottom flask under argon atmosphere at 23° C. 0.46 g of 5% w/w solution of carbon disulfide in absolute ethanol was added and the mixture was stirred for 5 min, followed by addition of 0.62 g of 5% w/w solution of diethanolamine in absolute ethanol. The mixture was stirred for 1 h at 23° C., then 0.99 g of 5% w/w solution of cesium hydroxide monohydrate in absolute ethanol was added and stirring was continued for 30 min.

b) Solvent Switch

To the dispersion, obtained in Step a), 15.0 g of ethyl 3-ethoxypropionate (CAS No.: 763-69-9) was added. The resulting mixture was concentrated on rotary evaporator at 40 mbar pressure and 40° C. bath temperature, till no more solvent was distilled off. The weight of the resulting dispersion was adjusted to 32.1 g by addition of ethyl 3-ethoxypropionate (corresponds to the calculated total solids content of 40.3% w/w).

B-8 Preparation of Dispersion D6 a) Surface Modification of Ag Nanoplatelets 50 g (12.85 g solids) of Ag nanoplatelets dispersion obtained as described at item B-2d was placed in a 250 mL round-bottom flask under argon atmosphere at 23° C. 0.91 g of 5% w/w solution of carbon disulfide in absolute ethanol was added and the mixture was stirred for 5 min, followed by addition of 1.24 g of 5% w/w solution of diethanolamine in absolute ethanol. The mixture was stirred for 1 h at 23° C., then 1.97 g of 5% w/w solution of cesium hydroxide monohydrate in absolute ethanol was added and stirring was continued for 30 min.

b) Solvent Switch

To the dispersion, obtained in Step a), 15.0 g of ethyl 3-ethoxypropionate (CAS No.: 763-69-9) was added. The resulting mixture was concentrated on rotary evaporator at 40 mbar pressure and 40° C. bath temperature, till no more solvent was distilled off. The weight of the resulting dispersion was adjusted to 32.1 g by addition of ethyl 3-ethoxypropionate (corresponds to the calculated total solids content of 40.6% w/w).

B-9 Preparation of Dispersion D7 a) Synthesis of Diethanolaminedithiocarbamate Cesium Salt 16 g Ethanol, 2.7 g diethanolamine and 4.3 g of cesium hydroxide monohydrate was placed in 100 mL round-bottom flask under argon atmosphere, the mixture was stirred until dissolution of cesium hydroxide and then cooled to +2° C. 1.95 g carbon disulfide was added dropwise over 1 h with stirring, maintaining the temperature of reaction mixture at 0 to +5° C. After that, the mixture (yellowish suspension) was stirred for 30 min at 0 to +5° C., then warmed up to 23° C. and stirred for 1 h.

b) Surface Modification of Ag Nanoplatelets 50 g (12.85 g solids) of Ag nanoplatelets dispersion obtained as described at item B-2d was placed in a 250 mL round-bottom flask under argon atmosphere. 0.40 g of suspension (0.128 g of diethanolaminedithiocarbamate cesium salt), obtained in Step a), was added in one portion and the mixture was stirred for 24 h under argon at 23° C.

c) Solvent Switch

To the dispersion, obtained in Step b), 15.0 g of ethyl 3-ethoxypropionate (CAS No.: 763-69-9) was added. The resulting mixture was concentrated on rotary evaporator at 40 mbar pressure and 40° C. bath temperature, till no more solvent was distilled off. The weight of the resulting dispersion was adjusted to 32.1 g by addition of ethyl 3-ethoxypropionate (corresponds to the calculated total solids content of 40.4% w/w).

B-10 Preparation of Dispersion D8 a) Surface Modification of Ag Nanoplatelets 50 g (12.85 g solids) of Ag nanoplatelets dispersion obtained as described at item B-2d was placed in a 250 mL round-bottom flask under argon atmosphere at 23° C. 1.37 g of 5% w/w solution of carbon disulfide in absolute ethanol was added and the mixture was stirred for 5 min, followed by addition of 1.86 g of 5% w/w solution of diethanolamine in absolute ethanol. The mixture was stirred for 1 h at 23° C., then 2.96 g of 5% w/w solution of cesium hydroxide monohydrate in absolute ethanol was added and stirring was continued for 30 min;

b) Solvent Switch

To the dispersion, obtained in Step a), 15.0 g of ethyl 3-ethoxypropionate (CAS No.: 763-69-9) was added. The resulting mixture was concentrated on rotary evaporator at 40 mbar pressure and 40° C. bath temperature, till no more solvent was distilled off. The weight of the resulting dispersion was adjusted to 32.1 g by addition of ethyl 3-ethoxypropionate (corresponds to the calculated total solids content of 40.9% w/w).

B-11 Preparation of Dispersion D9 a) Surface Modification of Ag Nanoplatelets 50 g (12.85 g solids) of Ag nanoplatelets dispersion obtained as described at item B-2d was placed in a 250 mL round-bottom flask under argon atmosphere at 23° C. 0.91 g of 5% w/w solution of carbon disulfide in absolute ethanol was added and the mixture was stirred for 5 min, followed by addition of 1.24 g of 5% w/w solution of diethanolamine in absolute ethanol. The mixture was stirred for 1 h at 23° C., then 0.986 g of 5% w/w solution of potassium ethoxide in absolute ethanol was added and stirring was continued for 30 min.

b) Solvent Switch

To the dispersion, obtained in Step a), 15.0 g of 7-oxabicyclo[4.1.0]hept-3-ylmethyl 7-oxabicyclo[4.1.0]heptane-3-carboxylate (CAS number: 2386-87-0) was added. The resulting mixture was concentrated on rotary evaporator at 40 mbar pressure and 40° C. bath temperature, till no more solvent was distilled off. The weight of the resulting dispersion was adjusted to 32.1 g by addition of 7-oxabicyclo[4.1.0]hept-3-ylmethyl 7-oxabicyclo[4.1.0]heptane-3-carboxylate (corresponds to the calculated total solids content of 40.4% w/w).

B-12 Preparation of Dispersion D10 a) Surface Modification of Ag Nanoplatelets 50 g (12.85 g solids) of Ag nanoplatelets dispersion obtained as described at item B-2d was placed in a 250 mL round-bottom flask under argon atmosphere at 23° C. 0.91 g of 5% w/w solution of carbon disulfide in absolute ethanol was added and the mixture was stirred for 5 min, followed by addition of 1.24 g of 5% w/w solution of diethanolamine in absolute ethanol. The mixture was stirred for 1 h at 23° C., then 1.97 g of 5% w/w solution of cesium hydroxide monohydrate in absolute ethanol was added and stirring was continued for 30 min.

b) Solvent Switch

To the dispersion, obtained in Step a), 15.0 g of 7-oxabicyclo[4.1.0]hept-3-ylmethyl 7-oxabicyclo[4.1.0]heptane-3-carboxylate (CAS number: 2386-87-0) was added. The resulting mixture was concentrated on rotary evaporator at 40 mbar pressure and 40° C. bath temperature, till no more solvent was distilled off. The weight of the resulting dispersion was adjusted to 32.1 g by addition of 7-oxabicyclo[4.1.0]hept-3-ylmethyl 7-oxabicyclo[4.1.0]heptane-3-carboxylate (corresponds to the calculated total solids content of 40.6% w/w).

C. Preparation of Examples (E1-E48), Comparative Examples (C1-C21) and Printed Security Features Thereof Description of the Ingredients Used for the Preparation of the Inks According to the Present Invention (E1-E48) and of the Inks Prepared for Comparative Purposes (C1-C21)

TABLE 1

| | | Ingredients |
|---|---|---|
| Ingredient | Commercial name (supplier) | Chemical composition (CAS number) |
| Polyvinylchloride copolymer | Vinnol ® H14/36 (Wacker) | 85.6 wt-% PVC + 14.4 wt-% PVAC (9003-22-9) |
| Polyvinylchloride copolymer | Vinnol ® E22/48A (Wacker) | 75 wt-% PVC + 25 wt-% acrylic acid/1,2-propanediol/butenedioic acid dibutyl ester copolymer (114653-42-8) |
| Polyvinylchloride copolymer | Vinnol ® H40/50 (Wacker) | 63 wt-% PVC + 37 wt-% PVAc (9003-22-9) |
| Cycloaliphatic epoxide | Ovacure 1500 (ARnex) | 7-oxabicyclo[4.1.0]hept-3-ylmethyl 7-oxabicyclo[4.1.0]heptane-3-carboxylate (2386-87-0) |
| Vinyl ether | CHDM-di (BASF) | 1,4-bis[(vinyloxy)methyl]cyclohexane (17351-75-6) |
| Vinyl ether | OVE-2 (BASF) | diethyloneglycol divinylether (764-99-8) |
| Vinyl ether | OVE-3 (BASF) | triethyloneglycol divinylether (765-12-8) |
| Vinyl other | HBVE (BASF) | hydroxybutyl vinyl ether (17832-28-9) |
| Oxetane | Curalite ™ Ox TMPO (Perstorp) | 3-ethyloxebone-3-methanol (3047 32-3) |
| Oxetane | Curalite ™ Ox TMPO (Perstorp) | 3-ethyl-3-{[(3-ethyloxetan-3-yl)methoxy]methyl}oxetane (18934-00-4) |
| Acrylate oligomer | Ebecryl ® 2959 (Allnex) | 23 wt-% glycerol, propoxylated, esters with acrylic acid (52408-84-1) + 77 wt-% 4,4'-isopropylidene diphenol, oligomeric reaction products with 1-chloro-2,3-epoxypropane, esters with acrylic acid (55818-57-0) |
| Acrylate monomer | TMPTA (Allnex) | 2,2-bis(acryloyloxymethyl)butyl acrylate (15825-89-5) |
| Perfluoropolyether reactive surfactant | Fluorolink ® E10H (Solvay) | Tetrafluoroethylene, oxidized, oligomers, reduced, methyl esters, reduced, reaction products with ethylene oxide (182492-16-1); Average molecular weight 1700 [g/mol] |
| Perfluoropolyether reactive surfactant | Fluorolink ® MD700 (Solvay) | Perfluoropolyether urethane methacrylate (CAS not provided) Average molecular weight 1500 [g/mol] |
| Perfluoropolyether anionic surfactant | Fluorolink ® F10 (Solvay) | Perfluoropolyether functionalized with phosphate groups (200013-65-6) Average molecular weight 600-900 [g/mol] |
| Silicone perfluoropolyether non-ionic surfactant | Fluorolink ® S10 (Solvay) | Perfluoropolyether functionalized with silane groups (223557-70-8) Average molecular weight 1750-1950 [g/mol] |
| Silicone non-ionic surfactant | BYK-320 (BYK) | 50% polyether modified polydimethylsiloxane in 50% 2-methoxy-1-methylethyl acetate (108-65-6) |
| Reactive silicone non-ionic surfactant | BYK-371 (BYK) | 40% acrylate polyester dimethylsiloxane in 40% xylene (1330-20-7) and 20% ethylbenzene (100-41-4) |
| Reactive silicone non-ionic surfactant | TEGO RAD 2300 (Evonik) | acrylated polyethersiloxane (CAS not provided) |
| Reactive silicone non-ionic surfactant | TEGO RAD 2700 (Evonik) | Siloxanes and Silicones, di-Me, hydrogen-terminated, reaction products with pentaerythritol tetraacrylate |
| Silicone fluoroalkyl non-ionic surfactant | Dynasylan F-8815 (Evonik) | Fluoroalkyl functionalized with siloxane groups (CAS not provided) Average molecular weight not provided by the supplier |
| Silicone fluoroalkyl non-ionic surfactant | Dynasylan F- 8261 (Evonik) | 1H,1H,2H,2H-Perfluorooctyltriethoxysilane (51851-37-7) |
| Cationic photoinitiator | Speedcure 976 (Lambson) | 50 wt-% mixture of Sulfonium, diphenyl[4-(phenylthio)phenyl], (OC-6-11)-hexafluoroantimonate(1-) (1:1) + Sulfonium, (thiodi-4,1-phenylene)bis]diphenyl-, (OC-6-11)-hexafluoroantimonate(1-) (1:2) (71449.78-0 and 89452-37-9) in 50% propylene carbonate (108-32-7) |
| Cationic photoinitiator | Speedcure 976D (Lambson) | 35 wt-% mixture of Sulfonium, diphenyl[4-(phenylthio)phenyl], (OC-6-11)-hexafluoroantimonate(1-) (1:1) + Sulfonium, (thiodi-4,1-phenylene)bis]diphenyl-, (OC-6-11)-hexafluoroantimonate(1-) (1:2) (71448-78-0 and 89452-37-9) in 65 wt-% Oxirane, 2,2'-[1,4-butanediylbis(oxymethylene)]bis- (2425-79-8) |
| Radical photoinitiator | Omnirad 2100 (IGM Resins) | 92.5% ethyl phenyl(2,4,8-trimethylbenzoyl)phosphinate + 7.5 wt-% phenyl bis(2,4,6- trimethylbenzoyl)-phosphine oxide (448-61-3) |

| | | Surface stabilizing agent | Amount surface stabilizing agent (wt-% of the Ag nanoplatelets) |
|---|---|---|---|
| Dispersion Ag nanoplatelets | Dispersion D1$^{a)}$ | Diethanolamine dithiocarbamate sodium salt (sodium bis(2-hydroxyethyl)dithiocarbamate) | 2.1 |
| | Dispersion D2$^{b)}$ | Diethanolamine dithiocarbamate potassium salt (potassium bis(2-hydroxyethy)dithiocarbamate) | 0.5 |
| | Dispersion D3$^{c)}$ | Diethanolamine dithiocarbamate potassium salt (potassium bis(2-hydroxyethy)dithiocarbamate) | 1.0 |
| | Dispersion D4$^{d)}$ | Diethanolamine dithiocarbamate potassium salt (potassium bis(2-hydroxyethy)dithiocarbamate) | 1.5 |
| | Dispersion D5$^{e)}$ | Diethanolamine dithiocarbamate cesium salt (cesium bis(2-hydroxyothyl)dithiocarbamate) | 0.72 |
| | Dispersion D6$^{f)}$ | Diethanolamine dithiocarbamate cesium salt (cesium bis(2-hydroxyothyl)dithiocarbamate) | 1.43 |
| | Dispersion D7$^{g)}$ | Diethanolamine dithiocarbamate cesium salt (cesium bis(2-hydroxyothyl)dithiocarbamate) | 1.0 |

TABLE 1-continued

| | Ingredients | |
|---|---|---|
| Dispersion D8[h] | Diethanolamine dithiocarbamate cesium salt (cesium bis(2-hydroxyothyl)dithiocarbamate) | 2.15 |
| Dispersion D9[f] | Diethanolamine dithiocarbamate potassium salt (potassium bis(2-hydroxyethyl)dithiocarbamate) | 1.0 |
| Dispersion D10[j] | Diethanolamine dithiocarbamate cesium salt (cesium bis(2-hydroxyethyl)dithiocarbamate) | 1.43 |

[a] 40.9 wt-% Ag nanoplatelets stabilized with sodium bis(2-hydroxyethyl)dithiocarbamate in ethyl-3-ethoxypropionate (763-69-9)
[b] 40.2 wt-% Ag nanoplatelets stabilized with potassium bis(2-hydroxyethyl)dithiocarbamate in ethyl-3-ethoxypropionate (763-69-9)
[c] 40.4 wt-% Ag nanoplatelets stabilized with potassium bis(2-hydroxyethyl)dithiocarbamate in ethyl-3-ethoxypropionate (763-69-9)
[d] 40.6 wt-% Ag nanoplatelets stabilized with potassium bis(2-hydroxyethyl)dithiocarbamate in ethyl-3-ethoxypropionate (763-69-9)
[e] 40.3 wt-% Ag nanoplatelets stabilized with cesium bis(2-hydroxyethyl)dithiocarbamate in ethyl-3-ethoxypropionate (763-69-9)
[f] 40.6 wt-% Ag nanoplatelets stabilized with cesium bis(2-hydroxyethyl)dithiocarbamate in ethyl-3- ethoxypropionate (763-69-9)
[g] 40.4 wt-% Ag nanoplatelets stabilized with cesium bis(2-hydroxyethyl)dithiocarbamate in ethyl-3- ethoxypropionate (763-69-9)
[h] 40.9 wt-% Ag nanoplatelets stabilized with cesium bis(2-hydroxyethyl)dithiocarbamate in ethyl-3- ethoxypropionate (763-69-9)
[i] 40.4 wt-% Ag nanoplatelets stabilized with potassium bis(2-hydroxyethyl)dithiocarbamate in 7-oxabicyclo[4.1.0]hept-3-ylmethyl 7-oxabicyclo[4.1.0]heptane-3-carboxylate (Uvacure 1500; CAS number: 2386-87-0)
[j] 40.6 wt-% Ag nanoplatelets stabilized with cesium bis(2-hydroxyethyl)dithiocarbamate in 7-oxabicyclo[4.1.0]hept-3-ylmethyl 7-oxabicyclo[4.1.0]heptane-3-carboxylate (Uvacure 1500; CAS number: 2386-87-0)

C1. Study of the Influence of the Cations ($Na^+$, $K^+$ and $Cs^+$) of the Surface Stabilizing Agent on the Optical Properties Exhibited by the Security Features Obtained with Security Inks According to the Invention (E1-E7)

C1a. Preparation of the Inks E1-E7

Ingredients provided in Table 1a below were independently mixed and dispersed at room temperature using a Dispermat CV-3 for 10 minutes at 2000 rpm so as to yield 50 g of the inks E1-E7.

TABLE 1a

Composition of the UV-Vis radiation curable screen printing inks E1-E7

| Ingredient | Commercial name | Amount (wt-%) | | | | | | |
|---|---|---|---|---|---|---|---|---|
| | | E1 | E2 | E3 | E4 | E5 | E6 | E7 |
| Polyvinylchloride copolymer | Vinnol ® H14/36 | | | | 7.4 | | | |
| Cycloaliphatic epoxide | Uvacure ® 1500 | | | | 28.1 | | | |
| Vinyl ether | DVE-3 | | | | 8.1 | | | |
| Radically curable oligomer | Ebecryl 2959 | | | | 4.5 | | | |
| Radically curable monomer | TMPTA | | | | 9.1 | | | |
| Fluorosurfactant | Fluorolink E10H | | | | 2.5 | | | |
| Cationic photoinitiator | Speedcure 976 | | | | 5.9 | | | |
| Free radical photoinitiator | Omnirad 2100 | | | | 3.1 | | | |
| Dispersion Ag nanoplatelets | Dispersion D1[a] | 31.3 | | | | | | |
| | Dispersion D2 [b] | | 31.3 | | | | | |
| | Dispersion D3 [c] | | | 31.3 | | | | |
| | Dispersion D4 [d] | | | | 31.3 | | | |
| | Dispersion D5 [e] | | | | | 31.3 | | |
| | Dispersion D6 [f] | | | | | | 31.3 | |
| | Dispersion D8 [g] | | | | | | | 31.3 |

TABLE 1a-continued

Composition of the UV-Vis radiation curable screen printing inks E1-E7

| Ingredient | Commercial name | Amount (wt-%) | | | | | | |
|---|---|---|---|---|---|---|---|---|
| | | E1 | E2 | E3 | E4 | E5 | E6 | E7 |
| Cation surface stabilizing agent (Cat+) | | Na+ | K+ | K+ | K+ | Cs+ | Cs+ | Cs+ |
| Amount surface stabilizing agent (wt-% of the Ag nanoplatelets) | | 2.1 | 0.5 | 1.0 | 1.5 | 0.72 | 1.43 | 2.15 |
| Ag nanoplatelets (wt-%) | | 12.8% | 12.6% | 12.6% | 12.7% | 12.6% | 12.7% | 12.8% |
| Ratio between wt-% vinyl ether and wt-% cycloaliphatic epoxide | | | | | 0.29 | | | |

[a] 40.9 wt-% Ag nanoplatelets stabilized with diethanolamine dithiocarbamate sodium salt in ethyl-3-ethoxypropionate (CAS number: 763-69-9)
[b] 40.2 wt-% Ag nanoplatelets stabilized with diethanolamine dithiocarbamate potassium salt in ethyl-3-ethoxypropionate (CAS number: 763-69-9)
[c] 40.4 wt-% Ag nanoplatelets stabilized with diethanolamine dithiocarbamate potassium salt in ethyl-3-ethoxypropionate (CAS number: 763-69-9)
[d] 40.6 wt-% Ag nanoplatelets stabilized with diethanolamine dithiocarbamate potassium salt in ethyl-3-ethoxypropionate (CAS number: 763-69-9)
[e] 40.3 wt-% Ag nanoplatelets stabilized with diethanolamine dithiocarbamate cesium salt in ethyl-3-ethoxypropionate (CAS number: 763-69-9)
[f] 40.6 wt-% Ag nanoplatelets stabilized with diethanolamine dithiocarbamate cesium salt in ethyl-3-ethoxypropionate (CAS number: 763-69-9)
[g] 40.9 wt-% Ag nanoplatelets stabilized with diethanolamine dithiocarbamate cesium salt in ethyl-3-ethoxypropionate (CAS number: 763-69-9)

C1b. Preparation of Security Features

The UV-Vis radiation curable screen printing inks E1-E7 were independently applied on pieces of transparent polymer substrate (PET Hostaphan® RN, thickness 50 μm, supplied by Pütz GmbH+Co. Folien KG) using a 160 thread/cm screen (405 mesh). The printed pattern had a size of 5 cm×5 cm. 10 seconds after the printing step, the pieces of printed substrate were independently cured at room temperature by exposing them two times at a speed of 100 m/min to UV-Vis light under a dryer from IST Metz GmbH (two lamps: iron-doped mercury lamp 200 W/cm$^2$+mercury lamp 200 W/cm$^2$), to generate security features.

C1c. Results (Optical Properties) of Security Features

The optical properties of each security features obtained at item C1b were independently assessed in reflection, in transmission, and visually using the three tests described below. The results are summarized in Table 1c.

Reflection measurements were performed using a goniometer (Goniospektrometer Codec WI-10 5&5 by Phyma GmbH Austria). The L*a*b* values of the printed security features were determined at 0° to the normal with an illumination angle of 22.5° on the side of the transparent polymer substrate that was printed. The C* values (chroma, corresponding to a measure of the color intensity or color saturation) were calculated from a* and b* values according to the CIELAB (1976) color space, wherein:

$$C^* = \sqrt{(a^*)^2 + (b^*)^2}$$

The C* values (reflection 22.5/0°) are displayed in Table 1c below.

Transmission measurements were carried out using a Datacolor 650 spectrophotometer (parameters: integration sphere, diffuse illumination (pulse xenon D65) and 8° viewing, analyzer SP2000 with dual 256 diode array for wavelength range of 360-700 nm, transmission sampling aperture size of 22 mm). The C* values (transmission 8°) are displayed in Table 1c below.

A visual assessment was carried out observing each security feature with the naked eye in reflection on the side of the transparent polymer substrate that was printed with a diffuse source (such as the light coming through a window without direct sun, the observer facing the wall opposite to the window). The following colors have been observed:

Dark brown to brown colors with matte appearance and no metallic effect;
Gold color (i.e. metallic yellow color) with glossy appearance and metallic effect. The metallic effect appears for a chroma value C* in reflection 22.5/0° higher than about 20.

A visual assessment was also carried out observing each security feature with the naked eye in transmission. The following colors have been observed:

Dull blue: the blue coloration is weak (but visible);
Blue (chroma value C* in transmission 8° higher than or equal to about 20) to deep blue (chroma value C* in transmission 8° higher than or equal to 30): the blue coloration is intense to very intense.

As shown in Table 1c, the security features obtained with the inks according to the invention (examples E1-E7) exhibit gold color in reflection and blue to deep blue color in transmission.

TABLE 1c

Color properties of security features obtained from inks E1-E7

| | E1 | E2 | E3 | E4 | E5 | E6 | E7 |
|---|---|---|---|---|---|---|---|
| Dispersion Ag nanoplatelets | D1 | D2 | D3 | D4 | D5 | D6 | D8 |
| C* (reflection 22.5/0°) | 23 | 33 | 31 | 22 | 29 | 23 | 23 |
| C* (transmission 8°) | 20 | 46 | 45 | 44 | 46 | 45 | 44 |
| Color (reflection) | Gold | Gold | Gold | Gold | Gold | Gold | Gold |
| Color (transmission) | Blue | Deep blue | Deep blue | Deep blue | Deep blue | Deep blue | Deep blue |

As attested by Table 1c, security inks E1-E7 according to the present invention containing Ag nanoplatelets stabilized with a diethanolamine dithiocarbamate sodium salt, a diethanolamine dithiocarbamate potassium salt, or a diethanolamine dithiocarbamate cesium salt provide security features exhibiting gold color in reflection and blue color in transmission and high chroma values C* both in reflected light and in transmitted light.

C2. Study of the Influence of the Ratio Between the Wt-% of the Vinyl Ether Having Two Vinyloxy Residues and the Wt-% of the Cycloaliphatic Epoxide (Comparative Inks C1-C6 and Inks E1, E8-E23 According to the Present Invention)

To evaluate the influence of the ratio between the wt-% of the vinyl ether having two vinyloxy residues and the wt-% of the cycloaliphatic epoxide on the optical properties exhibited by the security feature, comparative inks C1-C6 and inks E1, E8-E23 according to the invention were prepared.

C2a. Preparation of the Inks C1-C6 and E1, E8-E23

Ingredients provided in Table 2a-1, 2a-2 and 2a-3 were mixed and dispersed at room temperature using a Dispermat CV-3 for 10 minutes at 2000 rpm so as to yield 50 g of each ink C1-C6 and E1, E8-E23.

TABLE 2a-1

Composition of the UV-Vis radiation curable screen printing inks C1-C2 and E1, E8-E11

| Ingredient | Commercial name | Amount (wt-%) | | | | | | |
|---|---|---|---|---|---|---|---|---|
| | | C1 | C2 | E1 | E8 | E9 | E10 | E11 |
| Polyvinylchloride copolymer | Vinnol ® H14/36 | | | | 7.4 | | | |
| Cycloaliphatic epoxide | Uvacure ® 1500 | 20 | 24.1 | 28.1 | 30.1 | 32.1 | 34.1 | 36.2 |
| Vinyl ether | DVE-3 | 16.2 | 12.1 | 8.1 | 8.1 | 4.1 | 2.1 | 0 |
| Radically curable oligomer | Ebecryl 2959 | | | | 4.5 | | | |
| Radically curable monomer | TMPTA | | | | 9.1 | | | |
| Fluorosurfactant | Fluorolink E10H | | | | 2.5 | | | |
| Cationic photoinitiator | Speedcure 976 | | | | 5.9 | | | |
| Free radical photoinitiator | Omnirad 2100 | | | | 3.1 | | | |
| Ag nanoplatelets dispersion | Dispersion D1[a] | | | | 31.3 | | | |
| Cation surface stabilizing agent (Cat$^+$) | | | | | Na$^+$ | | | |
| Amount surface stabilizing agent (wt-% of the Ag nanoplatelets) | | | | | 2.1 | | | |
| Ratio between wt-% vinyl ether and wt-% cycloaliphatic epoxide | | 0.81 | 0.5 | 0.29 | 0.2 | 0.13 | 0.06 | 0 |

[a] 40.9 wt-% Ag nanoplatelets stabilized with diethanolamine dithiocarbamate sodium salt in ethyl-3-ethoxypropionate (CAS number: 763-69-9)

TABLE 2a-2

Composition of the UV-Vis radiation curable screen printing inks C3-C4 and E12-E18

| Ingredient | Commercial name | Amount (wt-%) | | | | | | | | |
|---|---|---|---|---|---|---|---|---|---|---|
| | | C3 | C4 | E12 | E13 | E14 | E15 | E16 | E17 | E18 |
| Polyvinylchloride copolymer | Vinnol ® H14/36 | | | | | 7.4 | | | | |
| Cycloaliphatic epoxide | Uvacore ® 1500 | 25 | 24.1 | 24.8 | 25.5 | 28.1 | 30.1 | 32.1 | 34.1 | 35.2 |
| Vinyl ether | DVE-3 | 16.2 | 12.1 | 11.4 | 10.7 | 8.1 | 6.1 | 4.1 | 2.2 | 0 |
| Radically curable oligomer | Ebecryl 2959 | | | | | 4.5 | | | | |
| Radically curable monomer | TMPTA | | | | | 9.1 | | | | |
| Fluorosurfactant | Fluorolink E10H | | | | | 2.5 | | | | |
| Cationic photoinitiator | Speedcure 976 | | | | | 5.9 | | | | |
| Free radical Photoinitiator | Omnirad 2100 | | | | | 3.1 | | | | |
| Dispersion Ag nanoplatelets | Dispersion D3[a] | | | | | 31.3 | | | | |
| Cation surface stabilizing agent (Cat$^+$) | | | | | | K$^+$ | | | | |
| Amount surface stablilizing agent (wt-% of the Ag nanoplatelets) | | | | | | 1.0 | | | | |
| Ratio between wt-% vinyl ether and wt-% cycloaliphatic epoxide | | 0.81 | 0.5 | 0.46 | 0.42 | 0.29 | 0.20 | 0.13 | 0.06 | 0 |

[a] 40.4 wt-% Ag nanoplatelets stabilized with diethanolamine dithiocarbamate potassium salt in ethyl-3-ethoxypropionate (CAS number: 763-69-9)

TABLE 2a-3

Composition of the UV-Vis radiation curable screen printing inks C5-C6 and E19-E23

| Ingredient | Commercial name | Amount (wt-%) | | | | | | |
|---|---|---|---|---|---|---|---|---|
| | | C5 | C6 | E19 | E20 | E21 | E22 | E23 |
| Polyvinylchloride copolymer | Vinnol ® H14/36 | | | | 7.4 | | | |
| Cycloaliphatic epoxide | Uvacure ® 1500 | 20 | 24.1 | 28.1 | 30.1 | 32.1 | 34.1 | 36.2 |
| Vinyl ether | DVE-3 | 18.2 | 12.1 | 8.1 | 6.1 | 4.1 | 2.1 | 0 |
| Radically curable oligomer | Ebecryl 2959 | | | | 4.5 | | | |
| Radically curable monomer | TMPTA | | | | 8.1 | | | |
| Fluorosurfactant | Fluorolink E10H | | | | 2.5 | | | |
| Cationic photoinitiator | Speedcure 976 | | | | 5.9 | | | |
| Free radical Photoinitiator | Omnirad 2100 | | | | 3.3 | | | |
| Ag nanoplatelets dispersion | Dispersion D7[a)] | | | | 31.3 | | | |
| Cation surface stabilizing agent (Cat$^+$) | | | | | Cs$^+$ | | | |
| Amount surface stabilizing agent (wt-% of the Ag nanoplatelets) | | | | | 1.0 | | | |
| Ratio between wt-% vinyl ether and wt-% cycloaliphatic epoxide | | 0.81 | 0.5 | 0.29 | 0.2 | 0.13 | 0.06 | 0 |

[a)]40.4 wt-% Ag nanoplatelets stabilized with diethanolamine dithiocarbamate cesium salt in ethyl-3-ethoxypropionate (CAS number: 763-69-9)

C2b. Preparation of Security Features

The UV-Vis radiation curable screen printing inks C1-C6 and E1, E8-E23 were independently applied on pieces of transparent polymer substrate (PET Hostaphan® RN, thickness 50 μm, supplied by Pütz GmbH+Co. Folien KG) using a 160 thread/cm screen (405 mesh). The printed pattern had a size of 5 cm×5 cm. 10 seconds after the printing step, the pieces of printed substrate were independently cured at room temperature by exposing them two times at a speed of 100 m/min to UV-Vis light under a dryer from IST Metz GmbH (two lamps: iron-doped mercury lamp 200 W/cm$^2$+mercury lamp 200 W/cm$^2$), to generate security features.

C2c. Results (Optical Properties) of Security Features

The optical properties of the security features obtained at item C2b were independently assessed in reflection, in transmission, and visually using the tests described at item C1c.

The colors in reflection and transmission and the C* values (reflection 22.5/0° and transmission 8°) exhibited by the security features prepared using the comparative inks C1-C6 and the inks E1, E8-E23 according to the present invention are displayed in Table 2c (below).

As shown in Table 2c, the security features obtained from the inks E1, E8-E23 according to the present invention having a ratio between the wt-% of the vinyl ether having two vinyloxy residues and the wt-% of the cycloaliphatic epoxide lower than 0.5 exhibit gold color in reflection and blue to deep blue color in transmission, independently of the cation used in the stabilizing agent. By comparison, the security features obtained from the comparative inks C1-C6 wherein the ratio between the wt-% of the vinyl ether having two vinyloxy residues and the wt-% of the cycloaliphatic epoxide is higher than or equal to to 0.5 exhibit a blue to deep color in transmission, but a dark brown to brown color with low chroma value in reflection. A dark brown to brown color with low chroma value in reflection is not eye-catching for the layperson and therefore, not suitable for a dichroic security feature for securing a value document.

TABLE 2c

Color properties of security features obtained from comparative inks C1-C6 and inks E1, E8-E23

| | C1 | C2 | E1 | E8 | E9 | E10 | E11 | C3 | C4 | E12 | E13 | E14 |
|---|---|---|---|---|---|---|---|---|---|---|---|---|
| Dispersion Ag nanoplatelets | | | | D1 | | | | | | D3 | | |
| C*[a)] | 16 | 17 | 23 | 25 | 29 | 27 | 27 | 9 | 19 | 23 | 27 | 27 |
| C*[b)] | 36 | 37 | 20 | 39 | 40 | 39 | 34 | 26 | 42 | 46 | 44 | 40 |
| Color (reflection) | Brown | Brown | Gold | Gold | Gold | Gold | Gold | Dark brown | Brown | Gold | Gold | Gold |
| Color (transmission) | Deep blue | Deep blue | Blue | Deep blue | Deep blue | Deep blue | Deep blue | Blue | Deep blue | Deep blue | Deep blue | Deep blue |

TABLE 2c-continued

|  | E15 | E16 | E17 | E18 | C5 | C6 | E19 | E20 | E21 | E22 | E23 |
|---|---|---|---|---|---|---|---|---|---|---|---|
| Dispersion AG nanoplatelets | | | D3 | | | | | | D7 | | |
| C*[a)] | 28 | 29 | 27 | 28 | 11 | 18 | 27 | 28 | 27 | 28 | 25 |
| C*[b)] | 41 | 41 | 40 | 35 | 42 | 44 | 30 | 42 | 43 | 43 | 32 |
| Color (reflection) | Gold | Gold | Gold | Gold | Brown | Brown | Gold | Gold | Gold | Gold | Gold |
| Color (transmission) | Deep blue | Deep blue | Deep blue | Deep blue | Deep blue | Deep blue | Deep blue | Deep blue | Deep blue | Deep blue | Deep blue |

[a)] C* (reflection 22.5/0°)
[b)] C* (transmission 8°)

C3. Study of the Effect of the Solvent (Solvent-Containing Versus Solvent-Free Ink) and/or of the Weight Percent of the Radically Curable Monomers and Oligomers Present in the UV-Vis Radiation Curable Ink (UV-Vis Radiation Hybrid Curable Ink Versus UV-Vis Radiation Cationic Curable Ink) on the Optical Properties Obtained Exhibited by the Security Feature (Examples E24-E27)

To assess whether the optical effects obtained by using a solvent-containing UV-Vis radiation hybrid curable ink can be reproduced with a solvent-containing UV-Vis radiation cationically curable ink, ink E24 was prepared.

To assess whether the optical effects obtained by using solvent-containing UV-Vis radiation cationic or hybrid curable inks can be reproduced with solvent-free UV-Vis radiation cationically or hybrid curable inks, inks E25, E26 and E27 were prepared.

C3a. Preparation of the Inks E24-E27

Ingredients provided in Table 3a were mixed and dispersed at room temperature using a Dispermat CV-3 for 10 minutes at 2000 rpm so as to yield 50 g of each ink E24-E27.

TABLE 3a

Composition of the UV-Vis radiation curable screen printing inks E24-E27

| | | Amount (wt-%) | | | |
|---|---|---|---|---|---|
| Ingredient | Commercial name | E24 | E25 | E26 | E27 |
| Polyvinylchloride copolymer | Vinnol ® H14/36 | | | 7.4 | |
| Cycloaliphatic epoxide | Uvacure ® 1500 | 33.65 | 36.8 | 36.8 | 28.7 |
| Vinyl ether | DVE-3 | 13.65 | 16.8 | 16.8 | 11.3 |
| Radically curable oligomer | Ebecryl 2959 | | | | 4.5 |
| Radically curable monomer | TMPTA | | | | 9.1 |
| Fluorosurfactant | Fluorolink E10H | | | 2.5 | |
| Cationic photoinitiator | Speedcure 976D | 11.5 | 11.5 | 11.5 | 8.4 |
| Free radical photoinitiator | Omnirad 2100 | | | | 3.1 |
| Dispersion Ag nanoplatelets | Dispersion D3 [a)] | 31.3 | | | |
| | Dispersion D9 [b)] | | 25 | | |
| | Dispersion D10 [c)] | | | 25 | 25 |
| Ag nanoplatelets (wt-%) | | 12.6 | 10.1 | 10.2 | 10.2 |
| Amount of radically curable monomers/oligomers (wt-%) | | 0 | 0 | 0 | 13.6 |

TABLE 3a-continued

Composition of the UV-Vis radiation curable screen printing inks E24-E27

| | | Amount (wt-%) | | | |
|---|---|---|---|---|---|
| Ingredient | Commercial name | E24 | E25 | E26 | E27 |
| Ratio between wt-% vinyl ether and wt-% cycloaliphatic epoxide | | 0.41 | 0.32 | 0.33 | 0.26 |
| Amount epoxide (wt-%) [d)] | | 7.48 | 7.48 | 7.48 | 5.46 |
| Amount solvent (wt-%) | | 18.7 | 0 | 0 | 0 |

[a)] 40.4 wt-% Ag nanoplatelets stabilized with diethanolamine dithiocarbamate potassium salt in ethyl-3-ethoxypropionate (CAS number: 763-69-9)
[b)] 40.4 wt-% Ag nanoplatelets stabilized with diethanolamine dithiocarbamate potassium salt in 7-oxabicyclo[4.1.0]hept-3-ylmethyl 7-oxabicyclo[4.1.0]heptane-3-carboxylate (Uvacure 1500, CAS number: 2386-87-0)
[c)] 40.6 wt-% Ag nanoplatelets stabilized with diethanolamine dithiocarbamate cesium salt in 7-oxabicyclo[4.1.0]hept-3-ylmethyl 7-oxabicyclo[4.1.0]heptane-3-carboxylate (Uvacure 1500, CAS number: 2386-87-0)
[d)] Oxirane, 2,2'-[1,4-butanediylbis(oxymethylene)]bis- (2425-79-8) (reactive diluent of Speedcure 976D)

C3b. Preparation of Security Features

The UV-Vis radiation curable screen printing inks E24-E27 were independently applied on pieces of transparent polymer substrate (PET Hostaphan® RN, thickness 50 μm, supplied by Pütz GmbH+Co. Folien KG) using a 160 thread/cm screen (405 mesh). The printed pattern had a size of 5 cm×5 cm. 10 seconds after the printing step, the pieces of printed substrate were independently cured at room temperature by exposing them two times at a speed of 100 m/min to UV-Vis light under a dryer from IST Metz GmbH (two lamps: iron-doped mercury lamp 200 W/cm$^2$+mercury lamp 200 W/cm$^2$), to generate security features.

C3c. Results (Optical Properties) of Security Features

The optical properties of the security features obtained at item C3b were independently assessed in reflection, in transmission, and visually using the tests described at item C1c.

The colors in reflection and transmission and the C* values (reflection 22.5/0° and transmission 8°) exhibited by the security features prepared using the inks E24-E27 according to the present invention are displayed in Table 3c (below).

TABLE 3c

Color properties of security features obtained from inks E24-E27

| | E24 | E25 | E26 | E27 |
|---|---|---|---|---|
| Type of ink | Solvent-containing/cationic | Solvent-free/cationic | Solvent-free/cationic | Solvent-free/hybrid |
| Dispersion Ag nanoplatelets | D3 | D9 | D10 | D10 |

TABLE 3c-continued

Color properties of security features obtained from inks E24-E27

|  | E24 | E25 | E26 | E27 |
|---|---|---|---|---|
| C* (reflection 22.5/0°) | 31 | 28 | 27 | 27 |
| C* (transmission 8°) | 42 | 44 | 44 | 45 |
| Color (reflection) | Gold | Gold | Gold | Gold |
| Color (transmission) | Deep blue | Deep blue | Deep blue | Deep blue |

As shown in Table 3c, security features with similar optical properties can be accessed by using a solvent-containing cationically curable ink (E24), a solvent-free hybrid curable ink (E27), or a solvent-free cationically curable ink (E25-E26).

C4. Study of the Influence of the Surfactant on the Optical Properties Exhibited by the Security Feature (Comparative Inks C7-C15 and Ink E28 According to the Present Invention)

To evaluate the influence of the surfactant on the optical properties exhibited by the security feature, comparative inks C7-C15 and ink E28 according to the invention were prepared.

C4a. Preparation of the Ink C7-C15 and E28

Ingredients provided in Table 4a were mixed and dispersed at room temperature using a Dispermat CV-3 for 10 minutes at 2000 rpm so as to yield 50 g of each ink C7-C15 and E28.

TABLE 4a

Composition of the UV-Vis radiation curable screen printing inks C7-C15 and E28.

| Ingredient | Commercial name | Amount (wt-%) | | | | | | | | | |
|---|---|---|---|---|---|---|---|---|---|---|---|
|  |  | E28 | C7 | C8 | C9 | C10 | C11 | C12 | C13 | C14 | C15 |
| Polyvinylchloride copolymer | Vinnol ® H14/36 |  |  |  |  | 7.4 |  |  |  |  |  |
| Cycloaliphatic epoxide | Uvacure ® 1500 |  |  |  |  | 28.1 |  |  |  |  |  |
| Vinyl ether | DVE-3 |  |  |  |  | 8.1 |  |  |  |  |  |
| Radically durable oligomer | Ebercyl 2959 |  |  |  |  | 4.5 |  |  |  |  |  |
| Radically durable monomer | TMPTA |  |  |  |  | 9.1 |  |  |  |  |  |
| Perfluoropoylether surfactant | Fluorolink E10H | 2.5 |  |  |  |  |  |  |  |  |  |
|  | Fluorolink MD700 |  | 2.5 |  |  |  |  |  |  |  |  |
|  | Fluorolink F10 |  |  | 2.5 |  |  |  |  |  |  |  |
|  | Fluorolink S10 |  |  |  | 2.5 |  |  |  |  |  |  |
| Silicone surfactant | BYK 330 |  |  |  |  |  | 2.5 |  |  |  |  |
|  | BYK 371 |  |  |  |  |  |  | 2.5 |  |  |  |
|  | Tego Rad 2300 |  |  |  |  |  |  |  | 2.5 |  |  |
|  | Tego Rad 2700 |  |  |  |  |  |  |  |  | 2.5 |  |
| Fluoro silicone surfactant | Dynasilan F-8815 |  |  |  |  |  |  |  |  |  | 2.5 |
|  | Dynasilan F-8261 |  |  |  |  |  |  |  |  |  | 2.5 |
| Cationic photoinitiator | Speedcore 976 |  |  |  |  | 5.9 |  |  |  |  |  |
| Free radical photoinitiator | Omnirad 2100 |  |  |  |  | 3.1 |  |  |  |  |  |
| Dispersion Ag nanoplatelets | Dispersion D7 [a] |  |  |  |  | 31.3 |  |  |  |  |  |
| Ratio between wt-% vinyl ether and wt-% cycloaliphatic epoxide |  |  |  |  |  | 0.29 |  |  |  |  |  |

[a] 40.4 wt-% Ag nanoplatelets stabilized with diethanolamine dithiocarbamate cesium salt in ethyl-3-ethoxypropionate (CAS number: 763-69-9)

C4b. Preparation of Security Features

The UV-Vis radiation curable screen printing inks C7-C15 and E28 were independently applied on pieces of transparent polymer substrate (PET Hostaphan® RN, thickness 50 μm, supplied by Pütz GmbH+Co. Folien KG) using a 160 thread/cm screen (405 mesh). The printed pattern had a size of 5 cm×5 cm. 10 seconds after the printing step, the pieces of printed substrate were independently cured by exposing them two times at a speed of 100 in/min to UV-Vis light under a dryer from IST Metz GmbH (two lamps: iron-doped mercury lamp 200 W/cm²+mercury lamp 200 W/cm²), to generate security features.

C4c. Results (Optical Properties) of Security Features

The optical properties of the security features at item C4b were independently assessed in reflection, in transmission, and visually using the tests described at item C1c.

The colors in reflection and transmission and the C* values (reflection 22.5/00 and transmission 50) exhibited by the security features prepared using the inks C7-C15 and E28 are displayed in Table 4c below.

TABLE 4c

Color properties of security features obtained from inks C7-C15 and E28

|  | E28 | C7 | C8 | C9 | C10 | C11 | C12 | C13 | C14 | C15 |
|---|---|---|---|---|---|---|---|---|---|---|
| Surfactant | Fluorolink E10H | Fluorolink MD700 | Fluorolink F10 | Fluorolink S10 | BYK 330 | BYK 371 | Tego Rad 2300 | Tego Rad 2700 | Dynasilan F-8815 | Dynasilan F-8261 |
| C* (reflection 22.5/0°) | 32 | 6 | 4 | 14 | 3 | 7 | 7 | 1 | 14 | 17 |
| C* (transmission 8°) | 39 | 41 | 25 | 37 | 29 | 36 | 17 | 38 | 36 | 32 |
| Color (reflection) | Gold | Dark brown | Dark brown | Brown | Dark brown | Dark brown | Dark brown | Dark brown | Brown | Brown |
| Color (transmission) | Deep blue | Deep blue | Deep blue | Deep blue | Blue | Deep blue | Dull blue | Deep blue | Deep blue | Deep blue |

As shown in Table 4c, the security feature obtained from an ink (E28) according to the invention comprising a perfluoropolyether surfactant functionalized with hydroxyl groups (Fluorolink E10H) exhibits gold color in reflection and deep blue color in transmission. By comparison, the security features obtained from inks comprising perfluoropolyether surfactants lacking hydroxyl groups (Fluorolink MD700/C7, Fluorolink F10/C8 or Fluorolink S10/C9), or surfactants lacking both a perfluoropolyether chain and hydroxyl groups, such as BYK 330 (C10), BYK 371 (C11), TEGO RAD 2300 (C12), TEGO RAD 2700 (C13), Dynasylan F8815 (C14) and Dynasylan F8261 (C15) exhibit a dull blue to deep blue color in transmission, but a dark brown to brown color with low chroma value in reflection. A dark brown to brown color with low chroma value in reflection is not eye-catching and therefore, not suitable for a dichroic security feature for securing a value document.

C5. Study of the Influence of the Concentration of the Perfluoropolyether Surfactant Bearing Hydroxyl Groups on the Optical Properties Exhibited by the Security Feature (Comparative Ink C16 and Inks E29-E33 According to the Present Invention)

To evaluate the influence of the concentration of perfluoropolyether surfactant functionalized with one or more hydroxyl groups on the optical properties exhibited by the security feature, inks C16 and E29-E33 according to the invention were prepared as described below. E32 is identical to E3 and was added for comparison purpose.

C5a. Preparation of the Ink C16 and E29-E33

Ingredients provided in Table 5a were mixed and dispersed at room temperature using a Dispermat CV-3 for 10 minutes at 2000 rpm so as to yield 50 g of each ink C16 and E29-E33.

TABLE 5a

Composition of the UV-Vis radiation curable screen printing inks C16 and E29-E33.

| Ingredient | Commercial name | C16 | E29 | E30 | E31 | E32 | E33 |
|---|---|---|---|---|---|---|---|
| Polyvinylchloride copolymer | Vinnol ® H14/36 | | | 7.4 | | | |
| Cycloaliphatic epoxide | Uvacure ® 1500 | 30.6 | 30.55 | 30.1 | 29.6 | 28.1 | 25.6 |
| Vinyl ether | DVE-3 | | | 8.1 | | | |
| Radically curable oligomer | Ebecryl 2959 | | | 4.5 | | | |
| Radically curable monomer | TMPTA | | | 9.1 | | | |
| Fluorosurfactant | Fluorolink E10H | 0 | 0.05 | 0.5 | 1 | 2.5 | 5 |
| Cationic photoinitiator | Speedcure 976 | | | 5.9 | | | |
| Free radical photoinitiator | Omnirad 2100 | | | 3.1 | | | |
| Dispersion Ag nanoplatelets | Dispersion D3 [a] | | | 31.3 | | | |
| Ratio between wt-% vinyl ether and wt-% cycloaliphatic epoxide | | 0.26 | 0.27 | 0.27 | 0.27 | 0.29 | 0.32 |

[a] 40.4 wt-% Ag nanoplatelets stabilized with diethanolamine dithiocarbamate potassium salt in ethyl-3-ethoxypropionate (CAS number: 763-69-9)

C5b. Preparation of Security Features

The UV-Vis radiation curable screen printing inks C16 and E29-E33 were independently applied on pieces of transparent polymer substrate (PET Hostaphan® RN, thickness 50 μm, supplied by Pütz GmbH+Co. Folien KG) using a 160 thread/cm screen (405 mesh). The printed pattern had a size of 5 cm×5 cm. 10 seconds after the printing step, the pieces of printed substrate were independently cured by exposing them two times at a speed of 100 m/min to UV-Vis light under a dryer from IST Metz GmbH (two lamps: iron-doped mercury lamp 200 W/cm²+mercury lamp 200 W/cm²), to generate security features.

C5c. Results (Optical Properties) of Security Features

The optical properties of the security features obtained at item C5b were independently assessed in reflection, in transmission, and visually using the tests described at item C1c.

The colors in reflection and transmission and the C* values (reflection 22.5/0° and transmission 8°) exhibited by the security features prepared using the inks C16 and E29-E33 are displayed in Table 5c below.

TABLE 5c

Color properties of security features obtained from inks C16 and E29-E33

|  | C16 | E29 | E30 | E31 | E32 | E33 |
|---|---|---|---|---|---|---|
| Amount of surfactant (wt-%) | 0 | 0.05 | 0.5 | 1 | 2.5 | 5 |
| C* (reflection 22.5/0°) | 5 | 32 | 33 | 28 | 32 | 26 |
| C* (transmission 8°) | 34 | 44 | 43 | 43 | 39 | 40 |
| Color (reflection) | Dark brown | Gold | Gold | Gold | Gold | Gold |
| Color (transmission) | Deep blue | Deep blue | Deep blue | Deep blue | Deep blue | Deep blue |

As shown in Table 5c, the use of an amount of perfluoropolyether surfactant Fluorolink E10H from about 0.05 wt-% to about 5 wt-% ensures the production of security features showing metallic yellow color with high chroma values in reflection and deep blue color in transmission (inks E29-E33). By comparison, the security feature obtained with an ink containing no Fluorolink E10H (comparative ink C16) shows a dark brown to brown color with low chroma value in reflection. Such color is not eye-catching for the layperson and cannot be used as security feature for securing a value document.

C6. Study of the Influence of the Type of Polyvinylchloride Copolymer on the Optical Properties Exhibited by the Security Feature (Comparative Ink C1 and Inks E34-E35 According to the Invention)

To evaluate the influence of the type of polyvinylchloride copolymer on the optical properties exhibited by the security feature, comparative inks C17 and inks E34-E35 according to the invention were prepared as described below. E34 is identical to E19 and was used for comparison purpose.

C6a. Preparation of the Inks C1 and E34-E35

Ingredients provided in Table 6a were mixed and dispersed at room temperature using a Dispermat CV-3 for 10 minutes at 2000 rpm so as to yield 50 g of each ink C17 and E34-E35.

TABLE 6a

Composition of the UV-Vis radiation curable screen printing inks C17 and E34-E35.

| Ingredient | Commercial name | Amount wt-% | | |
|---|---|---|---|---|
|  |  | C17 | E34 | E35 |
| Polyvinylchloride copolymer | Vinnol ® H40/50 [a] | 7.4 |  |  |
|  | Vinnol ® H14/36 [b] |  | 7.4 |  |
|  | Vinnol ® E22/48A [c] |  |  | 7.4 |
| Cycloaliphatic epoxide | Uvacure ® 1500 |  | 28.1 |  |
| Vinyl ether | DVE-3 |  | 8.1 |  |
| Radically curable oligomer | Ebecryl 2959 |  | 4.5 |  |
| Radically curable monomer | TMPTA |  | 9.1 |  |
| Perfluoropolyether reactive surfactant | Fluorolink E10H |  | 2.5 |  |
| Cationic photoinitiator | Speedcure 976 |  | 5.9 |  |
| Free radical photoinitiator | Omnirad 2100 |  | 3.1 |  |
| Dispersion Ag nanoplatelets | D7 [d] |  | 31.3 |  |
| Percentage of PVC in polyvinylchloride copolymer [wt-%] |  | 63 | 85.6 | 75 |
| Ratio between wt-% vinyl ether and wt-% cycloaliphatic epoxide |  |  | 0.29 |  |

[a] polyvinylchloride/polyvinylacetate resin (63%/37%) (9003-22-9), K value 50 ± 1, molecular mass 6-8 · $10^4$ Dalton (Wacker, size-exclusion chromatography)
[b] polyvinylchloride/polyvinylacetate (85.6%/14.4%) (9003-22-9), K value 35 ± 1, molecular mass 3-4 · $10^4$ Dalton (Wacker, size-exclusion chromatography)
[c] polyvinylchloride/(acrylic acid/1,2-propanediol/butenedioic acid dibutyl ester copolymer) (114653-42-8) (75%/25%), K value 48 ± 1, molecular mass 6-8 · $10^4$ Dalton
[d] 40.4 wt-% Ag nanoplatelets stabilized with diethanolamine dithiocarbamate potassium salt in ethyl-3-ethoxypropionate (CAS number: 763-69-9)

C6b. Preparation of Security Features

The UV-Vis radiation curable screen printing inks C17 and E34-E35 were independently applied on pieces of transparent polymer substrate (PET Hostaphan® RN, thickness 50 μm, supplied by Pütz GmbH+Co. Folien KG) using a 160 thread/cm screen (405 mesh). The printed pattern had a size of 5 cm×5 cm. 10 seconds after the printing step, the pieces of printed substrate were independently cured by exposing them two times at a speed of 100 m/min to UV-Vis light under a dryer from IST Metz GmbH (two lamps: iron-doped mercury lamp 200 W/cm$^2$+mercury lamp 200 W/cm$^2$), to generate security features.

C6c. Results (Optical Properties) of Security Features

The optical properties of the security features obtained at item C6b were independently assessed in reflection, in transmission, and visually using the tests described at item C1c.

The colors in reflection and transmission and the C* values (reflection 22.5/0° and transmission 8°) exhibited by the security features prepared using the inks C17 and E34-E35 are displayed in Table 6c below.

TABLE 6c

Color properties of security features obtained from inks C17 and E34-E35

|  | C17 | E34 | E35 |
|---|---|---|---|
| Percentage of PVC in polyvinylchloride copolymer [wt-%] | 63 | 85.6 | 75 |
| C* (reflection 22.5/0°) | 16 | 27 | 24 |

TABLE 6c-continued

Color properties of security features
obtained from inks C17 and E34-E35

|  | C17 | E34 | E35 |
|---|---|---|---|
| C* (transmission 8°) | 28 | 30 | 41 |
| Color (reflection) | Brown | Gold | Gold |
| Color (transmission) | Blue | Deep blue | Deep blue |

As attested by the optical properties of security features shown in Table 6c, the polyvinyl chloride copolymer must contain at least about 69 wt-%, preferably at least about 75 wt-% of vinyl chloride to provide a security feature showing a metallic yellow color in reflection (inks E34-E35 according to the invention). The security feature obtained using the comparative ink C17 containing a polyvinyl chloride copolymer with a lower wt-% of vinyl chloride show a blue color in transmission, but a brown color in reflected light, which is not eye-catching for the layperson and cannot be used as security feature for securing a value document.

C7. Study of the Influence of Other Cationically Curable Monomers (Comparative Inks C18-C21 and Inks E36-E48 According to the Present Invention)

To evaluate the influence of the cationically curable monomers on the optical properties exhibited by the security feature, inks C18-C21 and E36-E48 were prepared as described below.

C7a. Preparation of the Inks C18-C21 and E36-E48

Ingredients provided in Table 7a-1 and 7a-2 were mixed and dispersed at room temperature using a Dispermat CV-3 for 10 minutes at 2000 rpm so as to yield 50 g of each ink C18-C21 and E36-E48.

C7b. Preparation of Security Features

The UV-Vis radiation curable screen printing inks C18-C21 and E36-E48 were independently applied on pieces of transparent polymer substrate (PET Hostaphan® RN, thickness 50 µm, supplied by Pütz GmbH+Co. Folien KG) using a 160 thread/cm screen (405 mesh). The printed pattern had a size of 5 cm×5 cm. 10 seconds after the printing step, the pieces of printed substrate were independently cured by exposing them two times at a speed of 100 m/min to UV-Vis light under a dryer from IST Metz GmbH (two lamps: iron-doped mercury lamp 200 W/cm$^2$+mercury lamp 200 W/cm$^2$), to generate security features.

C7c. Results (Optical Properties) of Security Features

The optical properties of the security features obtained at item C7b were independently assessed in reflection, in transmission, and visually using the tests described at item C1c.

The colors in reflection and transmission and the C* values (reflection 22.5/0° and transmission 8°) exhibited by the security features prepared using the inks C18-C21 and E36-E48 are displayed in Table 7c.

Comparison of the optical properties exhibited by the security features obtained with inks E8, E14, E15, with the optical properties exhibited by the security features obtained with inks E36-E38 demonstrates that the structure of the vinyl ether having two vinyloxy residues does not have any influence on the optical properties of the security features.

As shown by Table 7c, inks containing a vinyl ether having one vinyloxy residue, such as HBVE, in an amount higher than or equal to 6.1 wt-% (comparative inks C18 and C19) provide security features with a deep blue color in transmission, but a brown color in reflection, which is not acceptable for a dichroic security feature for securing a value document. However, low amounts of vinyl ethers having one vinyloxy residue in the security ink claimed herein do not affect the optical properties of the security feature obtained with said ink as illustrated with the experiment conducted with ink E39.

As illustrated for example by the experiments conducted with inks C20, C21, E40-E44, the presence of amounts of oxetanes having one functional oxetanyl residue, such as Curalite™ OX TMPO, lower than about 3.5 wt-% in the UV-Vis radiation curable ink does not affect the optical properties of the security features obtained with said inks. The use of oxetanes having two oxetanyl residues, such as Curalite™ OXPLUS, in the UV-Vis radiation curable ink does not have a detrimental effect on the optical properties of the security features obtained from said inks as shown for example by the experiments conducted with E45-E48 according to the present invention.

TABLE 7a-1

Composition of the UV-Vis radiation curable screen printing inks C18-C19 and E36-E39

| | | Amount (wt-%) | | | | | |
|---|---|---|---|---|---|---|---|
| Ingredient | Commercial name | E36 | E37 | E38 | C18 | C19 | E39 |
| Polyvinylchloride copolymer | Vinnol ® H14/36 | | | | 7.4 | | |
| Cycloaliphatic epoxide | Uvacure ® 1500 | 28.1 | 30.1 | 30.1 | 28.1 | 30.1 | 32.1 |
| Vinyl ether | DVE-2 | 8.1 | | | | | |
| Vinyl ether | CHDM-di | | 6.1 | 6.1 | | | |
| Vinyl ether | HBVE | | | | 8.1 | 5.1 | 4.1 |
| Radically curable oligomer | Ebecryl 2959 | | | | 4.5 | | |
| Radically curable monomer | TMPTA | | | | 9.1 | | |
| Perfluoropolyether surfactant | Fluorolink E10H | | | | 2.5 | | |
| Cationic photoinitiator | Speedcure 976 | | | | 5.9 | | |

TABLE 7a-1-continued

Composition of the UV-Vis radiation curable screen printing inks C18-C19 and E36-E39

| | | Amount (wt-%) | | | | | |
|---|---|---|---|---|---|---|---|
| Ingredient | Commercial name | E36 | E37 | E38 | C18 | C19 | E39 |
| Free radical photoinitiator | Omnirad 2100 | | | | 3.1 | | |
| Dispersion Ag nanoplatelets | Dispersion D1 [a]<br>Dispersion D3 [b] | 31.3 | 31.3 | 31.3 | 31.3 | 31.3 | 31.3 |

[a] 40.9 wt-% Ag nanoplatelets stabilized with diethanolamine dithiocarbamate sodium salt in ethyl-3-ethoxypropionate (CAS number: 763-69-9)
[b] 40.4 wt-% Ag nanoplatelets stabilized with diethanolamine dithiocarbamate potassium salt in ethyl-3-ethoxypropionate (CAS number: 763-69-9)

TABLE 7a-2

Composition of the UV-Vis radiation curable screen printing inks C20-C21 and E40-E48

| | | Amount (wt-%) | | | | | | | | | |
|---|---|---|---|---|---|---|---|---|---|---|---|
| Ingredient | Commercial name | C20 | C21 | E40 | E41 | E42 | E43 | E44 | E45 | E46 | E47 | E48 |
| Polyvinylchloride copolymer | Vinnol ® H14/36 | | | | | | 7.4 | | | | | |
| Cycloaliphatic epoxide | Uvacure ® 1500 | 30.1 | 30.1 | 32.9 | 34.5 | 33.7 | 33.7 | 33.7 | 25.5 | 22.7 | 20 | 29.1 |
| Vinyl ether | DVE-3 | | | | | 12.5 | 13 | 13.4 | | | | 9.1 |
| Monofunctional oxetane | Curalite ™ OX TMPO | 6.1 | 6.1 | 3.3 | 1.7 | 1.1 | 0.6 | 0.2 | | | | |
| Difunctional oxetane | Curalite ™ OXPLUS | | | | | | | | 10.7 | 13.5 | 16.2 | 8.1 |
| Radically curable oligomer | Ebecryl 2959 | 4.5 | 4.5 | 4.5 | 4.5 | | | | 4.5 | 4.5 | 4.5 | |
| Radically curable monomer | TMPTA | 9.1 | 9.1 | 9.1 | 9.1 | | | | 9.1 | 9.1 | 9.1 | |
| Perfluoropolyether surfactant | Fluorolink E10H | | | | | | 2.5 | | | | | |
| Cationic photoinitiator | Speedcure 976 | 5.9 | 5.9 | 5.9 | 5.9 | | | | 5.9 | 5.9 | 5.9 | |
| Cationic photoinitiator | Speedcure 976D | | | | | 11.5 | 11.5 | 11.5 | | | | 11.5 |
| Free radical photoinitiator | Omnirad 2100 | 3.1 | 3.1 | 3.1 | 3.1 | | | | 3.1 | 3.1 | 3.1 | |
| Dispersion Ag nanoplatelets | Dispersion D1 [a]<br>Dispersion D3 [b] | 31.3 | 31.3 | 31.3 | 31.3 | 31.3 | 31.3 | 31.3 | 31.3 | 31.3 | 31.3 | 31.3 |
| Amount epoxide (wt-%) [c] | | | | | | 7.48 | 7.48 | 7.48 | | | | |

[a] 40.9 wt-% Ag nanoplatelets stabilized with diethanolamine dithiocarbamate sodium salt in ethyl-3-ethoxypropionate (CAS number: 763-69-9)
[b] 40.4 wt-% Ag nanoplatelets stabilized with diethanolamine dithiocarbamate potassium salt in ethyl-3-ethoxypropionate (CAS number: 763-69-9)
[c] oxirane, 2,2'-[1,4-butanediylbis(oxymethylene)]bis- (2425-79-8) (reactive diluent of Speedcure 976D)

TABLE 7c

Color properties of security features obtained from inks C18-C21 and E36-E48.

| | E38 | E37 | E38 | C19 | C10 | E39 | C20 | C21 | E40 |
|---|---|---|---|---|---|---|---|---|---|
| Type of ink | hybrid | hybrid | hybrid | hybrid | hybrid | hybrid | hybrid | hybrid | hybrid |
| Cationically curable monomer other than a cycloaliphatic epoxide | DVE-2 | CHDM-di | CHDM-di | HBVE | HBVE | HBVE | TMPO | TMPO | TMPO |
| Amount DVE-2 (wt.-%) | 8.1 | | | | | | | | |
| Amount CHDM-di (wt-%) | | 6.1 | 8.1 | | | | | | |
| Amount HBVE (wt-%) | | | | 8.1 | 6.1 | 4.1 | | | |
| Amount TMPO (wt-%) | | | | | | | 8.1 | 8.1 | 3.3 |
| Amount Curalite ™ OXPLUS (wt-%) | | | | | | | | | |
| Amount epoxide (wt-%) | | | | | | | | | |
| Dispersion Ag nanoplatelets | D3 | D1 | D3 | D3 | D3 | D3 | D1 | D3 | D3 |
| C* (reflection 22.5/0°) | 31 | 24 | 24 | 12 | 18 | 21 | 13 | 4 | 23 |

TABLE 7c-continued

| C* (transmission 8°) | 27 | 35 | 35 | 40 | 40 | 44 | 38 | 35 | 43 |
|---|---|---|---|---|---|---|---|---|---|
| Color (reflection) | Gold | Gold | Gold | Brown | Brown | Gold | Brown | Dark brown | Gold |
| Color (transmission) | Blue | Deep blue | Deep blue | Deep blue | Deep blue | Deep blue | Deep blue | Deep blue | Deep blue |

| | E41 | E42 | E43 | E44 | E45 | E46 | E47 | E45 |
|---|---|---|---|---|---|---|---|---|
| Type of ink | hybrid | cationic | cationic | cationic | hybrid | hybrid | hybrid | cationic |
| Cationically curable monomer other than a cycloaliphatic epoxide | TMPO | TMPO | TMPO | TMPO | OXPLUS | OXPLUS | OXPLUS | OXPLUS |
| Amount DVE-2 (wt.-%) | | | | | | | | |
| Amount CHDM-di (wt-%) | | | | | | | | |
| Amount HBVE (wt-%) | | | | | | | | |
| Amount TMPO (wt-%) | 1.7 | 1.1 | 0.6 | 0.2 | | | | |
| Amount Curalite ™ OXPLUS (wt-%) | | | | | 10.7 | 13.5 | 16.2 | 8.1 |
| Amount epoxide (wt-%) | | 7.48 | 7.48 | 7.48 | | | | 7.48 |
| Dispersion Ag nanoplatelets | D3 | D3 | D3 | D3 | D3 | D3 | D3 | D3 |
| C* (reflection 22 5/0°) | 23 | 28 | 28 | 29 | 25 | 26 | 23 | 27 |
| C* (transmission 8°) | 43 | 42 | 42 | 43 | 44 | 45 | 44 | 44 |
| Color (reflection) | Gold | Gold | Gold | Gold | Gold | Gold | Gold | Gold |
| Color (transmission) | Deep blue | Deep blue | Deep blue | Deep blue | Deep blue | Deep blue | Deep blue | Deep blue |

The invention claimed is:

1. A UV-Vis radiation curable security ink for producing a security feature exhibiting a blue color upon viewing in transmitted light and a metallic yellow color upon viewing in incident light, wherein said ink comprises:
    a) from about 7.5 wt-% to about 20 wt-% of silver nanoplatelets having a mean diameter in the range of 50 to 150 nm with a standard deviation of less than 60%, a mean thickness in the range of 5 to 30 nm with a standard deviation of less than 50%, and a mean aspect ratio higher than 2.0, wherein the mean diameter is determined by transmission electron microscopy and the mean thickness is determined by transmission electron microscopy, and wherein the silver nanoplatelets bear a surface stabilizing agent of general formula (I)

wherein
the residue $R^A$ is a $C_2$-$C_4$ alkyl group substituted with a hydroxy group;
the residue $R^B$ is selected from a $C_1$-$C_4$ alkyl group, and a $C_2$-$C_4$ alkyl group substituted with a hydroxy group; and $Cat^+$ is a cation selected from the group consisting of $Na^+$, $K^+$, $Cs^+$ and $Rb^+$;
    b) a perfluoropolyether surfactant functionalized with at least a hydroxy group;
    c) from about 3 wt-% to about 12 wt-% of a polyvinyl chloride copolymer containing at least 69 wt-% of vinyl chloride;
    d) d1) from about 25 wt-% to about 55 wt-% of a cycloaliphatic epoxide, and from about 1 wt-% to about 10 wt-% of a cationic photoinitiator; or
    d2) from about 30 wt-% to about 65 wt-% of a mixture of a cycloaliphatic epoxide and a radically curable compound, from about 1 wt-% to about 6 wt-% of a cationic photoinitiator, and from about 1 wt-% to about 6 wt-% of a free radical photoinitiator; and optionally
    e) a cationically curable compound selected from the group consisting of:
        e1) a vinyl ether having two vinyloxy residues in an amount lower than 50% of the weight percent (wt-%) of the cycloaliphatic epoxide of d);
        e2) a vinyl ether having one vinyloxy residue in an amount lower than about 5 wt-%;
        e3) an epoxide other than a cycloaliphatic epoxide in an amount lower than about 10 wt-%;
        e4) an oxetane having two oxetanyl residues in an amount lower than about 20 wt-%;
        e5) an oxetane having one oxetanyl residue in an amount lower than about 3.5 wt-%; and
        e6) a mixture of e1) and/or e2) and/or e3) and/or e4) and/or e5);
    the weight percents being based on the total weight of the UV-Vis radiation curable security ink.

2. The UV-Vis radiation curable security ink according to claim 1, wherein the security ink is selected from a screen-printing security ink, a rotogravure security ink, and a flexography security ink.

3. The UV-Vis radiation curable security ink according to claim 1, wherein the mean diameter of the silver nanoplatelets is in the range of 70 to 120 nm with the standard deviation being less than 50%, the mean thickness of the silver nanoplatelets is in the range of 8 to 25 nm with the standard deviation being less than 30%, and the mean aspect ratio of the silver nanoplatelets is higher than 2.5.

4. The UV-Vis radiation curable security ink according to claim 1, wherein the surface stabilizing agent of general formula (I) is present in an amount from about 0.4% to about 5% of the weight percent (wt-%) of the silver nanoplatelets of a).

5. The UV-Vis radiation curable security ink according to claim 1, wherein the residues $R^A$ and $R^B$ are independently of each other a $C_2$-$C_4$ alkyl group substituted with a hydroxy group.

6. The UV-Vis radiation curable security ink according to claim 1, wherein the silver nanoplatelets bear a further surface stabilizing agent of general formula (II)

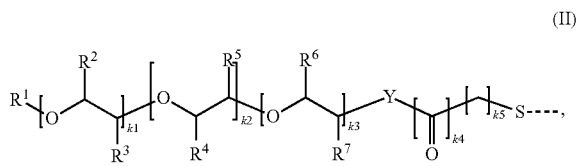
(II)

wherein
---------- indicates the bond to the silver;
$R^1$ is H, $C_1$-$C_{18}$alkyl, phenyl, $C_1$-$C_8$alkylphenyl, or $CH_2COOH$;
$R^2$, $R^3$, $R^4$, $R^5$, $R^6$ and $R^7$ are independently of each other H, $C_1$-$C_8$alkyl, or phenyl;
Y is O, or $NR^8$;
$R^8$ is H, or $C_1$-$C_8$alkyl;
k1 is an integer in the range of from 1 to 500;
k2 and k3 are independently of each other 0, or integers in the range of from 1 to 250;
k4 is 0, or 1; and
k5 is an integer in the range of from 1 to 5.

7. The UV-Vis radiation curable security ink according to claim 1, wherein the silver nanoplatelets bear a further surface stabilizing agent of general formula (III)

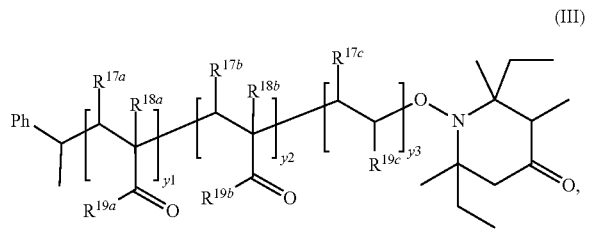
(III)

wherein
$R^{17a}$, $R^{17b}$ and $R^{17c}$ are independently of each other H, or methyl;
$R^{18a}$ and $R^{18b}$ are H, or methyl;
$R^{19a}$ is saturated or unsaturated, linear or branched chain alkyl with 1-22 carbon atoms;
$R^{19b}$ is $R_c$—[O—$CH_2$—$CH_2$—$]_c$—O—;
$R^{19c}$ is

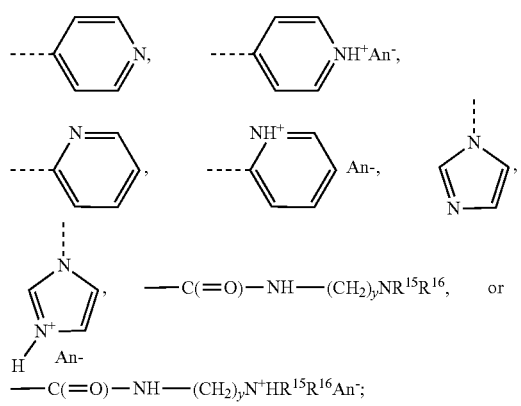

—C(=O)—NH—$(CH_2)_y$$NR^{15}R^{16}$, or
—C(=O)—NH—$(CH_2)_y$$N^+HR^{15}R^{16}An^-$;

wherein
$An^-$ is an anion of a monovalent organic, or inorganic acid;
y is an integer from 2 to 10;
$R^{15}$ is saturated or unsaturated, linear or branched chain alkyl with 1-22 carbon atoms,
$R^{16}$ is saturated or unsaturated, linear or branched chain alkyl with 1-22 carbon atoms,
$R_c$ is saturated or unsaturated, linear or branched chain alkyl with 1-22 carbon atoms, or alkylaryl or dialkylaryl with up to 24 carbon atoms and c is 1 to 150, and
y1, y2 and y3 are independently of each other integers from 1 to 200.

8. The UV-Vis radiation curable security ink according to claim 1, wherein the silver nanoplatelets bear a further surface stabilizing agent of general formula (IV)

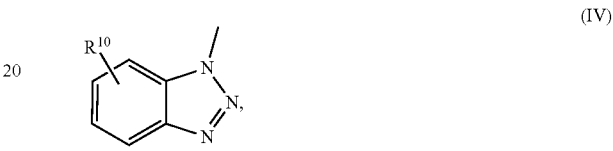
(IV)

wherein
$R^9$ is a hydrogen atom, or a group of formula —$CHR^{11}$—$N(R^{12})(R^{13})$;
$R^{10}$ is a hydrogen atom, a halogen atom, a $C_1$-$C_8$alkoxy group, or a $C_1$-$C_8$alkyl group;
$R^{11}$ is H, or $C_1$-$C_8$alkyl; and
$R^{12}$ and $R^{13}$ are independently of each other a $C_1$-$C_8$alkyl, a hydroxy$C_1$-$C_8$alkyl group, or a group of formula -[($CH_2CH_2$)—O$]_{n1}$—$CH_2CH_2$—OH, wherein n1 is 1 to 5.

9. The UV-Vis radiation curable security ink according to claim 1, wherein the UV-Vis radiation curable security ink comprises an amount of perfluoropolyether surfactant from about 0.025 wt-% to about 5 wt-%, wherein the weight percents are based on the total weight of the UV-Vis radiation curable security ink.

10. The UV-Vis radiation curable security ink according to claim 1, wherein the security ink comprises d1) from about 25 wt-% to about 55 wt-% of a cycloaliphatic epoxide, and from about 1 wt-% to about 10 wt-% of a cationic photoinitiator.

11. The UV-Vis radiation curable security ink according to claim 1, wherein the security ink comprises d2) from about 30 wt-% to about 65 wt-% of a mixture of a cycloaliphatic epoxide and a radically curable compound, from about 1 wt-% to about 6 wt-% of a cationic photoinitiator, and from about 1 wt-% to about 6 wt-% of a free radical photoinitiator; and wherein the radically curable compound is selected from a radically curable monomer, a radically curable oligomer, and mixtures thereof.

12. The UV-Vis radiation curable security ink according to claim 1, wherein the cationically curable monomer is e1) a vinyl ether having two vinyloxy residues in an amount lower than 50% of the weight percent (wt-%) of the cycloaliphatic epoxide of d).

13. The UV-Vis radiation curable security ink according to claim 1 further comprising:
g) up to about 25 wt-% of an organic solvent, the weight percent being based on the total weight of the UV-Vis radiation curable security ink.

14. A process for producing a security feature for securing a value document, wherein said security feature exhibits a blue color upon viewing in transmitted light and a metallic yellow color upon viewing in incident light, said process comprising the following steps:
- A) printing the UV-Vis radiation curable security ink according to claim 1 on a transparent or partially transparent region of a substrate of a value document to provide an ink layer; and
- B) UV-Vis curing the ink layer obtained at step A) to form the security feature.

15. The process according to claim 14, wherein the value document is selected from the group consisting of banknotes, deeds, tickets, checks, vouchers, fiscal stamps, agreements, identity documents such as passports, identity cards, visas, driving licenses, bank cards, credit cards, transactions cards, access documents, and cards, entrance tickets, public transportation tickets, academic diploma, and academic titles.

16. The process according to claim 14, wherein the printing is performed by screen printing, rotogravure, or flexography.

\* \* \* \* \*